US007020604B2

(12) United States Patent
Kuwaoka

(10) Patent No.: US 7,020,604 B2
(45) Date of Patent: Mar. 28, 2006

(54) AUDIO INFORMATION PROCESSING METHOD, AUDIO INFORMATION PROCESSING APPARATUS, AND METHOD OF RECORDING AUDIO INFORMATION ON RECORDING MEDIUM

(75) Inventor: Toshiharu Kuwaoka, Kanagawa-ken (JP)

(73) Assignee: Victor Company of Japan, Limited, Kangawa-ken (JP)

( * ) Notice: Subject to any disclaimer, the term of this patent is extended or adjusted under 35 U.S.C. 154(b) by 774 days.

(21) Appl. No.: 10/199,008

(22) Filed: Jul. 22, 2002

(65) Prior Publication Data

US 2002/0188365 A1 Dec. 12, 2002

Related U.S. Application Data

(62) Division of application No. 09/176,175, filed on Oct. 21, 1998, now Pat. No. 6,449,519.

(30) Foreign Application Priority Data

Oct. 22, 1997 (JP) ................................ P9-290135
Nov. 13, 1997 (JP) ................................ P9-310838

(51) Int. Cl.
*G10L 11/00* (2006.01)

(52) U.S. Cl. ...................................................... 704/206

(58) Field of Classification Search ..................... None
See application file for complete search history.

(56) References Cited

U.S. PATENT DOCUMENTS 4,813,076 A * 3/1989 Miller ........................ 704/254
4,820,059 A * 4/1989 Miller et al. ................ 704/254
4,862,503 A * 8/1989 Rothenberg ................. 704/235
5,025,471 A * 6/1991 Scott et al. ................. 704/237
5,027,410 A * 6/1991 Williamson et al. ........ 381/320
5,303,217 A 4/1994 Bakx et al.
5,490,127 A 2/1996 Ohta et al.
5,768,227 A 6/1998 Baba
6,298,024 B1 10/2001 Nomura

FOREIGN PATENT DOCUMENTS

EP 0 795 860 9/1997
JP 05127672 5/1993
JP 07066687 3/1995
JP 07175478 7/1995
JP 07236193 9/1995

* cited by examiner

*Primary Examiner*—David D. Knepper
(74) *Attorney, Agent, or Firm*—Nath & Associates PLLC; Gary M. Nath; Gregory B. Kang

(57) ABSTRACT

A harmonic generation circuit compares audio data supplied from the outside every sample, detects a top-peak and an under-peak of the audio data on the basis of the comparison outputs, and detects patterns of the comparison output between continuous top-peak and under-peak. The harmonic generation circuit forms an addition-subtraction data corresponding to harmonic depending on the patterns, and supplies the addition-subtraction data to an adder at a timing depending on the patterns. The adder performs an addition-subtraction process for adding/subtracting the addition-subtraction data formed by the harmonic generation circuit to/from the audio data supplied from the outside. In this manner, with a compact, simple, and low-price circuit arrangement for performing only addition-subtraction, a harmonic component can be added to original audio data, and audio data having a wide frequency band can be formed.

56 Claims, 26 Drawing Sheets

FIG.7

| PATTERN | ADDITION-SUBTRACTION LEVEL | |
|---|---|---|
| 2fs ADDITION-SUBTRACTION (2bit) | 0,0:1/2 | MAKE DIFFERENCE LEVEL AT 2fs 1/2 TO PERFORM ADDITION-SUBTRACTION |
| | 0,1:1/4 | MAKE DIFFERENCE LEVEL AT 2fs 1/4 TO PERFORM ADDITION-SUBTRACTION |
| | 1,0:1/8 | MAKE DIFFERENCE LEVEL AT 2fs 1/8 TO PERFORM ADDITION-SUBTRACTION |
| | 1,1:1/16 | MAKE DIFFERENCE LEVEL AT 2fs 1/16 TO PERFORM ADDITION-SUBTRACTION |
| 3fs ADDITION-SUBTRACTION (2bit) | 0,0:1/2 | MAKE DIFFERENCE LEVEL AT 3fs 1/2 TO PERFORM ADDITION-SUBTRACTION |
| | 0,1:1/4 | MAKE DIFFERENCE LEVEL AT 3fs 1/4 TO PERFORM ADDITION-SUBTRACTION |
| | 1,0:1/8 | MAKE DIFFERENCE LEVEL AT 3fs 1/8 TO PERFORM ADDITION-SUBTRACTION |
| | 1,1:1/16 | MAKE DIFFERENCE LEVEL AT 3fs 1/16 TO PERFORM ADDITION-SUBTRACTION |
| 4fs ADDITION-SUBTRACTION (2bit) | 0,0:1/4 | MAKE DIFFERENCE LEVEL AT 4fs 1/4 TO PERFORM ADDITION-SUBTRACTION |
| | 0,1:1/8 | MAKE DIFFERENCE LEVEL AT 4fs 1/8 TO PERFORM ADDITION-SUBTRACTION |
| | 1,0:1/16 | MAKE DIFFERENCE LEVEL AT 4fs 1/16 TO PERFORM ADDITION-SUBTRACTION |
| | 1,1:1/32 | MAKE DIFFERENCE LEVEL AT 4fs 1/32 TO PERFORM ADDITION-SUBTRACTION |
| 5fs ADDITION-SUBTRACTION (2bit) | 0,0:1/4 | MAKE DIFFERENCE LEVEL AT 5fs 1/4 TO ADDITION-SUBTRACTION |
| | 0,1:1/8 | MAKE DIFFERENCE LEVEL AT 5fs 1/8 TO PERFORM ADDITION-SUBTRACTION |
| | 1,0:1/16 | MAKE DIFFERENCE LEVEL AT 5fs 1/16 TO PERFORM ADDITION-SUBTRACTION |
| | 1,1:1/32 | MAKE DIFFERENCE LEVEL AT 5fs 1/32 TO PERFORM ADDITION-SUBTRACTION |
| 6fs ADDITION-SUBTRACTION (2bit) | 0,0:1/8 | MAKE DIFFERENCE LEVEL AT 6fs 1/8 TO PERFORM ADDITION-SUBTRACTION |
| | 0,1:1/16 | MAKE DIFFERENCE LEVEL AT 6fs 1/16 TO PERFORM ADDITION-SUBTRACTION |
| | 1,0:1/32 | MAKE DIFFERENCE LEVEL AT 6fs 1/32 TO PERFORM ADDITION-SUBTRACTION |
| | 1,1:1/64 | MAKE DIFFERENCE LEVEL AT 6fs 1/64 TO PERFORM ADDITION-SUBTRACTION |
| 7fs ADDITION-SUBTRACTION (2bit) | 0,0:1/8 | MAKE DIFFERENCE LEVEL AT 7fs 1/8 TO PERFORM ADDITION-SUBTRACTION |
| | 0,1:1/16 | MAKE DIFFERENCE LEVEL AT 7fs 1/16 TO PERFORM ADDITION-SUBTRACTION |
| | 1,0:1/32 | MAKE DIFFERENCE LEVEL AT 7fs 1/32 TO PERFORM ADDITION-SUBTRACTION |
| | 1,1:1/64 | MAKE DIFFERENCE LEVEL AT 7fs 1/64 TO PERFORM ADDITION-SUBTRACTION |
| 8fs ADDITION-SUBTRACTION (2bit) | 0,0:1/16 | MAKE DIFFERENCE LEVEL AT 8fs 1/16 TO PERFORM ADDITION-SUBTRACTION |
| | 0,1:1/32 | MAKE DIFFERENCE LEVEL AT 8fs 1/32 TO PERFORM ADDITION-SUBTRACTION |
| | 1,0:1/64 | MAKE DIFFERENCE LEVEL AT 8fs 1/64 TO PERFORM ADDITION-SUBTRACTION |
| | 1,1:1/128 | MAKE DIFFERENCE LEVEL AT 8fs 1/128 TO PERFORM ADDITION-SUBTRACTION |

FIG.11

| PATTERN | ADDITION-SUBTRACTION LEVEL | |
|---|---|---|
| 4fs ADDITION-SUBTRACTION (2bit) | 0,0:1/2 | MAKE DIFFERENCE LEVEL AT 4fs 1/2 TO PERFORM ADDITION-SUBTRACTION |
| | 0,1:1/4 | MAKE DIFFERENCE LEVEL AT 4fs 1/4 TO PERFORM ADDITION-SUBTRACTION |
| | 1,0:1/8 | MAKE DIFFERENCE LEVEL AT 4fs 1/8 TO PERFORM ADDITION-SUBTRACTION |
| | 1,1:1/16 | MAKE DIFFERENCE LEVEL AT 4fs 1/16 TO PERFORM ADDITION-SUBTRACTION |
| 5fs ADDITION-SUBTRACTION (2bit) | 0,0:1/2 | MAKE DIFFERENCE LEVEL AT 5fs 1/2 TO PERFORM ADDITION-SUBTRACTION |
| | 0,1:1/4 | MAKE DIFFERENCE LEVEL AT 5fs 1/4 TO PERFORM ADDITION-SUBTRACTION |
| | 1,0:1/8 | MAKE DIFFERENCE LEVEL AT 5fs 1/8 TO PERFORM ADDITION-SUBTRACTION |
| | 1,1:1/16 | MAKE DIFFERENCE LEVEL AT 5fs 1/16 TO PERFORM ADDITION-SUBTRACTION |
| 6fs ADDITION-SUBTRACTION (2bit) | 0,0:1/4 | MAKE DIFFERENCE LEVEL AT 6fs 1/4 TO PERFORM ADDITION-SUBTRACTION |
| | 0,1:1/8 | MAKE DIFFERENCE LEVEL AT 6fs 1/8 TO PERFORM ADDITION-SUBTRACTION |
| | 1,0:1/16 | MAKE DIFFERENCE LEVEL AT 6fs 1/16 TO PERFORM ADDITION-SUBTRACTION |
| | 1,1:1/32 | MAKE DIFFERENCE LEVEL AT 6fs 1/32 TO PERFORM ADDITION-SUBTRACTION |
| 7fs ADDITION-SUBTRACTION (2bit) | 0,0:1/4 | MAKE DIFFERENCE LEVEL AT 7fs 1/4 TO PERFORM ADDITION-SUBTRACTION |
| | 0,1:1/8 | MAKE DIFFERENCE LEVEL AT 7fs 1/8 TO PERFORM ADDITION-SUBTRACTION |
| | 1,0:1/16 | MAKE DIFFERENCE LEVEL AT 7fs 1/16 TO PERFORM ADDITION-SUBTRACTION |
| | 1,1:1/32 | MAKE DIFFERENCE LEVEL AT 7fs 1/32 TO PERFORM ADDITION-SUBTRACTION |
| 8fs ADDITION-SUBTRACTION (2bit) | 0,0:1/8 | MAKE DIFFERENCE LEVEL AT 8fs 1/8 TO PERFORM ADDITION-SUBTRACTION |
| | 0,1:1/16 | MAKE DIFFERENCE LEVEL AT 8fs 1/16 TO PERFORM ADDITION-SUBTRACTION |
| | 1,0:1/32 | MAKE DIFFERENCE LEVEL AT 8fs 1/32 TO PERFORM ADDITION-SUBTRACTION |
| | 1,1:1/64 | MAKE DIFFERENCE LEVEL AT 8fs 1/64 TO PERFORM ADDITION-SUBTRACTION |
| 9fs ADDITION-SUBTRACTION (2bit) | 0,0:1/8 | MAKE DIFFERENCE LEVEL AT 9fs 1/8 TO PERFORM ADDITION-SUBTRACTION |
| | 0,1:1/16 | MAKE DIFFERENCE LEVEL AT 9fs 1/16 TO PERFORM ADDITION-SUBTRACTION |
| | 1,0:1/32 | MAKE DIFFERENCE LEVEL AT 9fs 1/32 TO PERFORM ADDITION-SUBTRACTION |
| | 1,1:1/64 | MAKE DIFFERENCE LEVEL AT 9fs 1/64 TO PERFORM ADDITION-SUBTRACTION |
| 10fs ADDITION-SUBTRACTION (2bit) | 0,0:1/16 | MAKE DIFFERENCE LEVEL AT 10fs 1/16 TO PERFORM ADDITION-SUBTRACTION |
| | 0,1:1/32 | MAKE DIFFERENCE LEVEL AT 10fs 1/32 TO PERFORM ADDITION-SUBTRACTION |
| | 1,0:1/64 | MAKE DIFFERENCE LEVEL AT 10fs 1/64 TO PERFORM ADDITION-SUBTRACTION |
| | 1,1:1/128 | MAKE DIFFERENCE LEVEL AT 10fs 1/128 TO PERFORM ADDITION-SUBTRACTION |

AUDIO INFORMATION PROCESSING METHOD, AUDIO INFORMATION PROCESSING APPARATUS, AND METHOD OF RECORDING AUDIO INFORMATION ON RECORDING MEDIUM

This application is a divisional application of U.S. patent application Ser. No. 09/176,175, filed Oct. 22, 1998, now U.S. Pat. No. 6,449,519, the entire contents of which are hereby incorporated by reference in its entirety.

BACKGROUND OF THE INVENTION

1. Field of the Invention

The present invention relates to an audio information processing apparatus, an audio information processing method, and a method of recording audio information on a recording medium, which are suitably arranged for a remaster apparatus or the like, for converting audio data recorded on a so-called compact disk (disc) (CD) into audio data for a video disk (disc) (digital video disk or digital versatile disk:DVD) which requires higher tone quality to remaster the audio data and, more particularly, to an audio information processing apparatus, an audio information processing method, and a method of recording audio information on a recording medium which generate harmonic sound on the basis of coded audio information and add the harmonic sound to original audio information as a predetermined band component to design extension or the like of the band of the original audio information.

2. Description of Related Art

It has been performed that an audio signal input as an analog signal is subjected to a sampling process at a predetermined sampling frequency and subjected to a quantization process to form coded audio data whose band is limited, and the audio data is recorded on a recording medium such as an optical disk. As a typical recording medium on which the audio data is recorded, a so-called compact disk (CD) is known. On the compact disk, 16-bit audio data which is subjected to a sampling process at a sampling frequency of 44.1 kHz to be formed is recorded.

A so-called digital video disk (DVD) obtained in the following manner is known. That is, image information including a lot of audio information and a lot of video information amount is highly efficiently compressed and coded by a moving picture compression processing apparatus such as an MPEG apparatus (MPEG : moving picture experts group), and the image information is recorded on an optical disk having a size (12-cm diameter) equal to that of a compact disk. The digital video disk has spread. On the digital video disk, 24-bit (or 20-bit) audio data formed by an analog audio signal is subjected to a sampling process at a sampling frequency of 96 kHz (or 88.2 kHz which is expected to be added as a new standard) is recorded.

For example, when an analog audio signal has a frequency band up to 48 kHz as indicated by a dotted line in FIG. 1, the analog audio signal is subjected to a sampling process at a sampling frequency of 44.1 kHz for a compact disk to be converted into 16-bit audio data. In this case, the audio data has a frequency characteristic in which a frequency band of 22.05 kHz or more is removed as indicated by an alternate long and short dash line in FIG. 1. In contrast to this, when an analog audio signal is subjected to a sampling process at a sampling frequency of 96 kHz for a digital video disk to be converted into 24-bit audio data, audio data having a frequency band up to 48 kHz can be formed like an analog audio signal as indicated by a solid line in FIG. 1.

Here, when an analog audio signal is converted into digital audio data, the resolution of the digital audio data depends on the number of quantization bits, and the frequency band of the digital audio data depends on a sampling frequency. For this reason, even if 16-bit data formed by performing a sampling process at a sampling frequency of 44.1 kHz for a compact disk is subjected to an over-sampling process at a sampling frequency of, e.g., 88.2 kHz, the 16-bit original audio data does not include sound having the frequency band of 22.05 kHz or more. For this reason, the frequency band of the audio data itself after the over-sampling process does not change.

Theoretically, the hearing sense of human being is limited to about 20 kHz. However, it is known that sound having a frequency band of 20 kHz or more and serving as the difference between the frequency band of a compact disk and the frequency band of a digital video disk as indicated by a diagonal line in FIG. 1 brings a rich hearing sense, though the sound cannot be heard.

For this reason, a technique in which the waveform of original audio information is shaped to emphasize or add harmonic and to record/reproduce rich sound is popularly studied. A technique for obtaining a non-linear waveform by using a conversion table is disclosed in Japanese Patent Application Laid-Open No. 5-127672; a technique for further performing a differential operation to form a complex non-linear waveform is disclosed in Japanese Patent Application Laid-Open No. 7-175478; a technique for performing a non-linear process after an over-sampling process to form harmonic is disclosed in Japanese Patent Application Laid-Open No. 7-66687; and a technique for performing a non-linear process after an over-sampling process to extract a wide-band component and adding the wide-band component to original audio information to form wide-band audio information is disclosed in Japanese Patent Application Laid-Open No. 7-236193.

However, since a conventional technique for emphasizing or adding harmonic is designed to use a conversion table for a non-linear process, a differential circuit, or a cube circuit, costs increase, and poor productivity is obtained because of a large circuit scale and a large chip size. In recent years in which price buster and downsizing are demanded, it is an important problem to provide a compact and high-performance audio information processing apparatus.

SUMMARY OF THE INVENTION

It is an object of the present invention to provide an audio information recording method, an audio information recording apparatus, and a method of recording audio information on a recording medium in which audio information having a narrow frequency band can be converted into audio information having a wide frequency band with a compact, simple, and low-price circuit arrangement.

It is another object of the present invention to provide a code information processing method, a code information processing apparatus, and a method of recording code information on a recording medium in which code information having a narrow frequency band can be converted into code information having a wide frequency band with a compact, simple, and low-price circuit arrangement without using a special conversion table for a non-linear process and arranging a cube circuit or the like.

To achieve the object of the present invention, from the first aspect, there is provided an audio information processing method according to the present invention comprising the steps of: comparing audio information supplied from the outside every predetermined sample; detecting maximal values and minimal values of waveforms of the audio information; detecting an interval extending from a maximal value to a minimal value detected in the above step and an interval extending from the minimal value to a maximal value; forming a predetermined band component corresponding to the interval extending from the maximal value to the minimal value or the interval extending from the minimal value to the maximal value detected in the above step on the basis of the audio information supplied from the outside; and performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected in the above step to add the predetermined band components to the audio information supplied from the outside.

Further, from the second aspect, there is provided an audio information processing apparatus according to the present invention comprising: comparison means for comparing audio information supplied from the outside every predetermined sample; maximal/minimal value detection means for detecting maximal values and minimal values of waveforms of the audio information; interval detection means for detecting an interval extending from a maximal value to a minimal value detected by the maximal/minimal value detection means and an interval extending from the minimal value to a maximal value; band component forming means for forming a predetermined band component corresponding to the interval extending from the maximal value to the minimal value or the interval extending from the minimal value to the maximal value detected by the interval detection means on the basis of the audio information supplied from the outside; and band component addition means for performing an addition process, a subtraction process, or an addition-subtraction process to the predetermined band components formed by the band component forming means with respect to the audio information supplied from the outside at a timing corresponding to the interval extending from the maximal value to the minimal value or the interval extending from the minimal value to the maximal value detected by the interval detection means to add the predetermined band components to the audio information supplied from the outside and to output the resultant audio information.

The audio information processing method and the audio information processing apparatus form the predetermined band components corresponding to the interval extending from the maximal value to the minimal value of the audio information or the interval extending from the minimal value to the maximal value. The predetermined band components are subjected to an addition process, a subtraction process, or an addition-subtraction process with respect to the audio information supplied from the outside at timings corresponding to the intervals to design extension of the frequency band of the audio information. In this manner, the extension of the frequency band can be designed by a simple process including only addition and subtraction. Therefore, the audio information processing method and the audio information processing apparatus according to the present invention can convert audio information having a narrow frequency band into audio information having a wide frequency band with a compact, simple, and low-price circuit arrangement.

Further, from the third aspect, there is provided a method of recording audio information on a recording medium according to the present invention wherein audio information generated by the audio information processing method is recorded on a predetermined recording medium.

The method of recording audio information on a recording medium as described above forms a predetermined band component corresponding to the interval extending from the maximal value to the minimal value of the audio information or the interval extending from the minimal value to the maximal value. The predetermined band component is subjected to an addition process, a subtraction process, or an addition-subtraction process with respect to audio information supplied from the outside at a timing corresponding to the interval to design extension of the frequency band of the audio information, and the audio information is recorded on a predetermined recording medium. In this manner, the extension of the frequency band can be designed by a simple process including only addition and subtraction, and the audio data can be recorded on a desired recording medium. Therefore, the method of recording audio information on a recording medium according to the present invention can convert audio information having a narrow frequency band into audio information having a wide frequency band with a compact, simple, and low-price circuit arrangement to record the resultant audio information on a recording medium.

Moreover, from the fourth aspect, there is provided a code information processing method according to the present invention comprising the steps of: comparing code information generated by sampling a waveform signal every predetermined sample; detecting a maximal sample point and a minimal sample point of the code information; detecting a before sample point and an after sample point respectively separated from the maximal sample point and the minimal sample point detected in the above step by a predetermined time; setting levels of the before sample point and the after sample point; connecting, of a maximal sample point and a minimal sample point which are adjacent to each other on time base, the after sample point at a before maximal sample point or a before minimal sample point to the before sample point at an after minimal sample point or a maximal sample point with a line; generating waveform information having a predetermined shape from the line obtained in the above step; extracting a predetermined frequency band component of the waveform information having the predetermined shape; and adding the predetermined frequency band component extracted in the above step to the code information.

Further, from the fifth aspect, there is provided a code information processing apparatus according to the present invention comprising: comparison means for comparing code information generated by sampling a waveform signal every predetermined sample; maximal/minimal sample point detection means for detecting a maximal sample point and a minimal sample point of the code information; before/after sample detection means for detecting a before sample point and an after sample point respectively separated from the detected maximal sample point and the detected minimal sample point by a predetermined time; level setting means for setting levels of the before sample point and the after sample point; line operation means for connecting the after sample point at a before maximal sample point or a before minimal sample point of a maximal sample point and a minimal sample point which are adjacent to each other on time base to the before sample point at an after minimal sample point or an after maximal sample point of the adjacent maximal and minimal sample points, with a line;

trapezoidal waveform information generation means for generating waveform information having a predetermined shape from the line; frequency component extraction means for extracting a predetermined frequency band component of the waveform information having the predetermined shape; and addition means for adding the extracted predetermined frequency band component to the code information.

In the code information processing method and the code information processing apparatus according to the present invention, waveform information having a predetermined shape is generated from code information, and a predetermined frequency band component is generated from the waveform information having the predetermined shape. The predetermined frequency band component is added to the code information to design extension of the frequency band of the code information. In this manner, extension of the frequency band of the code information is realized by a compact, simple, and low-price circuit arrangement. In particular, by using audio information having a narrow frequency band as code information, the audio information having the narrow band is converted into audio information having a wide frequency band with a compact, simple, low-price circuit arrangement.

Further, from the sixth aspect, there is provided a method of recording code information on a recording medium according to the present invention wherein code information generated by the code information processing method is recorded on a predetermined recording medium.

In the method of recording code information on a recording medium according to the present invention, waveform information having a predetermined shape is generated from code information, and a predetermined frequency band component is generated from the waveform information having the predetermined shape. The predetermined frequency band component is added to the code information to design extension of the frequency band of the code information, and the code information whose frequency band is extended is recorded on a predetermined recording medium.

In this manner, extension of the frequency band can be designed by a simple process including only addition and subtraction, and a predetermined recording medium on which code information whose frequency band is extended is recorded can be formed. The recording method can be realized with a compact, simple, and low-price circuit arrangement. In particular, by using audio information having a narrow frequency band as code information, the audio information having the narrow band can be converted into audio information having a wide frequency band with a compact, simple, and low-price circuit arrangement, and the audio information having the wide frequency band can be recorded on a recording medium.

More specifically, in the code information processing method, the code information processing apparatus, and the method of recording code information on a recording medium according to the present invention, a trapezoidal process is performed from a maximal sample point and a minimal sample point with respect to the change in waveform of code information, thereby generating a non-linear signal. In other words, according to the present invention, a harmonic component is extracted as a predetermined frequency band from a trapezoidal waveform generated from code information, and the harmonic component is added to the original code information, so that the band is extended by using the harmonic component as a component out of the frequency band of the code information.

BRIEF DESCRIPTION OF THE DRAWINGS

FIG. 7 is a table showing amounts of addition-subtraction calculated in units of data patterns of audio data.

FIG. 11 is a table showing amounts of addition-subtraction calculated in units of data patterns of audio data in the remaster apparatus according to the second embodiment.

DETAILED DESCRIPTION OF THE PREFERRED EMBODIMENTS

Preferred embodiments of an audio information processing method, an audio information processing apparatus, and a method of recording audio information on a recording medium according to the present invention will be described below with reference to the accompanying drawings.

The audio information processing method, the audio information processing apparatus, and the method of recording audio information on a recording medium according to the present invention can be applied to a remaster apparatus which extends the frequency band of audio data reproduced from a compact disk to remaster the audio data on a digital video disk.

Figure 2:
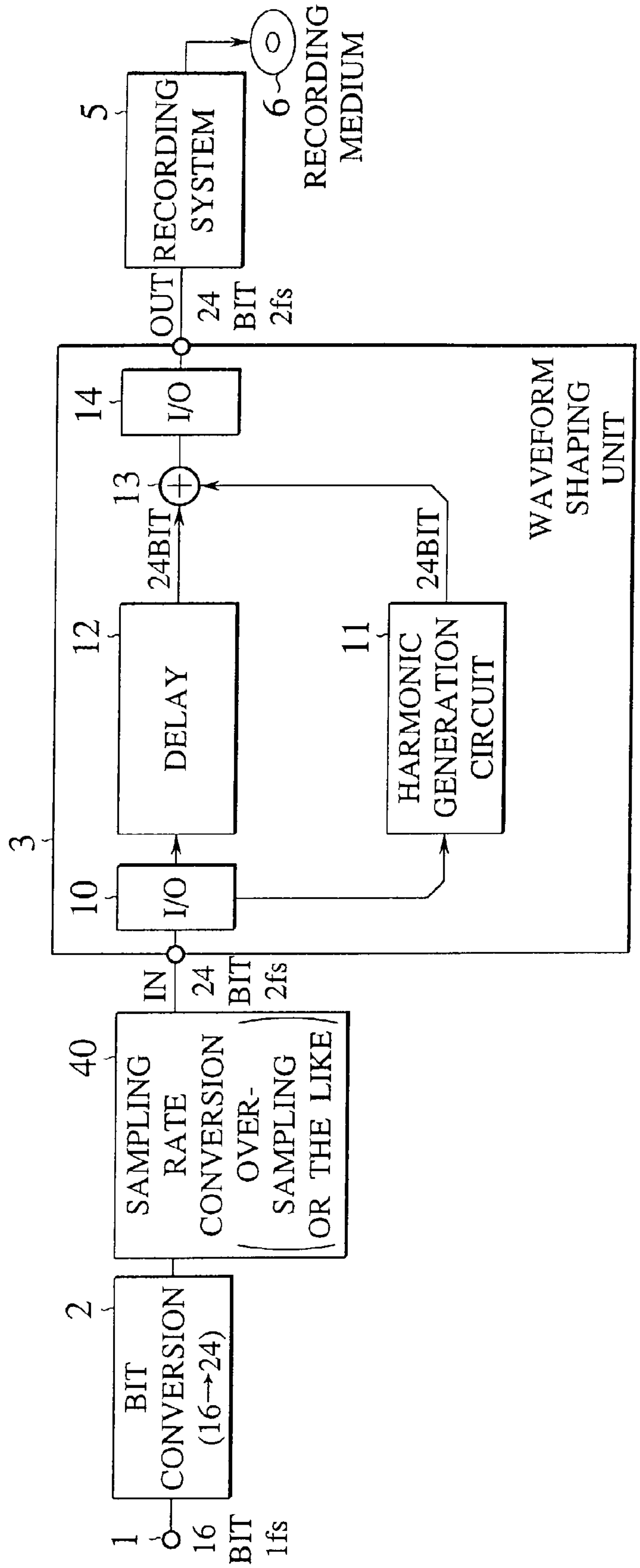
FIG. 2 is a block diagram showing a remaster apparatus according to the first embodiment to which an audio information processing method, an audio information processing apparatus, and a method of recording audio information on a recording medium according to the present invention are applied.

A remaster apparatus according to the first embodiment of the present invention has, as shown in FIG. 2, an input terminal 1 to which 16-bit audio data formed by performing a sampling process at a sampling frequency of 44.1 kHz is supplied, a bit conversion circuit 2 for bit-converting the 16-bit audio data into 24-bit audio data, a sampling rate conversion circuit 40 for converting a sampling frequency into 96 kHz on the basis of the 24-bit audio data, a waveform shaping unit 3 for forming harmonic on the basis of the audio data whose sampling rate is converted and performing an addition process for adding the harmonic to the original 24-bit audio data to design extension of the frequency band, and a recording system 5 for recording the 24-bit audio data whose frequency band is extended on a recording medium 6 such as a digital video disk.

Although the sampling rate conversion circuit 40 may convert a sampling frequency into any sampling frequency if the sampling frequency is 44.1 kHz or more, e.g., a sampling frequency of 88.2 kHz, the sampling rate conversion circuit 40 is designed to perform sampling frequency conversion into 96 kHz including over-sampling conversion, for example.

The waveform shaping unit 3 has an I/O port 10 for receiving 24-bit audio data from the sampling rate conversion circuit 40, a harmonic generation circuit 11 for generating harmonic data on the basis of the 24-bit audio data, a delay circuit 12 for performing delay corresponding to a time required for the harmonic generation process in the harmonic generation circuit 11 to the audio data supplied through the I/O port 10, an adder 13 for performing an addition process for adding the harmonic data from the harmonic generation circuit 11 to the audio data from the delay circuit 12 to form audio data whose frequency band is extended, and an I/O port 14 for outputting the audio data from the adder 13.

Figure 3:
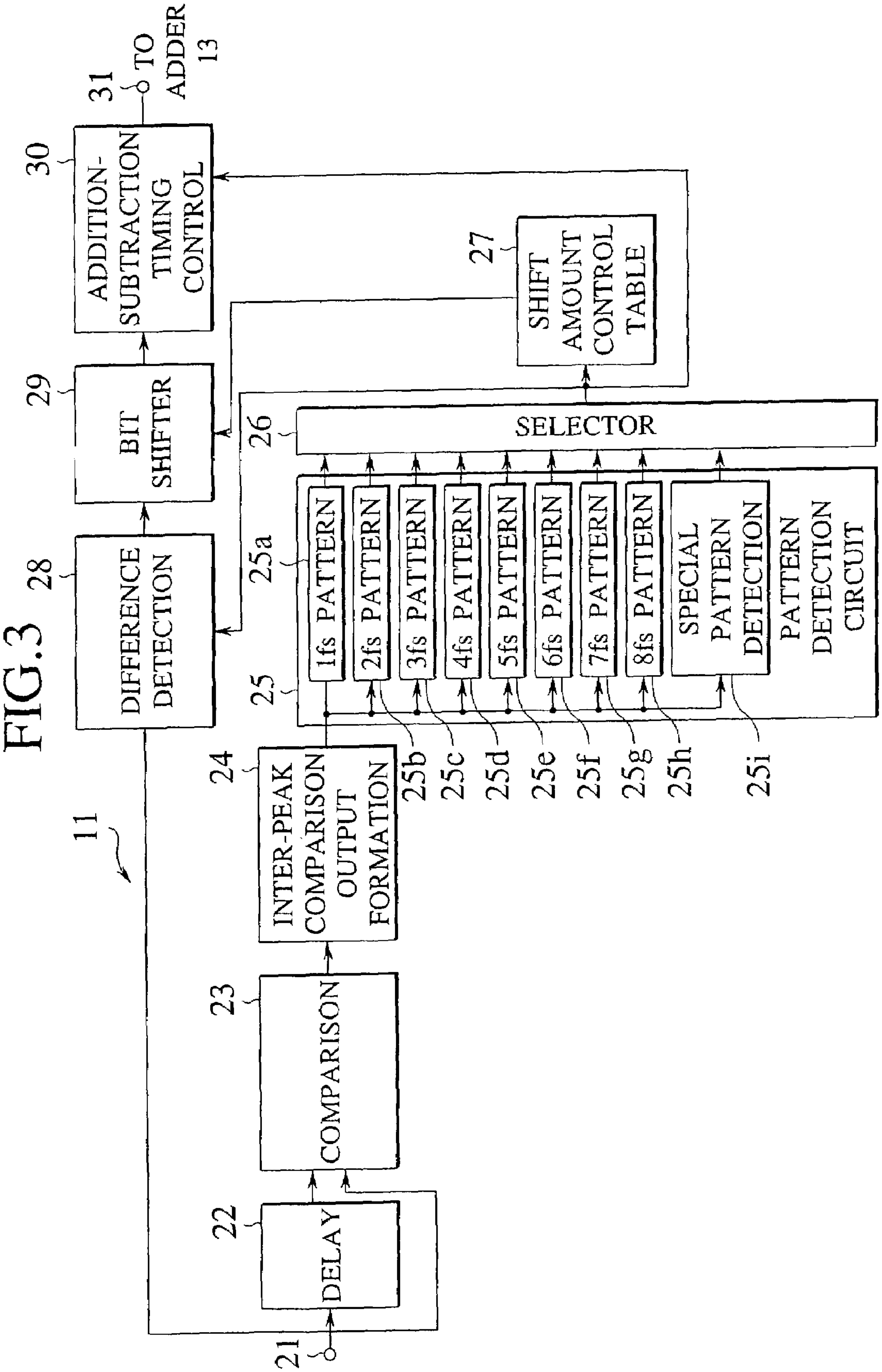
FIG. 3 is a block diagram showing a harmonic generation circuit arranged in the remaster apparatus according to the first embodiment.

The harmonic generation circuit 11 has the arrangement shown in FIG. 3, and has an input terminal 21 to which 24-bit audio data received through the I/O port 10 is supplied, a delay circuit 22 for performing delay corresponding to one sample to the audio data, a comparison circuit 23 for comparing the level of current audio data supplied through the input terminal 21 with the level of the audio data subjected to delay corresponding to one sample by the delay circuit 22, and an inter-peak comparison output forming circuit 24 for detecting top-peaks and under-peaks of the waveform of audio data on the basis of the comparison output from the comparison circuit 23 and outputting a comparison output between the top-peak and the under-peak and a comparison output between the under-peak and the top-peak.

The harmonic generation circuit 11 has a pattern detection circuit 25 for detecting, of a plurality of before stored data patterns, a specific pattern corresponding to a comparison output from the inter-peak comparison output forming circuit 24, a selector 26 for selecting pattern detection outputs from the pattern detection circuit 25, and a shift amount control table 27 in which an amount of addition-subtraction for forming harmonic corresponding to pattern detection outputs from the selector 26.

The harmonic generation circuit 11 has a difference detection circuit 28 for detecting a difference between sample values corresponding to the pattern detection output from the selector 26 on the basis of audio data supplied through the input terminal 21, a bit shifter 29 for performing a bit shift process corresponding to the amount of addition-subtraction from the shift amount control table 27 to difference data from the difference detection circuit 28 to form addition-subtraction data, and an addition-subtraction timing control circuit 30 for outputting the addition-subtraction data from the bit shifter 29 through an output terminal 31 at timings corresponding to the pattern detection outputs from the selector 26.

More specifically, the remaster apparatus supplies the addition-subtraction data from the addition-subtraction timing control circuit 30 to the adder 13 shown in FIG. 2 and adds the addition-subtraction data to 24-bit audio data from the delay circuit 12, so that a harmonic component is added to the 24-bit audio data to record the resultant data.

An operation of the remaster apparatus according to the first embodiment having the above arrangement will be described below.

Figure 4:
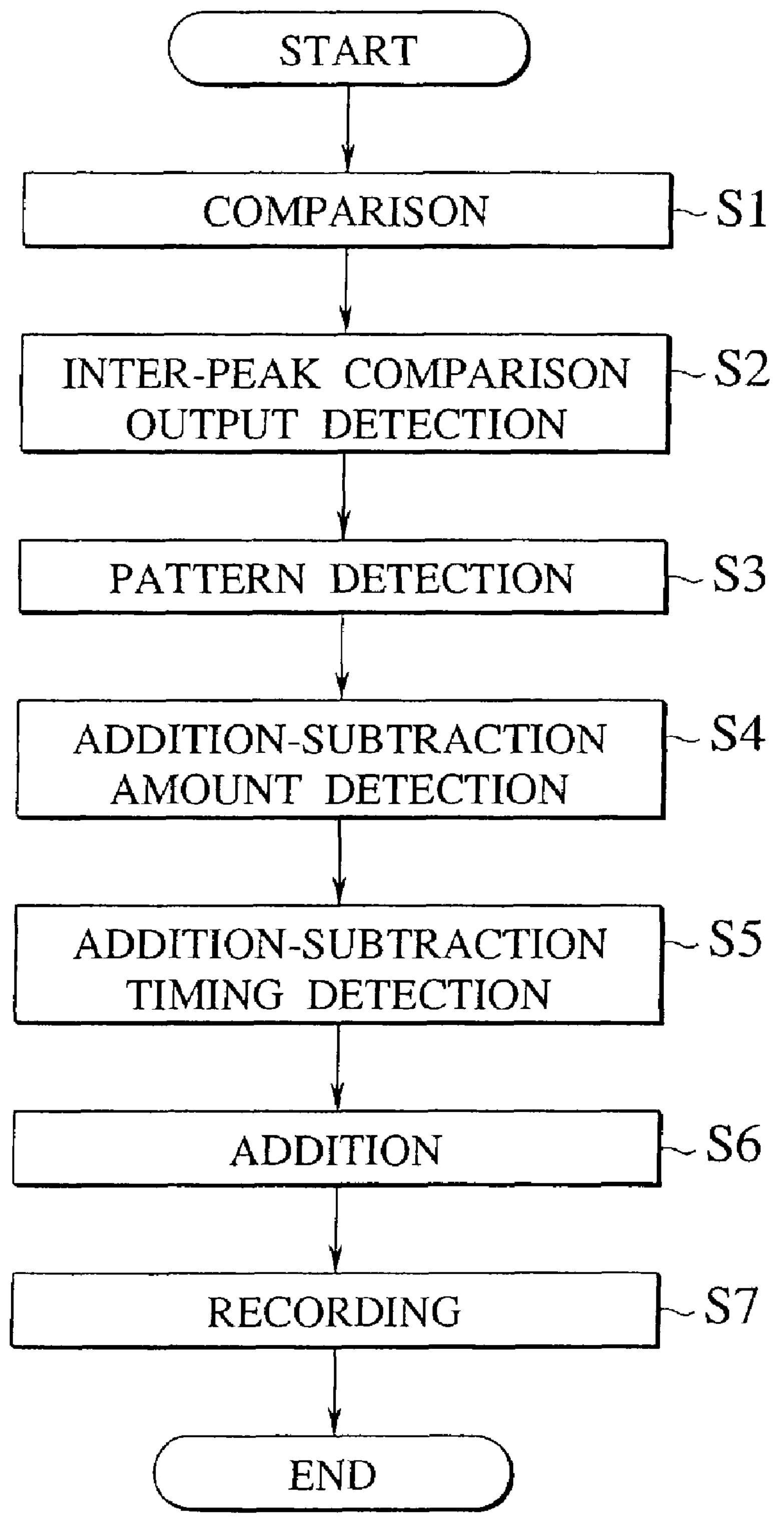
FIG. 4 is a flow chart for explaining a recording operation of the remaster apparatus according to the first embodiment.

A series of operations performed from formation of audio data added with harmonic to recording of the audio data on a recording medium in the remaster apparatus are as shown in the flow chart in FIG. 4. The operation of the remaster apparatus will be described below by using this flow chart. First, in this flow chart, bit rate conversion into 24 bits is performed by the bit conversion circuit 2, and audio data whose sampling frequency is converted into a sampling frequency of 96 kHz by a sampling rate conversion circuit 40 is supplied to the waveform shaping unit 3 to start the operation. The flow shifts to step S1.

The audio data supplied to the waveform shaping unit 3 is directly supplied to the comparison circuit 23 shown in FIG. 3 and subjected to delay corresponding to one sample by the delay circuit 22, and the resultant audio data is supplied to the comparison circuit 23. In step S1, the comparison circuit 23 compares a current audio data with the audio data subjected to delay corresponding to one sample by the delay circuit 22 to supply the comparison output to the inter-peak comparison output forming circuit 24. The flow shifts to step S2.

In step S1, the supplied audio data is compared with the audio data of a before sample every sample. If the current audio data has a sample value larger than that of the audio data of the before sample, "0" is supplied to the inter-peak comparison output forming circuit 24 as the comparison output. If the sample value is smaller than that of the audio data, "1" is supplied to the inter-peak comparison output forming circuit 24.

In this comparison, the current audio data may be the same as the audio data of the before sample. In this case, the comparison circuit 23 compares the current audio data with the audio data of a second before sample. If these audio data are the same, the current audio data is compared with the audio data of a third before sample. In this manner, comparison is sequentially performed by using past sample values. When nine audio data each having the same sample value continue, this indicates a blank. For this reason, the comparison circuit 23 continuously performs the comparison. When the sample value changes, if the audio data of a sample obtained at the change in sample value is larger than the current audio data, "0" is output as the comparison output; otherwise, "1" is output as the comparison output.

In step S2, the inter-peak comparison output forming circuit 24 detects top-peaks and under-peaks on the basis of a comparison output from the comparison circuit 23, detects a comparison output between the top-peak and the under-peak and a comparison output between the under-peak and the top-peak, and supplies the comparison outputs to the pattern detection circuit 25. The flow shifts to step S3.

Figure 5A:
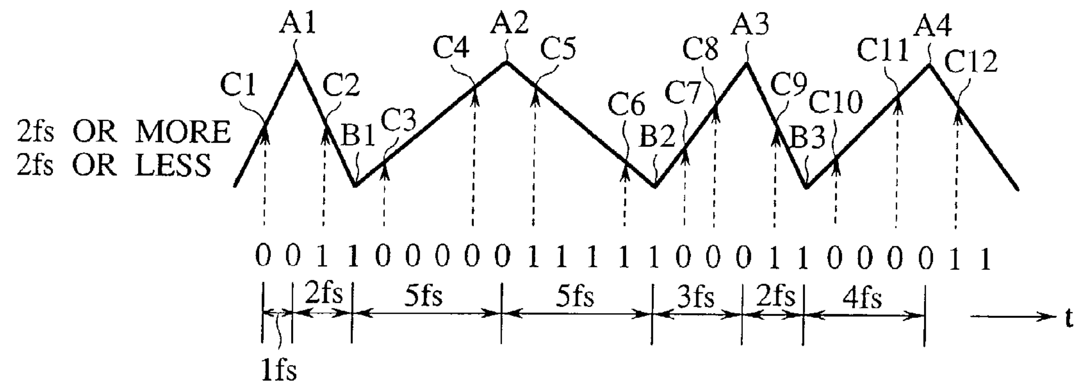
FIGS. 5A, 5B, and 5C are views for explaining a timing at which an addition-subtraction process is performed by a predetermined amount of addition-subtraction in units of data patterns of audio data when extension of a frequency band is designed in the remaster apparatus according to the first embodiment.

More specifically, when the above comparison is performed by the comparison circuit 23, for example, as shown in FIG. 5A, a comparison output of "0" or "1" for the waveform of audio data as shown in FIG. 5A is obtained. The outputs "0" and "1" shown in FIG. 5A are arranged at a one-sample interval. However, as is apparent form FIG. 5A, the comparison output "0" is changed into the comparison output "1", audio data corresponding to a comparison output of "0" serving as the before sample of the comparison output of "1" indicates "top-peak". Similarly, as is apparent from FIG. 5A, when the comparison output of "1" is changed into the comparison output of "0", audio data corresponding to the comparison output of "1" serving as the before sample of the comparison output of "0" indicates "under-peak".

For this reason, the inter-peak comparison output forming circuit 24 detects, on the basis of a point at which the comparison output changes, top-peaks A1, A2, A3, . . . as shown in FIG. 5A and under-peaks B1, B2, B3, . . . A comparison output between continuous top-peak and under-peak is supplied to the pattern detection circuit 25 as an inter-peak comparison output. More specifically, a comparison output between continuous top-peak and under-peak, e.g., the top-peak Al and the under-peak B1 is "1, 1". For this reason, the comparison output "1, 1" is supplied to the pattern detection circuit 25 as an inter-peak comparison output, and the comparison output between the under-peak B1 and the top-peak A2 is "0, 0, 0, 0, 0". For this reason, the comparison output of "0, 0, 0, 0, 0" is supplied to the pattern detection circuit 25 as an inter-peak comparison output.

When such an inter-peak comparison is output to the pattern detection circuit 25, the remaster apparatus shifts to step S3. In step S3, patterns stored in the pattern detection circuit 25 are compared with the inter-peak comparison output to check a before stored specific pattern corresponding to the inter-peak comparison output.

That is, a continuous pattern of the same inter-peak comparison outputs appearing between continuous top-peak and under-peak is stored in the pattern detection circuit 25 in advance. More specifically, a "1fs pattern" representing that the series of the same inter-peak comparison outputs between the top-peak and the under-peak has one sample, i.e., "1" or "0"; a "2fs pattern representing that the series has two samples i.e., "1, 1" or "0, 0"; a "3fs pattern representing that the series has three samples i.e., "1, 1, 1" or "0, 0, 0"; a "4fs pattern representing that the series has four samples i.e., "1, 1, 1, 1" or "0, 0, 0, 0"; a "5fs pattern representing that the series has five samples i.e., "1, 1, 1, 1, 1" or "0, 0, 0, 0, 0"; a "6fs pattern representing that the series has six samples i.e., "1, 1, 1, 1, 1, 1" or "0, 0, 0, 0, 0, 0"; a "7fs pattern representing that the series has seven samples i.e., "1, 1, 1, 1, 1, 1, 1" or "0, 0, 0, 0, 0, 0, 0"; a "8fs pattern representing that the series has eight samples i.e., "1, 1, 1, 1, 1, 1, 1, 1" or "0, 0, 0, 0, 0, 0, 0, 0"; and a "special pattern" representing a series having nine or more samples, i.e., "0" or "1" are stored in memories 25_a_ to 25_i_, respectively. The pattern detection circuit 25 parallel compares the patterns stored in the memories 25_a_ to 25_i_ and the inter-peak comparison outputs, and supplies the comparison outputs to the selector 26.

The selector 26 selects a comparison output representing that the inter-peak comparison output coincides with its pattern from comparison outputs supplied from the pattern detection circuit 25 to supply the selected comparison output to the shift amount control table 27, the difference detection circuit 28, and the addition-subtraction timing control circuit 30.

When the comparison output from the selector 26 is supplied to the shift amount control table 27, the difference detection circuit 28, and the addition-subtraction timing control circuit 30, the remaster apparatus shifts to step S4 to detect an amount of addition-subtraction for forming harmonic.

More specifically, the remaster apparatus performs an addition-subtraction process for adding/subtracting a level corresponding to the comparison output from the selector 26 to/from a predetermined sample value of 24-bit audio data (original audio data) from the delay circuit shown in FIG. 2, so that extension of the frequency band of the original audio data is designed.

More specifically, when the pattern of the inter-peak comparison output of the top-peak and the under-peak is a 2fs pattern or more and a 5fs pattern or less, as shown in FIG. 5A, an "addition process" for adding the data of levels corresponding to differences between the top-peak and before and after sample values to "before and after sample values C1, C2, C4, C5, C8, C9, C10, C11, . . . " of the sample values of the top-peaks A1, A2, A3, . . . is performed, or a "subtraction process" for subtracting the data of levels corresponding to differences between the top-peak and before and after sample values from "before and after sample values C2, C3, C6, C7, C9, C10, . . . " of the sample values of the under-peaks B1, B2, B3, . . . is performed (An addition process for adding a predetermined value to before and after sample values of the top-peak is performed, and a subtraction process for subtracting a predetermined value from the before and after sample values of the under-peak is performed.).

Figure 5B:
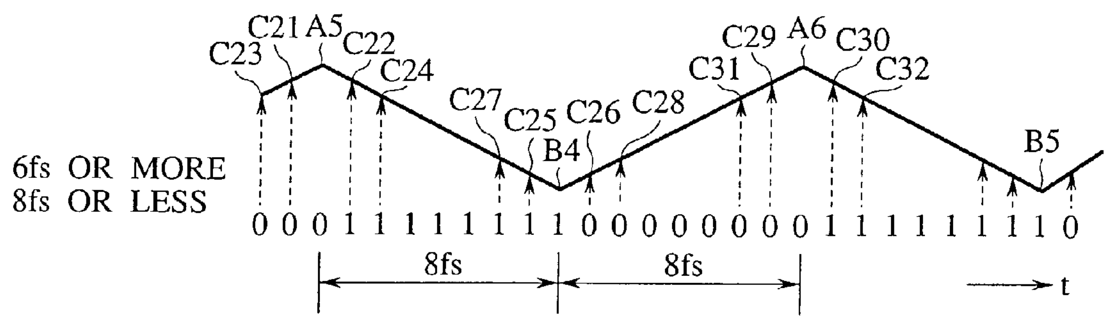

When the pattern of the inter-peak comparison output of the top-peak and the under-peak is a 6fs pattern or more and an 8fs pattern or less, as shown in FIG. 5B, an "addition process" for adding the data of levels corresponding to differences between the top-peak and before and after sample values to "before and after sample values C21, C22, C29, C30, . . . " of the sample values of the top-peaks A5, A6, . . . is performed, or an "addition process" for adding the data of levels corresponding to differences between the before and after sample values and second before and second after sample values to "second before and second after sample values C23, C24, C31, C32, . . . " of the sample values of the top-peaks A5, A6, . . . is performed (an addition process for adding a predetermined value to before and after sample values and second before and second after sample values of the top-peak is performed).

When the pattern of the inter-peak comparison output of the top-peak and the under-peak is a 6fs pattern or more and a 8fs pattern or less, as shown in FIG. 5B, a "subtraction process" for subtracting the data of levels corresponding to differences between the under-peak and before and after sample values from "before and after sample values C25, C26, . . . " of the sample values of the under-peaks B4, B5, . . . is performed, or a "subtraction process" for subtracting the data of levels corresponding to differences between before and after sample values of the under-peak and second before sample and second after sample values from "second before sample and second after sample values C27, C28, . . . " of the sample values of the under-peaks B4, B5, . . . is performed (A subtraction process for subtracting a predetermined value from before and after sample values of the under-peak and the second before sample and second after sample values is performed.).

As described above, the sample values are sampled at a sampling frequency of 96 kHz. For this reason, like the patterns of inter-peak comparison outputs between a top-peak A7 and an under-peak B6 and between a top-peak A8 and an under-peak B7 shown in FIG. 5C, when the pattern of the inter-peak comparison output is a 1fs pattern, the inter-peak comparison output represents that the sample value is sufficiently high harmonic. For this reason, the addition-subtraction process as described above is not performed.

Figure 5C:
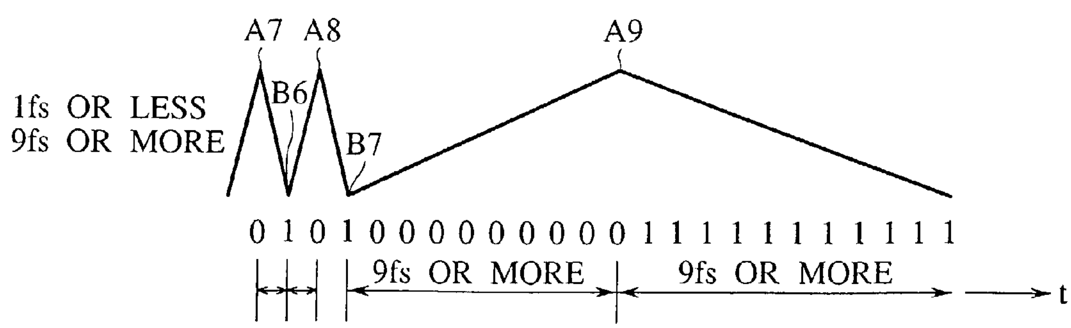

Similarly, when the patterns of the inter-peak comparison output of a top-peak and an under-peak is a 9fs pattern or more like the patterns of inter-peak comparison outputs between the under-peak B7 and the top-peak A7 and the patterns of inter-peak comparison outputs of peaks subsequent to a top-peak A9 shown in FIG. 5C, the resultant sample values indicate a blank. For this reason, the addition-subtraction process described above is not performed.

An amount of addition-subtraction added/subtracted to/from the sample values is designed to be detected as follows.

When a comparison output from the selector 26 is supplied to the difference detection circuit 28 shown in FIG. 3 as described above, the difference detection circuit 28 detects the difference between sample values corresponding to patterns represented by the supplied comparison output.

Figure 6A:
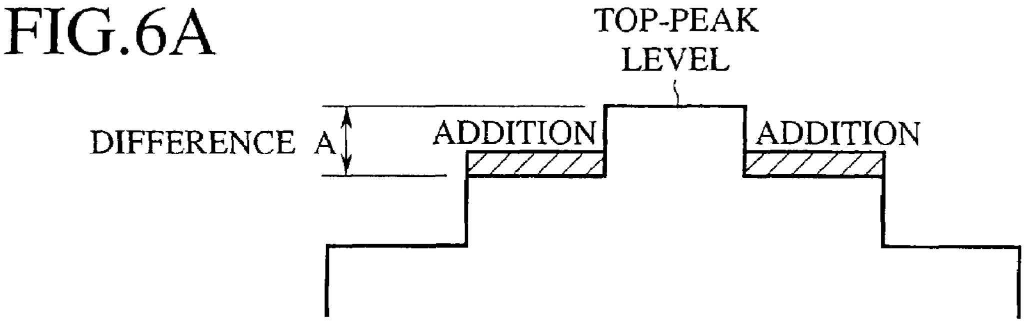
FIGS. 6A, 6B, 6C and 6D are views for explaining a manner of calculating the amount of addition-subtraction.
Figure 6B:
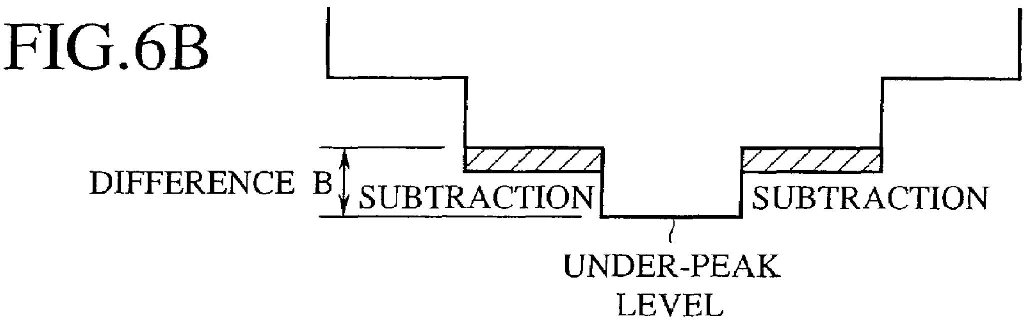
Figure 6C:
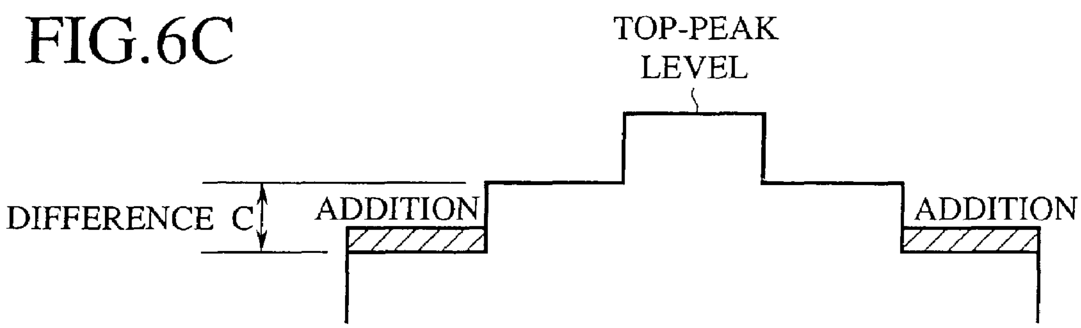
Figure 6D:
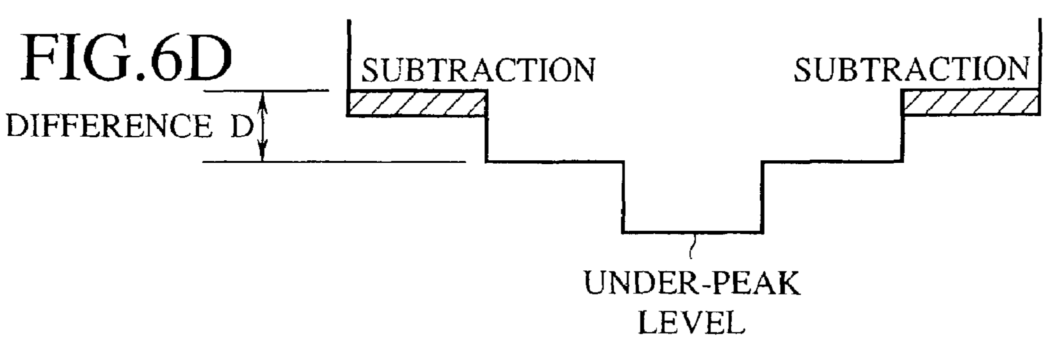

More specifically, when the supplied comparison output represents a pattern which is a "2fs pattern or more and a 5fs pattern or less", the difference detection circuit 28 detects a difference level A between a sample value of a top-peak and before and after sample values of the top-peak as shown in FIG. 6A or a difference level B between a sample value of an under-peak and before and after sample values of the under-peak as shown in FIG. 6B to supply the difference levels A and B to the bit shifter 29. When the supplied comparison output represents a pattern which is a "6fs pattern or more and an 8fs pattern or less", the difference detection circuit 28 detects a difference level C between before and after sample values of the top-peak and second before sample and second, after sample values of the top-peak as shown in FIG. 6C or a difference level D between before and after sample values of an under-peak and second before sample and second after sample values of the under-peak as shown in FIG. 6D to supply the difference levels C and D to the bit shifter 29.

When the pattern of the inter-peak comparison output is a 1fs pattern or a special pattern of 9fs or more, the pattern is not subjected to an addition-subtraction process as described by using FIG. 5C. For this reason, the difference detection circuit 28 is designed not to detect a difference level.

On the other hand, in the shift amount control table 27, the shift amounts of the difference levels A to D in the bit shifter 29 for setting the difference levels A to D supplied to the bit shifter 29 to be amounts of addition-subtraction corresponding to the 2fs to 8fs patterns are stored in advance to be divided into, e.g., four stages classified depending on the levels of the difference levels A to D.

More specifically, in the shift amount control table 27, shift amounts for forming an amount of addition-subtraction by using the difference level A or the difference level B as ½ to 1⁄16 levels depending on the difference level when the pattern of the inter-peak comparison output is a 2fs pattern or a 3fs pattern as shown in FIG. 7 are stored. In the shift amount control table 27, shift amounts for forming an amount of addition-subtraction by using the difference level A or the difference level B as ¼ to 1⁄32 levels depending on the difference level when the pattern of the inter-peak comparison output is a 4fs pattern or a 5fs pattern are stored. In the shift amount control table 27, shift amounts for forming an amount of addition-subtraction by using the difference levels A to D as ⅛ to 1⁄64 levels depending on the difference levels when the pattern of the inter-peak comparison output is a 6fs pattern or a 7fs pattern are stored. In addition, in the shift amount control table 27, shift amounts for forming an amount of addition-subtraction by using the difference levels A to D as 1⁄16 to 1⁄128 levels depending on the difference levels when the pattern of the inter-peak comparison output is an 8fs pattern are stored.

Amounts of addition-subtraction corresponding to the shift amounts are found out on the basis of human engineering such that trial listening is repeated by the present applicant for several years. Therefore, as will be described later, an addition-subtraction process for adding/subtracting the amount of addition-subtraction to/from original audio data, so that an acoustic output having high tone quality can be obtained.

The shift amount control table 27 detects of the pattern of an inter-peak comparison output on the basis of the comparison output supplied from the selector 26 to detect the above shift amount (FIG. 7) corresponding to this pattern. Shift data representing the shift amount is supplied to the bit shifter 29 to which the difference levels A to D are supplied.

The bit shifter 29 performs a bit shift process to the difference levels A to D from the difference detection circuit 28 on the basis of the shift data from the shift amount control table 27 to set the levels A to D to be ½ to 1/128 levels depending on the pattern of the inter-peak comparison output, and the levels ate supplied to the addition-subtraction timing control circuit 30 as an amount of addition-subtraction (addition-subtraction data).

As described above, an addition process for adding the addition-subtraction data to the before and after sample values of the top-peak or the second before sample and second after sample values is performed, and a subtraction process for subtracting the addition-subtraction data from the before and after sample values of the under-peak or the second before sample and second after sample values of the under-peak is performed. The addition process or the subtraction process is designated by setting the most significant bit (MSB) of the addition-subtraction data to be "1 (addition)" or "0 (subtraction)".

When the addition-subtraction data is formed, the remaster apparatus shifts to step S5 to control an output timing of the formed addition-subtraction data.

More specifically, a timing at which an addition-subtraction process for adding/subtracting the addition-subtraction process data to/from original audio data is performed is a timing at which an addition-subtraction for adding/subtracting the addition-subtraction data to/from the before and after sample values of the top-peak or under-peak is performed when the pattern of the inter-peak comparison output is a 2fs pattern to a 5fs pattern. When the pattern of the inter-peak comparison output is a 6fs pattern to an 8fs pattern, the timing is a timing at which an addition-subtraction process for adding/subtracting the addition-subtraction data to/from the before and after sample values of the top-peak or under-peak or the second before sample and second after sample values of the top-peak or under-peak is performed.

For this reason, in step S5, the addition-subtraction timing control circuit 30 measures output timings of the addition-subtraction data from the bit shifter 29 depending on the pattern of an inter-peak comparison output represented by a comparison output from the selector 26, the addition data is supplied at the timings to the adder 13 shown in FIG. 2 through the output terminal 31. In this manner, when the pattern of the inter-peak comparison output is a 2fs pattern to a 5fs pattern, as indicated by a dotted arrow in FIG. 5A, the addition-subtraction data is supplied to the adder 13 at a timing at which before and after sample values of a top-peak or an under-peak. When the pattern of the inter-peak comparison output is a 6fs pattern to an 8fs pattern, the addition-subtraction data is supplied to the adder 13 at a timing at which before and after sample values of the top-peak or the under-peak and second before sample and second after sample of the top-peak and the under-peak are added to the adder 13.

When the addition-subtraction data is supplied to the adder 13, the remaster apparatus shifts to step S6. In step S6, the adder 13 performs an addition-subtraction process for adding/subtracting the addition-subtraction data (harmonic) formed by the harmonic generation circuit 11 to the original 24-bit audio data supplied from the delay circuit 12. Concrete example of a change in waveform before and after the addition-subtraction process are shown in FIGS. 8A to 8C and FIGS. 9A to 9C.

Figure 8A:
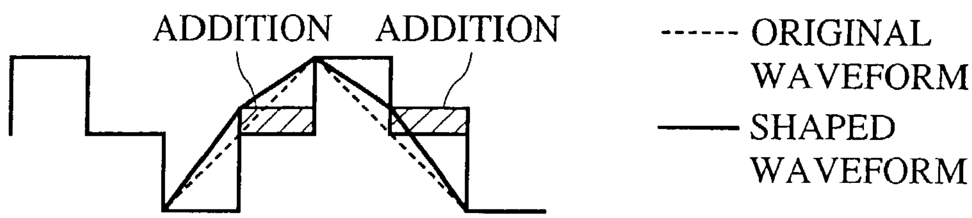
FIGS. 8A, 8B, and 8C are views showing waveforms of audio data in which an addition-subtraction process is performed by the amounts of addition-subtraction in FIG. 7.
Figure 8B:
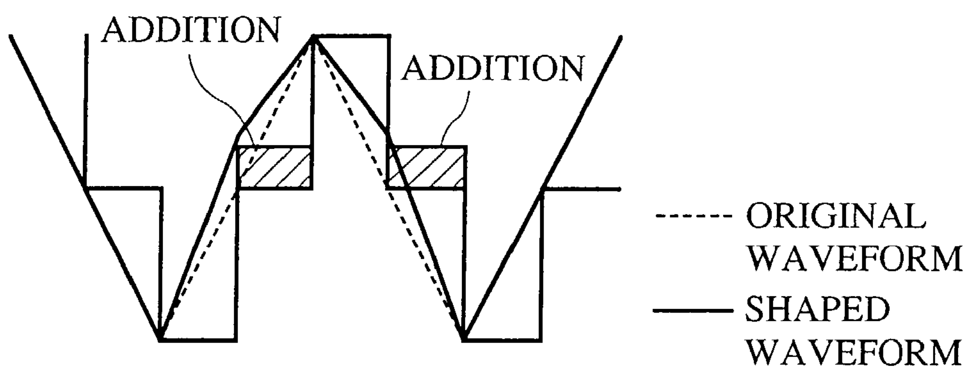
Figure 8C:
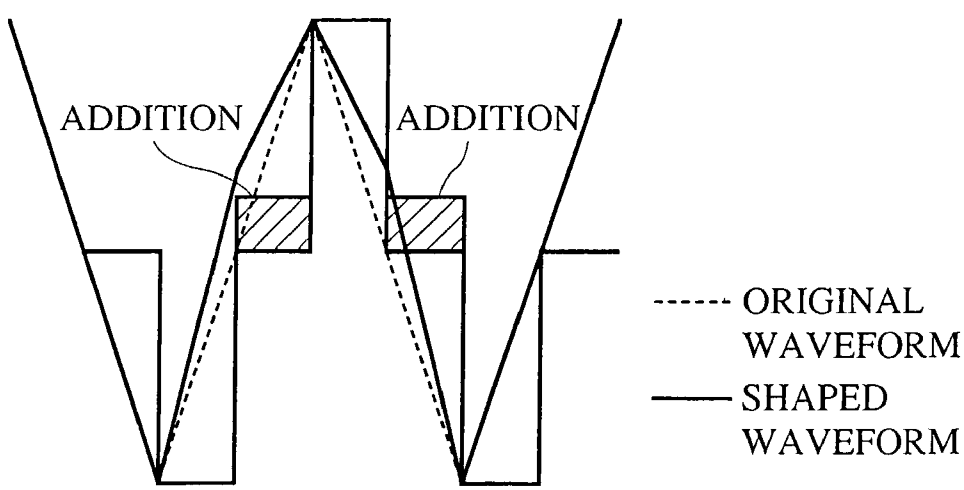

FIGS. 8A to 8C show an addition process performed when the pattern of the inter-peak comparison output is a 2fs pattern. As is apparent from FIGS. 8A to 8C, when the pattern of the inter-peak comparison output is a 2fs pattern, an addition process for adding addition-subtraction data calculated depending on a difference level between a sample value of the top-peak of the original audio data and before and after sample values of the top-peak to the before and after sample value of the top-peak is performed as indicated by an oblique line in FIGS. 8A to 8C. In this manner, the waveforms of the original audio data indicated by dotted lines in FIGS. 8A to 8C can be shaped into waveforms which are extended in frequency band as indicated by solid lines in FIGS. 8A to 8C.

Figure 9A:
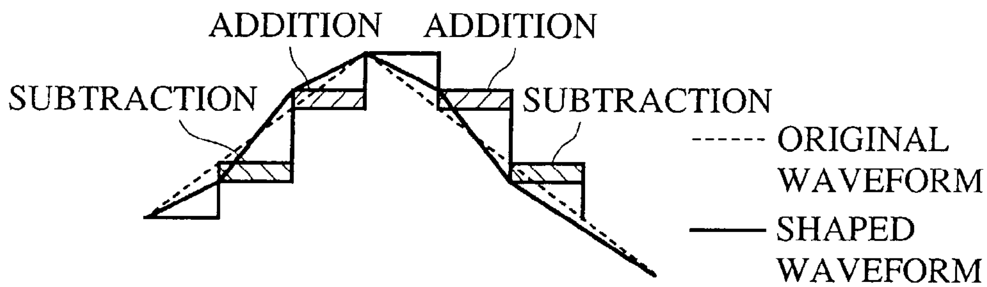
FIGS. 9A, 9B, and 9C are views showing waveforms of audio data in which an addition-subtraction process is performed by the amounts of addition-subtraction in FIG. 7.
Figure 9B:
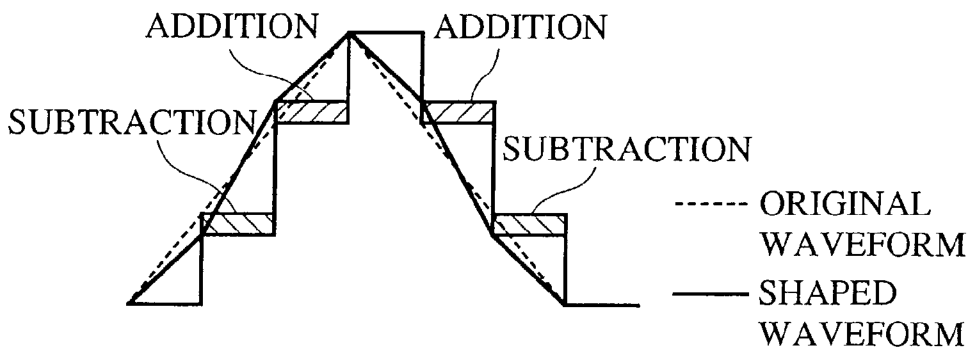
Figure 9C:
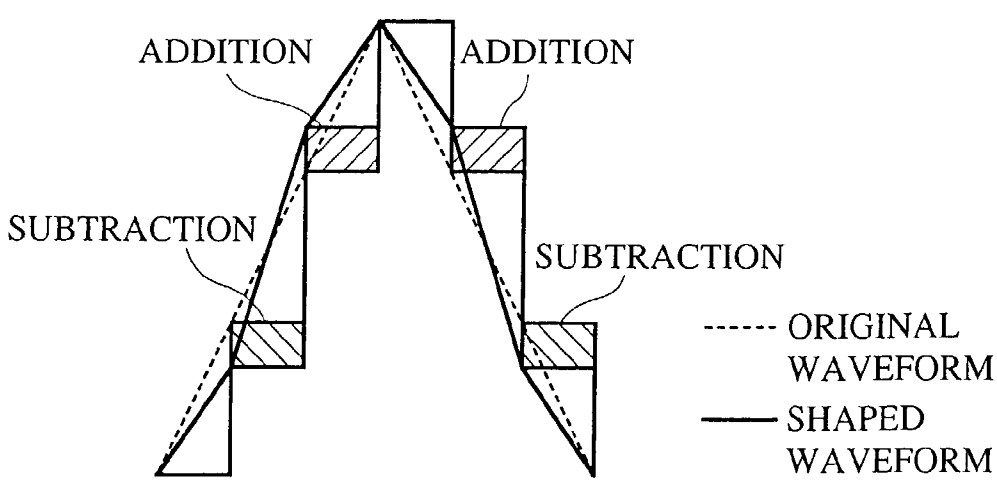

Similarly, FIGS. 9A to 9C show an addition-subtraction process performed when the pattern of the inter-peak comparison output is a 3fs pattern. As is apparent from FIGS. 9A to 9C, when the pattern of the inter-peak comparison output is a 3fs pattern, an addition process for adding addition-subtraction data calculated depending on a difference level between a sample value of the top-peak of the original audio data and before and after sample values of the top-peak to the before and after sample value of the top-peak is performed as indicated by a right-oblique line in FIGS. 9A to 9C. An addition process for adding addition-subtraction data calculated depending on a difference level between before and after sample values of an under-peak of the original audio data and second before sample and second after sample values of the under-peak to the second before sample and second after sample values of the top-peak is performed as indicated by a left-oblique line in FIGS. 9A to 9C. In this manner, the waveforms of the original audio data indicated by dotted lines in FIGS. 9A to 9C can be shaped into waveforms which are extended in frequency band as indicated by solid lines in FIGS. 9A to 9C.

As described above, 24-bit audio data subjected to the waveform shaping process for extending (harmonic-adding) the frequency band is supplied to the recording system 5 through the I/O port 14. The remaster apparatus shifts to step S7 such that the 24-bit audio data subjected to the waveform shaping process is supplied to the recording system 5 through the I/O port 14. This output audio data may be subjected a rounding process to be output as, e.g., 20-bit audio data.

In step S7, the recording system 5 records the 24-bit audio data subjected to the waveform shaping process on the recording medium 6 such as a digital video disk. After the recording of all the audio data is confirmed, all the routines of the flow chart shown in FIG. 4 are completed. In this manner, a harmonic component which is indicated by an oblique line in FIG. 1 and is short in 16-bit audio data reproduced from a compact disk is added, and the audio data can be remastered on a digital video disk.

As is apparent from the above description, in the remaster apparatus according to the first embodiment of the present invention, audio data for a compact disk is converted into audio data for a digital video disk, and the converted audio data can be recorded on the digital video disk again. For this reason, a process of forming audio data for a digital video disk from a new analog audio signal can be omitted, and the audio data for a conventional compact disk can be recycled.

In the waveform shaping unit 3, waveform shaping of original audio data (formation of a harmonic component and synthesis between the harmonic component and original audio data) can be performed by using only an addition-subtraction process. For this reason, the waveform shaping can be performed without using a conversion table, a differential circuit, a cube circuit, or the like for a non-linear process required for conventional waveform shaping. In addition, a high-pass filter (HPF) for extracting a harmonic component from a non-linear signal need not be arranged between the harmonic generation circuit 11 and the adder 13. In particular, as is apparent from the arrangement of an IIR filter or an FIR filter, a filter system such as a high-pass filter serves as a factor of causing complication of the circuit and an increase in circuit scale to obtain good filter characteristics. The filter system also serves as a factor of causing distortion of a waveform. In the waveform shaping unit 3, the factors can be essentially removed. Therefore, the circuit scale of the waveform shaping unit 3 can be reduced, and the chip size can be reduced. Low cost, improvement of productivity, and high performance can be designed. In addition, since a compact remaster apparatus having high performance can be provided, the remaster apparatus can sufficiently cope with price buster and downsizing at present.

A remaster apparatus according to the second embodiment of the present invention. The remaster apparatus according to the first embodiment converts 16-bit audio data having a sampling frequency of 44.1 kHz into 24-bit audio data having, e.g., a sampling frequency of 96 kHz with respect to a sampling rate and a bit rate to perform data processing. The remaster apparatus according to the second embodiment receives 16-bit audio data having a sampling frequency of 96 kHz from the beginning, and performs data processing such that only the bit rate is converted from 16 bits to 24 bits without changing the sampling frequency.

The remaster apparatus according to the second embodiment is different from the remaster apparatus according to the first embodiment in the above point. For this reason, only the difference will be described below. Like reference numerals as in the remaster apparatus of the first embodiment denote like parts in the remaster apparatus of the second embodiment, and a redundant description will be omitted.

Figure 10:
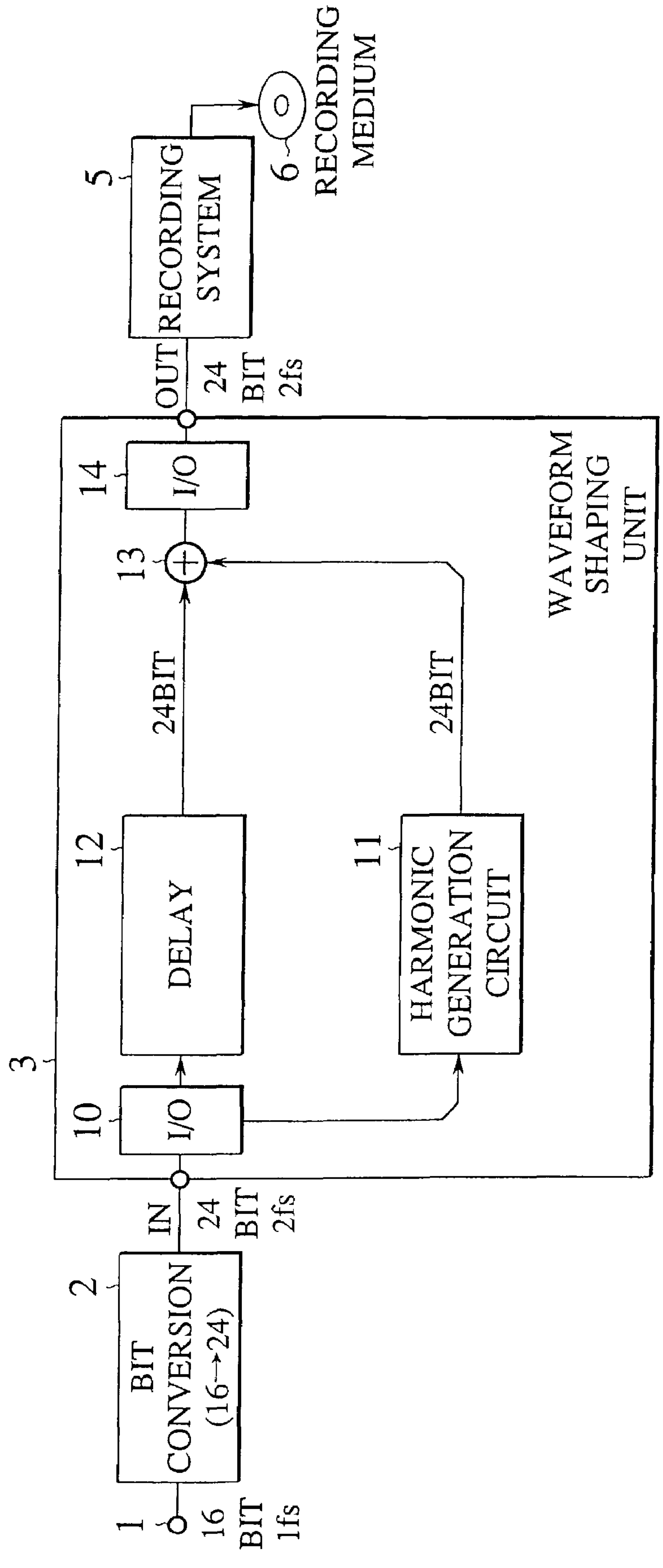
FIG. 10 is a block diagram showing a remaster apparatus according to the second embodiment to which an audio information processing method, an audio information processing apparatus, and a method of recording audio information on a recording medium according to the present invention are applied.

More specifically, the remaster apparatus according to the second embodiment has the following arrangement. That is, as shown in FIG. 10, the sampling rate conversion circuit 40 shown in FIG. 2 connected between the bit conversion circuit 2 and the waveform shaping unit 3 is omitted.

In such a remaster apparatus, 16-bit audio data having a sampling frequency of 96 kHz and supplied through an input terminal 1 is converted into 24-bit audio data by a bit conversion circuit 2.

The pattern detection circuit 25 shown in FIG. 3 arranged in the waveform shaping unit 3 of the remaster apparatus according to the first embodiment stores a 1fs pattern to an 8fs pattern and a special pattern. However, in the remaster apparatus according to the second embodiment, a pattern detection circuit 25 arranged in the waveform shaping unit 3 stores, in addition to the above 1fs pattern to 8fs pattern, a "9fs pattern" representing that the series of the same inter-peak comparison outputs between a top-peak and an under-peak has nine samples, i.e., "1, 1, 1, 1, 1, 1, 1, 1, 1" or "0, 0, 0, 0, 0, 0, 0, 0, 0", a "10fs pattern" representing the series has ten samples, i.e., "1, 1, 1, 1, 1, 1, 1, 1, 1, 1" or "0, 0, 0, 0, 0, 0, 0, 0, 0, 0", and a "special pattern" representing that the series has eleven or more samples, i.e., "0" or "1".

A difference detection circuit 28 shown in FIG. 3 is designed not to detect the difference level when the pattern of the inter-peak comparison output detected by a selector 26 is a 1fs pattern to a 3fs pattern and when the "special pattern" representing that the series has eleven or more samples, i.e., "0" or "1".

A shift amount control table 27 is designed to be driven when the pattern of the inter-peak comparison output detected by the selector 26 is a 4fs pattern to a 10fs pattern. The pattern of the inter-peak comparison output is a 4fs pattern or a 5fs pattern, as shown in FIG. 11, the bit shifter 29 is controlled such that the difference level A or the difference level B (see FIGS. 6A and 6B) is set to be ½ to 1/16 levels depending on the corresponding difference level. When the pattern of the inter-peak comparison output detected by the selector 26 is a 6fs pattern or a 7fs pattern, the bit shifter 29 is controlled such that the difference level A or the difference level B is -set to be ¼ to 1/32 levels depending on the corresponding difference level. When the pattern of the inter-peak comparison output detected by the selector 26 is a 8fs pattern or a 9fs pattern, the bit shifter 29 is controlled such that the difference levels A to D (see FIGS. 6A, 6B, 6C and 6D) are set to be ⅛ to 1/64 levels depending on the corresponding difference levels. In addition, when the pattern of the inter-peak comparison output detected by the selector 26 is a 10fs pattern or a 9fs pattern, the bit shifter 29 is controlled such that the difference levels A to D are set to be 1/16 to 1/128 levels depending on the corresponding difference levels.

In this manner, harmonic of the treble part in the frequency band of audio data which is output or recorded can be emphasized, and the same effect as in the remaster apparatus according to the present invention can be obtained.

Figure 12:
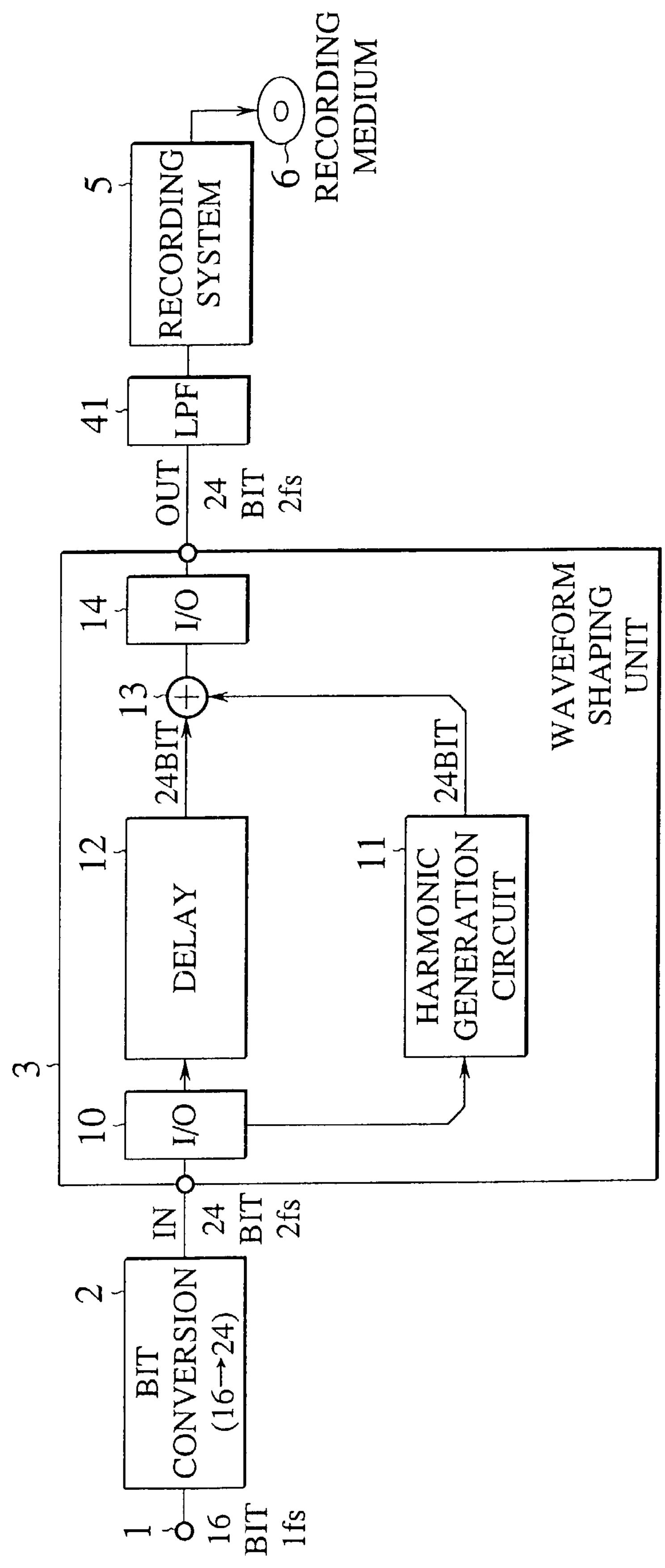
FIG. 12 is a block diagram showing a remaster apparatus according to the third embodiment to which an audio information processing method, an audio information processing apparatus, and a method of recording audio information on a recording medium according to the present invention are applied.

A remaster apparatus according to the third embodiment of the present invention will be described below. In the remaster apparatus according to the third embodiment, as shown in FIG. 12, a low-pass filter 41 is arranged between the waveform shaping unit 3 and the recording system 5 of the remaster apparatus according to the second embodiment. The remaster apparatus according to the third embodiment is different from the remaster apparatus according to the first embodiment in this point. For this reason, the difference will be described below.

The remaster apparatus according to the first embodiment has one effect that a low-pass filter can be omitted. However, if aliasing noise or the like is generated, the aliasing noise or the like can be removed by the low-pass filter 41, and the tone quality of audio data to be formed can be kept high.

The remaster apparatus does not necessarily require a low-pass filter. It should be understood that the low-pass filter makes it possible to cope with aliasing noise or the like which is rarely generated.

The four embodiment of the present invention will be described below. In the fourth embodiment, an audio information processing method and an audio information processing apparatus according to the present invention are applied to an audio processing apparatus for a CD player. In a description of the audio processing apparatus for a CD player according to the fourth embodiment, like reference numerals as in the first embodiment denote like parts in the fourth embodiment in FIG. 13, and a description thereof will be omitted.

Figure 13:
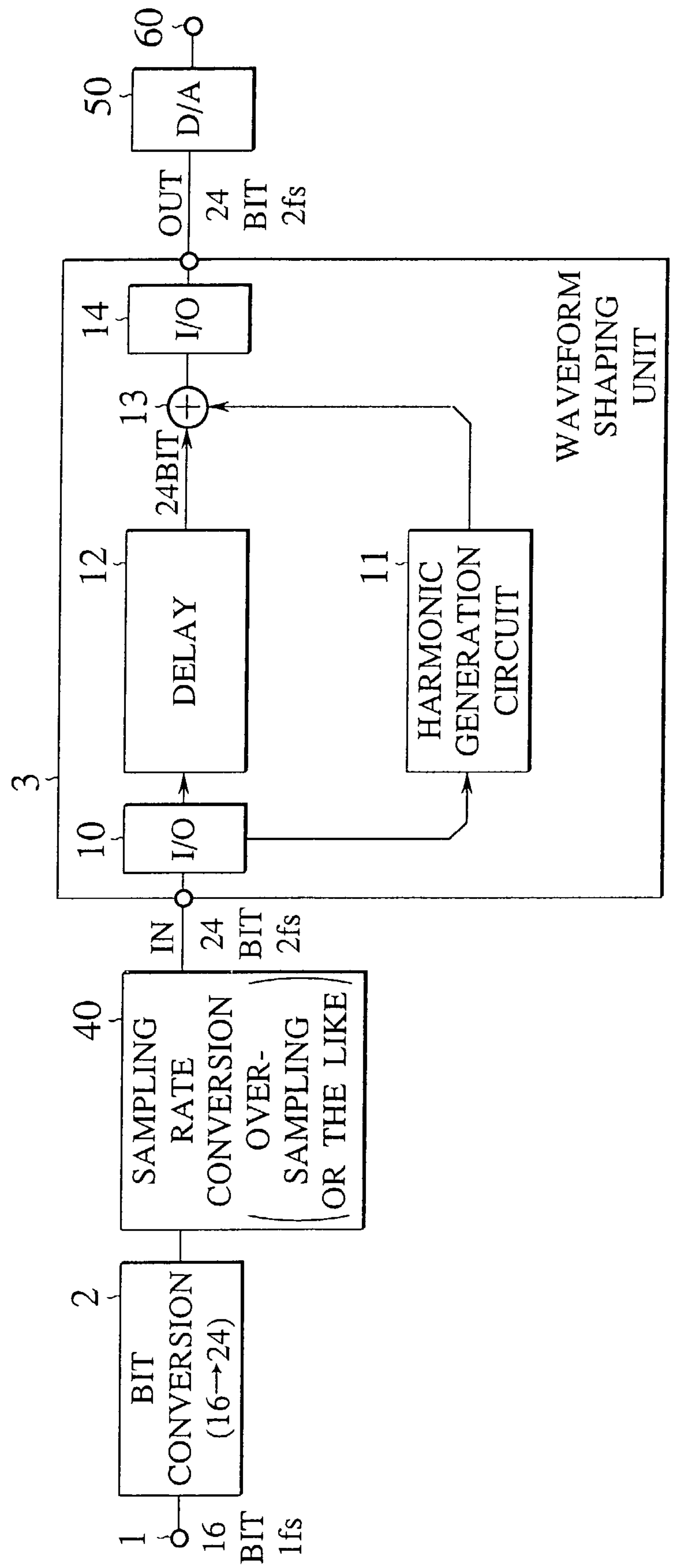
FIG. 13 is a block diagram showing an audio processing apparatus for CD player according to the fourth embodiment to which an audio information processing method and an audio information processing apparatus according to the present invention are applied.

More specifically, the audio processing apparatus for a CD player according to the fourth embodiment is arranged to have a D/A converter 50 for converting audio data output as digital data to the post-stage of a waveform shaping unit 3 into an analog audio signal as shown in FIG. 13. Harmonic-added 24-bit audio data is converted into analog data by the D/A converter 50, and the analog data is supplied to a recording device such as a loudspeaker device or an optical disk recording device through an output terminal 60. As described above, since audio data formed by the waveform shaping unit 3 is extended in frequency band, when the audio data is converted into analog data to supply the analog data to the loudspeaker device, a rich acoustic effect can be obtained, and like effect as that of each of the above embodiments can be obtained.

The fifth embodiment of the present invention will be described below. In the fifth embodiment, an audio information processing method and an audio information processing apparatus according to the present-invention are applied to an audio processing apparatus for a DVD player. In a description of the audio processing apparatus for a DVD player according to the fifth embodiment, like reference numerals as in the first embodiment denote like parts in the fifth embodiment in FIG. 14, and a description thereof will be omitted.

Figure 14:
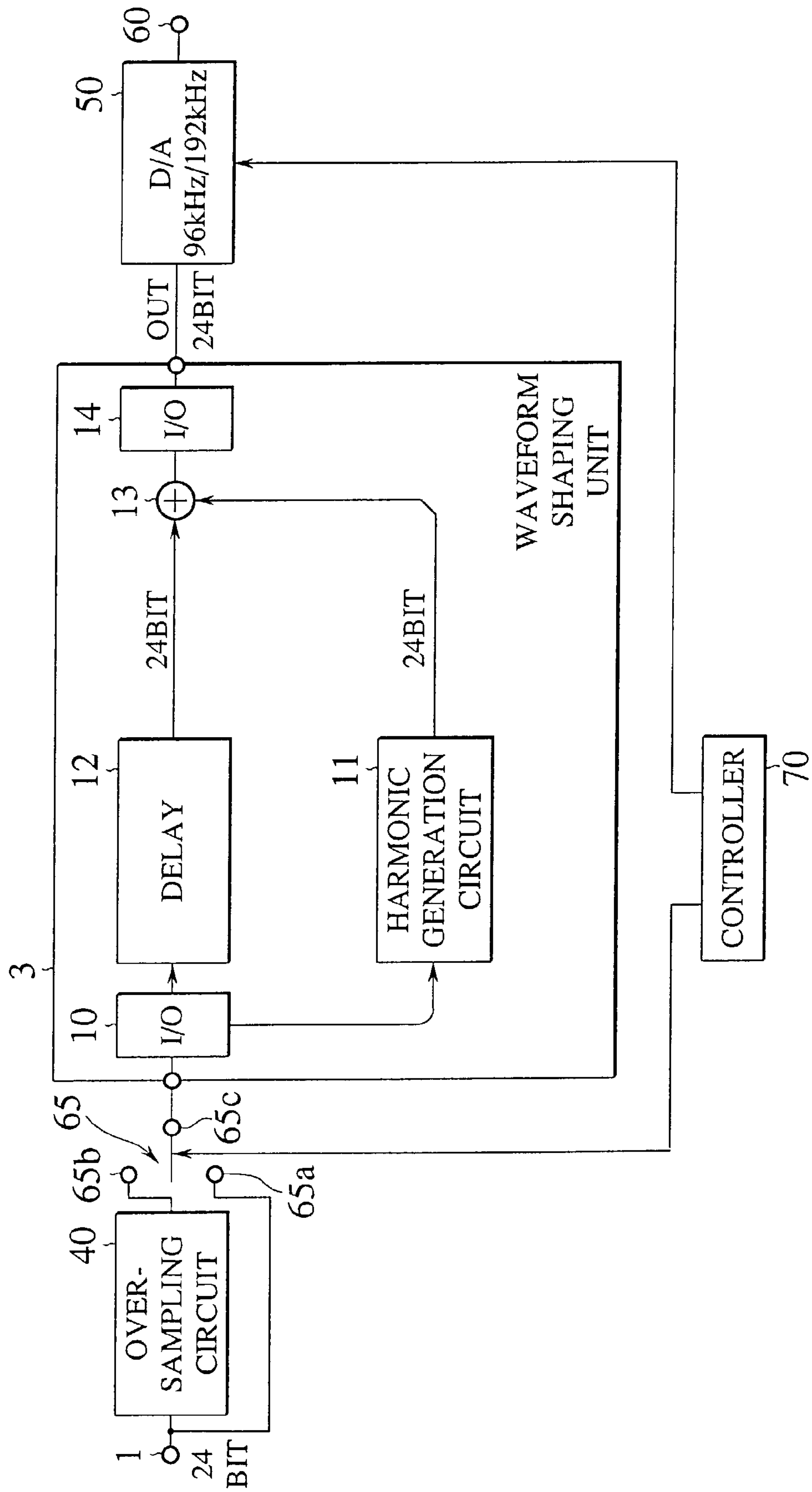
FIG. 14 is a block diagram showing an audio processing apparatus for DVD player according to the fifth embodiment to which an audio information processing method and an audio information processing apparatus according to the present invention are applied.

More specifically, the audio processing apparatus for a DVD player according to the fifth embodiment has, as shown in FIG. 14: a sampling rate conversion circuit 40 for converting audio data having a sampling frequency of 96 kHz and a bit rate of 24 bits into audio data having a sampling frequency of 192 kHz without changing the bit rate; a change-over switch 65 for switching the audio data having a sampling frequency of 192 kHz supplied from the sampling rate conversion circuit 40 and audio data having a sampling frequency of 96 kHz and supplied through an input terminal 1 to output the audio data; and a D/A converter 50 for converting audio data output from the waveform shaping unit 3 and having a sampling frequency of 96 kHz and audio data having a sampling frequency of 192 kHz into analog data.

In a pattern detection circuit 25 of a harmonic generation circuit 11 of a waveform shaping unit 3, a 1fs pattern to an 8fs pattern and a special pattern which are described by using FIG. 7 are stored for the audio data having a sampling frequency of 192 kHz, and a 1fs pattern to a 10fs pattern and a special pattern which are described by using FIG. 11 are stored for the audio data having a sampling frequency of 96 kHz.

A controller 70 performs switching control for the change-over switch 65 depending on the sampling frequency of audio data subjected to data processing by the audio processing apparatus, and performs switching control for a pattern used in a pattern detection circuit 25 of the harmonic generation circuit 11, and performs switching control for the drive frequency of the D/A converter 50.

The operation of the audio processing apparatus for a DVD player according to the fifth embodiment having the above arrangement will be described below.

When data processing for audio data having a sampling frequency of 96 kHz is to be performed, the controller 70 performs switching control for the change-over switch 65 to cause a selection terminal 65*c* to select a selected terminal 65*a*, controls a harmonic generation circuit 11 to perform pattern detection of the inter-peak comparison output by the 1fs pattern to the 10fs pattern and the special pattern which are described by using FIG. 11, and controls the D/A converter 50 to perform a D/A conversion process corresponding to a sampling frequency of 96 kHz.

In this manner, 96 kHz audio data from an input terminal 1 is supplied to the waveform shaping unit 3 through the change-over switch 65, the audio data is added with a harmonic component depending on the sampling frequency of 96 kHz and converted into analog data by the D/A converter 50. For example, the analog data is output to a loudspeaker, an optical disk recording device, or the like.

When data processing for audio data having a sampling frequency of 192 kHz is to be performed, the controller 70 performs switching control for the change-over switch 65 to cause the selection terminal 65*c* to select the selected terminal 65*b*, controls the harmonic generation circuit 11 to perform pattern detection of the inter-peak comparison output by the 1fs pattern to the 8fs pattern and the special pattern which are described by using FIG. 7, and controls the D/A converter 50 to perform a D/A conversion process corresponding to a sampling frequency of 192 kHz.

In this manner, 96 kHz audio data from an input terminal 1 is converted into audio data having a sampling frequency of 192 kHz by the sampling rate conversion circuit 40, and the audio data is supplied to the waveform shaping unit 3. The audio data is added with a harmonic component depending on the sampling frequency of 192 kHz and converted into analog data by the D/A converter 50. For example, the analog data is output to a loudspeaker, an optical disk recording device, or the like.

Figure 15:
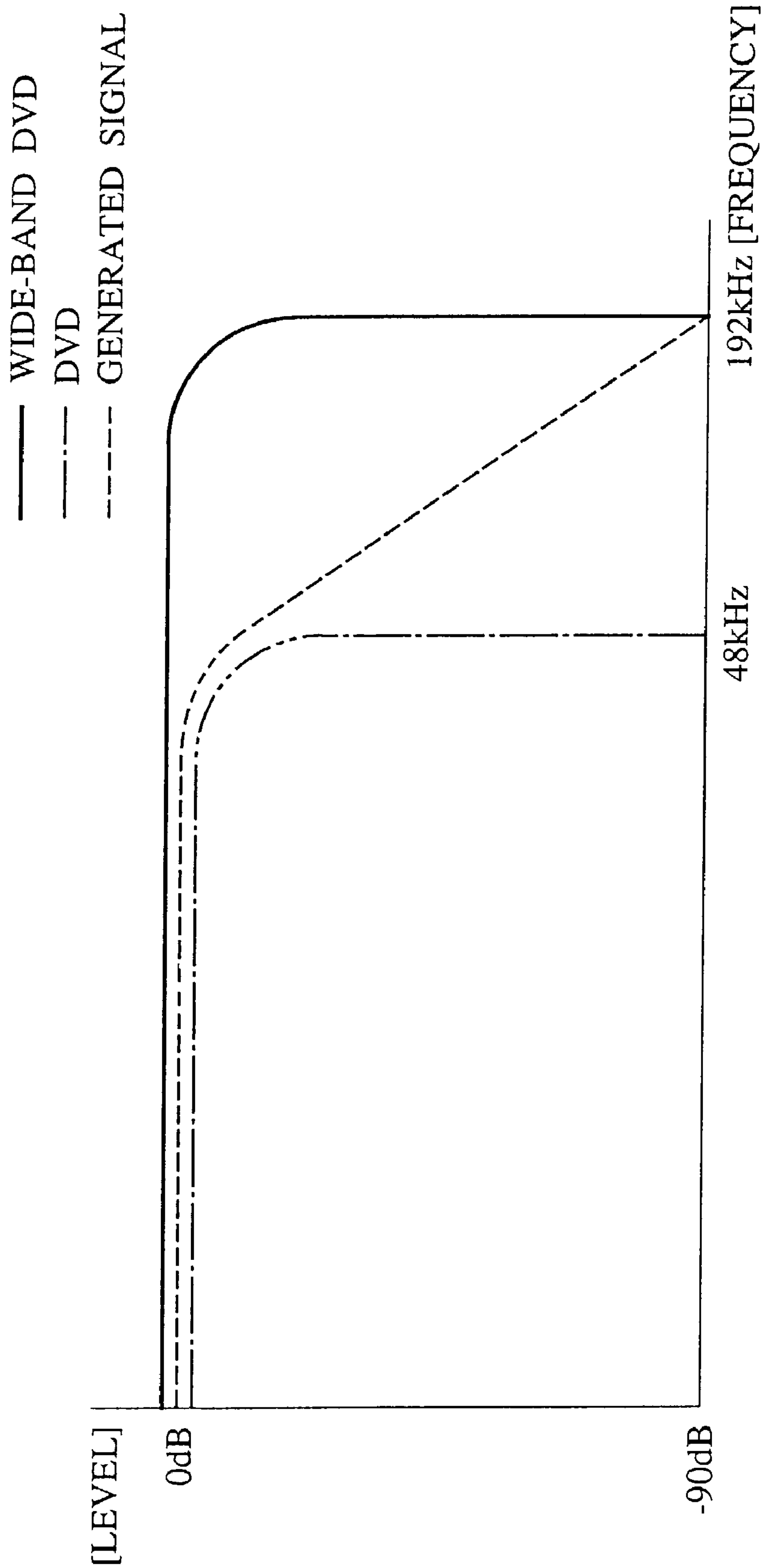
FIG. 15 is a graph showing the frequency band of audio data to which harmonic is added by the audio processing apparatus for DVD player according to the fifth embodiment.

As described above, in the audio processing apparatus for a DVD player according to the fifth embodiment, 96 kHz audio data is added with a harmonic component to be output, or 96 kHz audio data is converted into audio data having a sampling frequency of 192 kHz, and the 192 kHz audio data can be added with a harmonic component to be output. For this reason, when data processing for adding a harmonic component to 96 kHz audio data is performed to DVD audio data indicated by an alternate long and short dash line in FIG. 15, a high band can be emphasized as indicated by a dotted line in FIG. 15. When data processing for converting 96 kHz audio data into 192 kHz audio data and adding a harmonic component to the 192 kHz audio data is performed, a high band can be more emphasized up to 192 kHz as indicated by a solid line in FIG. 15. Therefore, when the audio signal subjected to the data processing is supplied to a loudspeaker device, music or the like can be enjoyed with a more rich sense, and like effect as that of each of the above embodiments can be obtained.

In the description of the fifth embodiment, the sampling rate conversion circuit 40 and the change-over switch 65 are arranged to selectively make it possible to perform data processing of audio data having a sampling frequency of 96 kHz and data processing of audio data having a sampling frequency of 192 kHz. However, the sampling rate conversion circuit 40 and the change-over switch 65 may be omitted. In this manner, as patterns stored in the pattern detection circuit 25 of the harmonic generation circuit 11, only the 1fs pattern to the 10fs pattern and the special pattern which are described by using FIG. 11 may be used. In -addition, the drive frequency in the D/A converter 50 can be set to be only a drive frequency corresponding to 96 kHz, and after the arrangement can be simplified, the high band can be emphasized.

Finally, in the description of each of the above embodiments, the audio information processing apparatus, the audio information processing method, and the method of recording audio information on a recording medium according to the present invention are applied a remaster apparatus for converting audio data for a compact disk into audio data for a digital video disk to remaster the resultant audio data, an audio processing apparatus for a CD player, or an audio processing apparatus for a DVD player. However, the present invention can be applied to not only the above apparatuses but also a remaster apparatus for converting audio data for a compact disk into audio data for a digital audio tape (DAT) having a sampling frequency of 48 kHz to remaster the resultant data. In this manner, the present invention can be any apparatus for converting audio data having a narrow frequency band into audio frequency having a wide frequency band.

In the description of the above embodiments, actual numeral values such as 44.1 kHz, 96 kHz, and 192 kHz as sampling frequencies and 16 bits and 24 bits as bit rates of audio data. However, these numeral values are only examples for making the description of the embodiments of the present invention easy. For this reason, the present invention is not limited to the actual numeral values or the embodiments which only examples, and various changes of the invention can be effected depending on design or the like without departing from the spirit and scope of the invention.

Preferable embodiments of a code information processing method, a code information processing apparatus, and a method of recording code information on a recording medium will be described below with reference to the accompanying drawings.

The code information processing method, the code information processing apparatus, and the method of recording code information on a recording medium according to the present invention can be applied to a remaster apparatus for extending the frequency band of audio data reproduced from, e.g., a compact disk to remaster the resultant audio data on a digital video disk.

Figure 16:
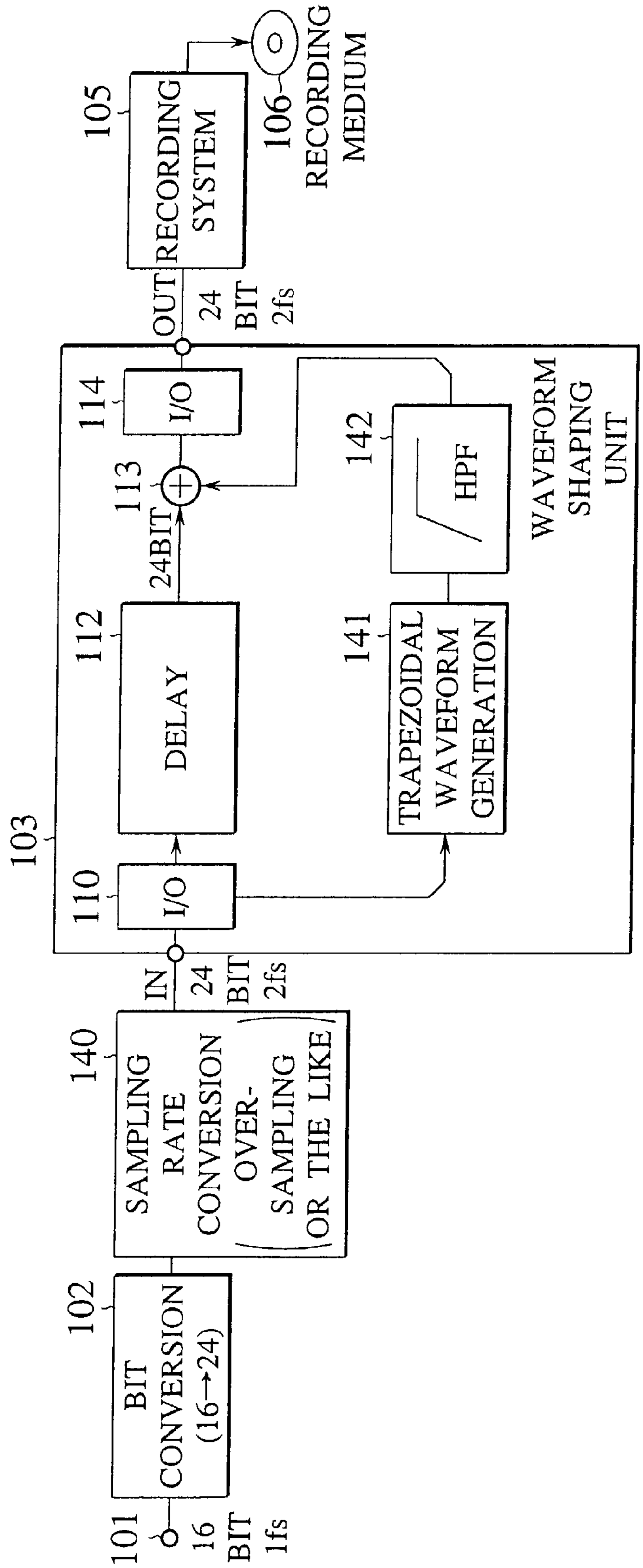
FIG. 16 is a block diagram showing a remaster apparatus according to the sixth to ninth embodiments to which a code information processing method, a code information processing apparatus, and a method of recording code information on a recording medium according to the present invention is applied.

A remaster apparatus according to the sixth embodiment of the present invention has, as shown in FIG. 16, an input terminal 101 to which 16-bit audio data formed by performing a sampling process at a sampling frequency of 44.1 kHz is supplied, a bit conversion circuit 102 for bit-converting the 16-bit audio data into 24-bit audio data, a sampling rate conversion circuit 140 for converting a sampling frequency into 96 kHz on the basis of the 24-bit audio data, a waveform shaping unit 103 for forming harmonic data on the basis of the audio data whose sampling rate is converted and performing an addition process for adding the harmonic to the original 24-bit audio data to design extension of the frequency band, and a recording system 105 for recording the 24-bit audio data whose frequency band is extended on a recording medium 106 such as a digital video disk.

Although the sampling rate conversion circuit 140 may convert a sampling frequency into any sampling frequency if the sampling frequency is 44.1 kHz or more, e.g., a sampling frequency of 88.2 kHz, the sampling rate conversion circuit 140 is designed to perform sampling frequency conversion into 96 kHz including over-sampling conversion, for example. When 20-bit audio data formed by performing a sampling process at a sampling frequency of 48 kHz is supplied to the input terminal 101, the 20-bit audio data is bit-converted into 24-bit audio data by the bit conversion circuit 102, and the sampling frequency is converted into a sampling frequency of 96 kHz by the sampling rate conversion circuit 140 on the basis of 20-bit audio data.

The waveform shaping unit 103 has an I/O port 110 for only receiving 24-bit audio data from the sampling rate conversion circuit 140, a trapezoidal waveform generation circuit 141 for generating data having an almost trapezoidal shape (to be referred to as a trapezoidal waveform data hereinafter) from the audio data serving as 24-bit waveform data by a manner (to be described later), a high-pass filter (HPF) 142 for extracting harmonic component from the trapezoidal waveform data, a delay circuit 112 for performing delay corresponding to a time required for the trapezoidal data generation process in the trapezoidal waveform generation circuit 141 and the harmonic component extracting process in the high-pass filter 142 to the audio data supplied through the I/O port 110, an adder 113 for performing an addition process for adding the harmonic data from the high-pass filter 142 to the audio data from the delay circuit 112 to form audio data whose frequency band is extended, and an I/O port 114 for outputting the audio data from the adder 113.

Figure 17:
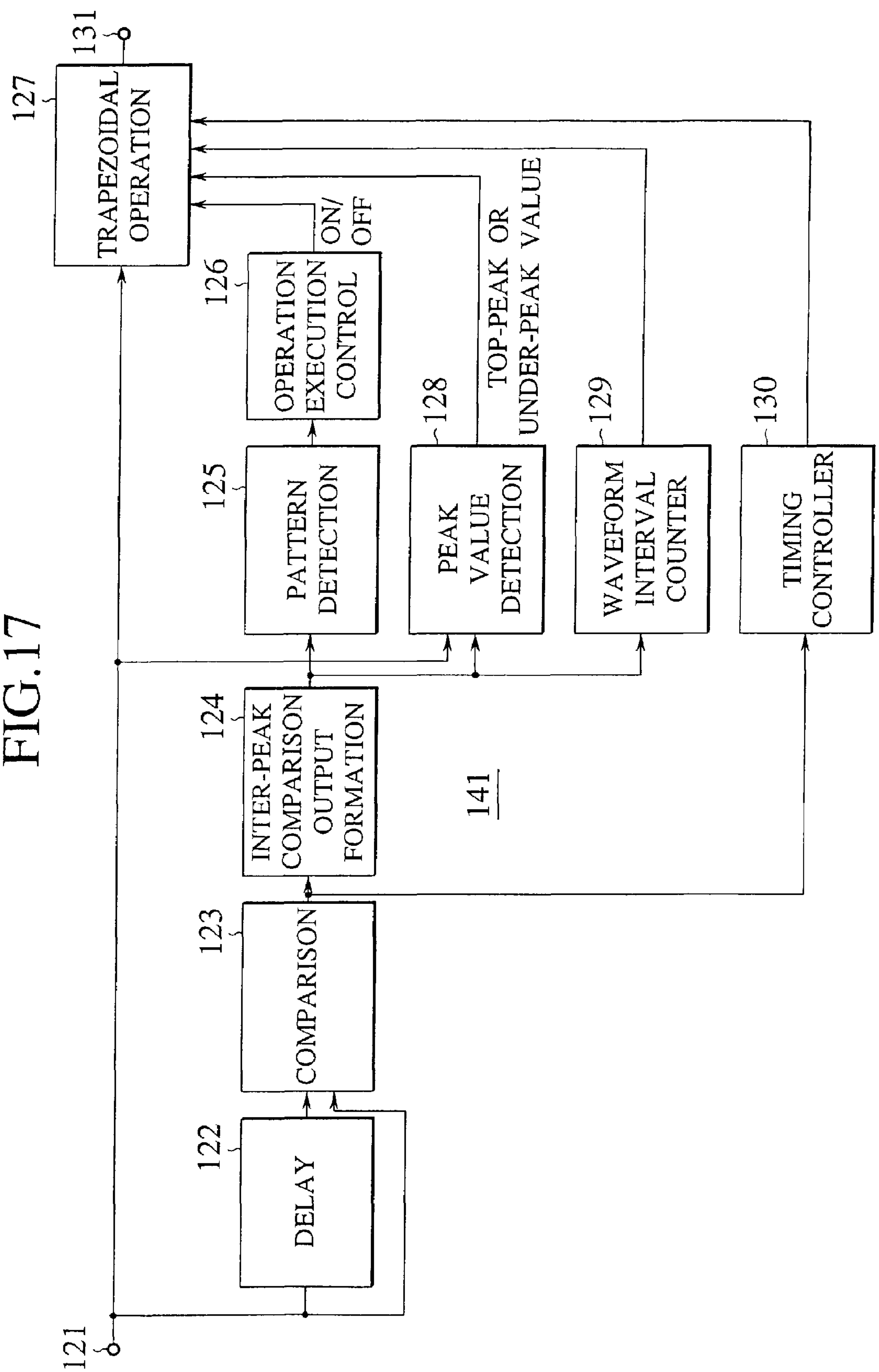
FIG. 17 is a block diagram showing a trapezoidal waveform generation circuit arranged in the remaster apparatus according to the sixth to ninth embodiments.

The trapezoidal waveform generation circuit 141 has the arrangement shown in FIG. 17, and has an input terminal 121 to which 24-bit audio data received through the I/O port 110 is supplied, a delay circuit 122 for performing delay corresponding to one sample to the audio data, a comparison circuit 123 for comparing the level of current audio data supplied through the input terminal 121 with the level of the audio data subjected to delay corresponding to one sample by the delay circuit 122, and an inter-peak comparison output forming circuit 124 for outputting a comparison output every sample cycle between top-peaks and under-peaks of the waveform of audio data and a comparison output every sample cycle between the under-peaks and the top-peaks on the basis of the comparison output from the comparison circuit 123.

The trapezoidal waveform generation circuit 141 has a timing controller 130 for performing switching selection control in a trapezoidal operation (will be described later) in a trapezoidal operation circuit 127 on the post-stage on the basis of the comparison output from the comparison circuit 123, a pattern detection circuit 125 for detecting whether an inter-peak comparison output from the inter-peak comparison output forming circuit 124 is a pre-stored "1fs pattern" (to be described later) or another pattern, an operation execution control circuit 126 for controlling whether a trapezoidal operation in the trapezoidal operation circuit 127 on the post-stage (or whether data generated by a trapezoidal operation is used or not) on the basis of a detection output from the pattern detection circuit 125, a peak value detection circuit 128 for detecting an under-peak and a top-peak and detecting the peak values (levels) from the audio data on the basis of the inter-peak comparison output from the inter-peak comparison output forming circuit 124, a waveform interval counter 129 for measuring a waveform interval, i.e., an interval between the peaks on the basis of the inter-peak comparison output from the inter-peak comparison output forming circuit 124 by the same manner as described above, and a trapezoidal operation circuit 127 for performing an operation of generating trapezoidal waveform data (to be described later) to audio data supplied from the input terminal 121 on the basis of signals from the operation execution control circuit 126, the peak value detection circuit 128, the waveform interval counter 129, and the timing controller 130. The above symbol fs denotes a sample cycle.

More specifically, the remaster apparatus supplies the trapezoidal waveform data generated by the trapezoidal waveform generation circuit 141 shown in FIG. 17 to the high-pass filter 142 shown in FIG. 16 to extract a harmonic component, and supplies the harmonic component data to the adder 113 in FIG. 16 to perform an addition-subtraction process for adding/subtracting the harmonic component data to 24-bit audio data from the delay circuit 112. The 24-bit audio data is added with the harmonic component (extended in frequency band) to record the resultant audio data.

A series of operations performed from formation of audio data added with harmonic to recording of the audio data on a recording medium in the remaster apparatus according to the sixth embodiment having the above arrangement will be described below.

In the remaster apparatus, 16-bit audio data sampled at the sampling frequency of 44.1 kHz and supplied to the input terminal 101 is converted into data having a bit rate of 24 bits by the bit conversion circuit 102. The resultant data is converted into data having a sampling frequency of 96 kHz by the sampling rate conversion circuit 140, and the 96 kHz data is supplied to the waveform shaping unit 103. The audio data is actually constituted by sample data formed by sampling a waveform signal. However, in the following description, in order to make the concept easy, the audio data is expressed as data corresponding to the waveform shown in, e.g., FIG. 18.

The audio data supplied to the waveform shaping unit 103 is supplied to the input terminal 121 of the trapezoidal waveform generation circuit 141 shown in FIG. 17 through the I/O port 110. The audio data supplied through the input terminal 121 shown in FIG. 17 is supplied to the trapezoidal operation circuit 127 (to be described later) and then supplied to the comparison circuit 123 and the delay circuit 122.

The audio data supplied to the delay circuit 122 is delayed by 101 samples to be supplied to the comparison circuit 123. In the comparison circuit 123, current audio data directly supplied from the input terminal 121 is compared with audio data delayed by one sample by the delay circuit 122 to output the comparison result.

That is, supplied audio data is compared with audio data of a before sample every sample. If the sample value of the current audio data is larger than that of the audio data of the before sample, "0" is output as a comparison output; otherwise, "1" is output as a comparison output. More specifically, by the comparison in the comparison circuit 123, from audio data corresponding to the waveform shown in FIG. 18, a comparison output of "0" or "1" arranged at intervals corresponding to one sample cycle as shown in FIG. 19(*b*) can be obtained. The waveform in FIG. 19(*a*) is the same as the waveform in FIG. 18.

In this comparison, the current audio data has a sample value equal to that of the audio data of the before sample. In this case, the comparison circuit 123 compares the current audio data with audio data of a second before sample. If these audio data have the same sample value, comparison is sequentially performed by using past sample values such that the current audio data is compared with the audio data of a third before sample. When nine audio data each having the same sample value continue, this indicates a blank. For this reason, the comparison circuit 123 continuously performs the comparison. When the sample value changes, if the audio data of a sample obtained at the change in sample value is larger than the current audio data, "0" is output as the comparison output; otherwise, "1" is output as the comparison output.

A comparison output from the comparison circuit 123 is supplied to the inter-peak comparison output forming circuit 124 and the timing controller 130.

In the inter-peak comparison output forming circuit 124, a comparison output between a top-peak and an under-peak of audio data and a comparison output between the under-peak and the top-peak are detected, and the comparison outputs between peaks are supplied as inter-peak comparison outputs to the arrangement of the post-stage.

Here, as is apparent from FIGS. 19(*a*) and (*b*), when a comparison output from the comparison circuit 123 changes from "0" to "1", audio data corresponding to a comparison output of "0" before the comparison output of "1" represents a "top-peak". Similarly, when a comparison output from the comparison circuit 123 changes from "1" to "0", audio data corresponding to a comparison output of "1" before the comparison output of "0" represents a "under-peak". Reference symbols A, C, E, and G in FIG. 19(*a*) denote under-peaks, and reference symbols B, D, F, and H denote top-peaks.

For this reason, the inter-peak comparison output forming circuit 124 uses comparison outputs obtained from a change point of a comparison output from the comparison circuit 123 to the next change point (point where "0" is changed into "1" or "0" is changed into "0") as inter-peak comparison outputs between a top-peak and an under-peak which are adjacent to each other. This will be concretely described below with reference to FIG. 19. In the inter-peak comparison output forming circuit 124, "0, 0, 0, 0" which is a comparison output between an under-peak A and a top-peak B which are adjacent to each other is used as an inter-peak comparison output between the under-peak A and the top-peak B; and "1, 1, 1" which is a comparison output between the top-peak B and an under-peak C which are adjacent to each other is used as an inter-peak comparison output between the top-peak B and the under-peak C. Similarly, a comparison output of "0, 0, 0, 0, 0" is used as an inter-peak comparison output between the under-peak C and a top-peak D: a comparison output of "1, 1, 1, 1, 1, 1" is used as an inter-peak comparison output between the top-peak D and an under-peak E; a comparison output of "0, 0, 0, 0" is used as an inter-peak comparison output between the under-peak E and a top-peak F; a comparison output of "1, 1, 1" is used as an inter-peak comparison output between the top-peak F and an under-peak G; and a comparison output of "0" is used as an inter-peak comparison output between the under-peak G and a top-peak H.

An inter-peak comparison output from the inter-peak comparison output forming circuit 124 is supplied to the pattern detection circuit 125, the peak value detection circuit 128, and the waveform interval counter 129.

In the pattern detection circuit 125, a pre-stored data pattern is compared the supplied inter-peak comparison output to check whether the inter-peak comparison output corresponds to the pre-stored data pattern.

More specifically, the pattern detection circuit 125 stores at least the data of a "1fs pattern" representing that an inter-peak comparison output between a top-peak and an under-peak has one sample, i.e., "1" or "0" to detect whether the inter-peak comparison output from the inter-peak comparison output forming circuit 124 corresponds to the "1fs pattern" or another pattern. In FIG. 19, an inter-peak comparison output between the under-peak G and the top-peak H corresponds to the "1fs pattern". In this manner, the pattern detection circuit 125 checks whether the inter-peak comparison output is a "1fs pattern" or another pattern for the following reason. That is, although the details will be described later, a trapezoidal waveform operation on the post-stage is performed only when the inter-peak comparison output is a data pattern except for the "1fs pattern", and the trapezoidal waveform data operation is not performed (or trapezoidal waveform data is not used) when the inter-peak comparison output is the "1fs pattern".

When the "1fs pattern" is detected in the pattern detection circuit 125, or when a pattern except for the "1fs pattern" is detected, the pattern detection circuit 125 supplies the detection output to the operation execution control circuit 126.

The operation execution-control circuit 126 generates an operation execution control signal (ON/OFF signal) for designating whether a trapezoidal waveform data operation (to be described later) in the trapezoidal operation circuit 127 of the post-stage is executed or not (or trapezoidal waveform data is used or not) on the basis of the detection result from the pattern detection circuit 125. More specifically, the operation execution control circuit 126 makes a designation that the trapezoidal waveform data operation (to be described later) in the trapezoidal operation circuit 127 is not executed (or trapezoidal waveform data is not used) when the pattern detection circuit 125 detects the "1fs pattern". In contrast to this, when a pattern except for the "1fs pattern" is detected, the operation execution control circuit 126 generates an operation execution control signal (ON/OFF signal) for designating that the trapezoidal waveform data operation is executed (or trapezoidal waveform data is used) in the trapezoidal operation circuit 127.

In the peak value detection circuit 128, an under-peak and a top-peak are detected on the basis of an inter-peak comparison output from the inter-peak comparison output forming circuit 124, and peak values (levels) corresponding to the detected peaks are calculated from, e.g., audio data. More specifically, in the peak value detection circuit 128, a top-peak and an under-peak are detected from a comparison output of "0" immediately before a change point where the inter-peak comparison output changes from "0" to "1" or a comparison output of "1" immediately before a change point where the inter-peak comparison output changes from "1" to "0", and levels (peak values) of audio data corresponding to the top-peak and the under-peak are calculated from audio data from the input terminal 121 to be output. In the peak value detection circuit 128 in FIG. 17, the under-peak and the top-peak are detected by using the inter-peak comparison output. However, under-peaks and top-peaks may be detected in the following manner. That is, the under-peaks A, C, E, G, . . . shown in FIG. 19 can also be detected, and the top-peaks B, D, F, H, . . . can also be detected. The peak values (levels) of the under-peak and the top-peak calculated by the peak value detection circuit 128 are supplied to the trapezoidal operation circuit 127.

In the waveform interval counter 129, a waveform interval is measured on the basis of an inter-peak comparison output from the inter-peak comparison output forming circuit 124. More specifically, in the waveform interval counter 129, the number of comparison outputs up to a change point where the value of the inter-peak comparison output from the inter-peak comparison output forming circuit 124 changes from "0" to "1" or the number of comparison outputs up to the value changes from "1" to "0" is measured, in other words, an interval between a top-peak and the next under-peak and an interval between the under-peak and the next top-peak are measured. As shown in FIG. 19(*c*), an interval between an under-peak A and a top-peak B corresponds to four sample cycles (4fs), an interval between the top-peak B and an under-peak C corresponds to three sample cycles (3fs), an interval between the under-peak C and a top-peak D corresponds to five sample cycles (5fs), an interval between the top-peak D and an under-peak E corresponds to six sample cycles (6fs), an interval between the under-peak E and a top-peak F corresponds to four sample cycles (4fs), an interval between the top-peak F and an under-peak G corresponds to three sample cycles (3fs), and an interval between the under-peak G and a top-peak H corresponds to one sample cycles (1fs). In the waveform interval counter 129 in FIG. 17, an waveform interval between an under-peak and a top-peak is measured from an inter-peak comparison output from the inter-peak comparison output forming circuit 124. As another example, an interval between an under-peak and a top-peak can also be measured on the basis of a change point where a comparison output from the comparison circuit 123 changes. A waveform interval signal from the waveform interval counter 129 is supplied to the trapezoidal operation circuit 127.

The timing controller 130 generates a timing control 30. signal for switching selection control used in a trapezoidal waveform data operation (to be described later) in the trapezoidal operation circuit 127 on the basis of a comparison output from the comparison circuit 123. More specifically, in the timing controller 130, for a trapezoidal operation data 35 operation in the trapezoidal operation circuit 127 of the post-stage, as shown in FIG. 19(*c*), timing control signals corresponding to timings Ta, Tb, Tc, Td, Te, . . . of under-peaks and top-peaks based on the change point where the comparison output from the comparison circuit 123 changes are generated to be supplied to the trapezoidal operation circuit 127.

In the trapezoidal operation circuit 127, on the basis of the operation execution control signal (ON/OFF signal) from the operation execution control circuit 126, the peak values of a top-peak and an under-peak from the peak value detection circuit 128, a waveform interval signal from the waveform interval counter 129, and a timing control signal from the timing controller 130, an operation for generating trapezoidal waveform data (to be described later) is performed. Although details will be described later, audio data supplied from the input terminal 121 to the trapezoidal operation circuit 127 is used when a "1fs pattern" is detected in the pattern detection circuit 125.

The detailed arrangement and operation of the trapezoidal operation circuit 127 will be described below.

Figure 20:
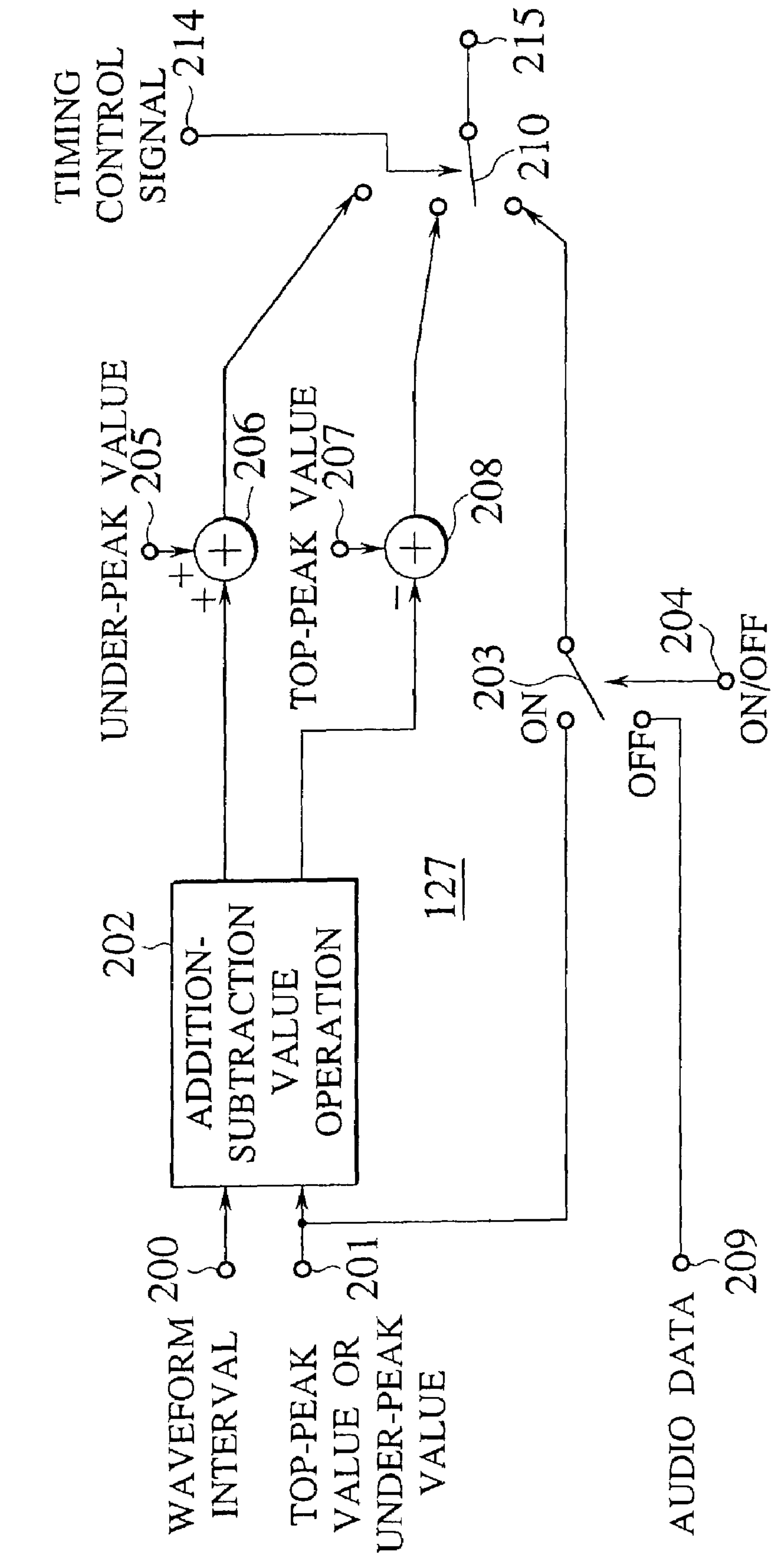
FIG. 20 is a block diagram showing the concrete arrangement of a trapezoidal waveform generation circuit shown in FIG. 17.

The trapezoidal operation circuit 127 has the arrangement shown in FIG. 20, and has, although the details of the following elements will be described later, a terminal 200 to which a waveform interval signal from the waveform interval counter 129 is supplied, a terminal 201 to which the peak values of a top-peak and an under-peak from the peak value detection circuit 128 are supplied, a terminal 205 to which the peak value of the under-peak from the peak value detection circuit 128 is supplied, a terminal 207 to which the peak value of the top-peak is supplied, a terminal 209 to which audio data from the input terminal 121 in FIG. 17 is supplied, a terminal 204 to which an operation execution control signal (ON/OFF signal) from the operation execution control circuit 126 is supplied, and a terminal 214 to which a timing control signal from the timing controller 130.

The trapezoidal operation circuit 127 has an addition-subtraction value operation circuit 202 for calculating an addition-subtraction value for generating trapezoidal waveform data (to be described later) by adding/subtracting the peak value of the top-peak or the under-peak by using the peak value of the top-peak or the under-peak from the terminal 201 and the waveform interval signal from the terminal 200, a change-over switch 203 ON/OFF-controlled by the operation execution control signal from the terminal 204, an adder 206 for adding the addition-subtraction value (addition value for an under-peak) generated by the addition-subtraction value operation circuit 202 to the peak value of the under-peak from the terminal 205, and an adder 208 for adding the addition-subtraction value generated by the addition-subtraction value operation circuit 202 to the peak value of the top-peak from the terminal 207 (subtraction value is added to the peak value of the top-peak, i.e., subtraction is performed).

The trapezoidal operation circuit 127 also comprises a change-over selection switch 210 for selectively switching the peak value of the top-peak or the under-peak supplied from the terminal 201 through the change-over switch 203, audio data from the terminal 209, an addition output from the adder 206, and an addition output from the terminal 207 on the basis of a timing control signal supplied from the terminal 214.

In the trapezoidal operation circuit 127 having the above arrangement, the addition-subtraction value operation circuit 202 calculates a point corresponding to after and before one-sample cycles (±1fs) of a sample point of a top-peak and an under-peak on the basis of the waveform interval signal and the peak values of the top-peak and the under-peak, and sets the levels of the ±1fs points to be the peak value (level) of the top-peak and the under-peak. The addition-subtraction value operation circuit 202 connects the point of the after one-sample cycle (+1fs) at the before peak of adjacent peaks on time base to the point of the before one-sample cycle (−1fs) at the after peak with a straight line to calculate an addition-subtraction value corresponding to the inclination of the straight line by using an operation.

Figure 21:
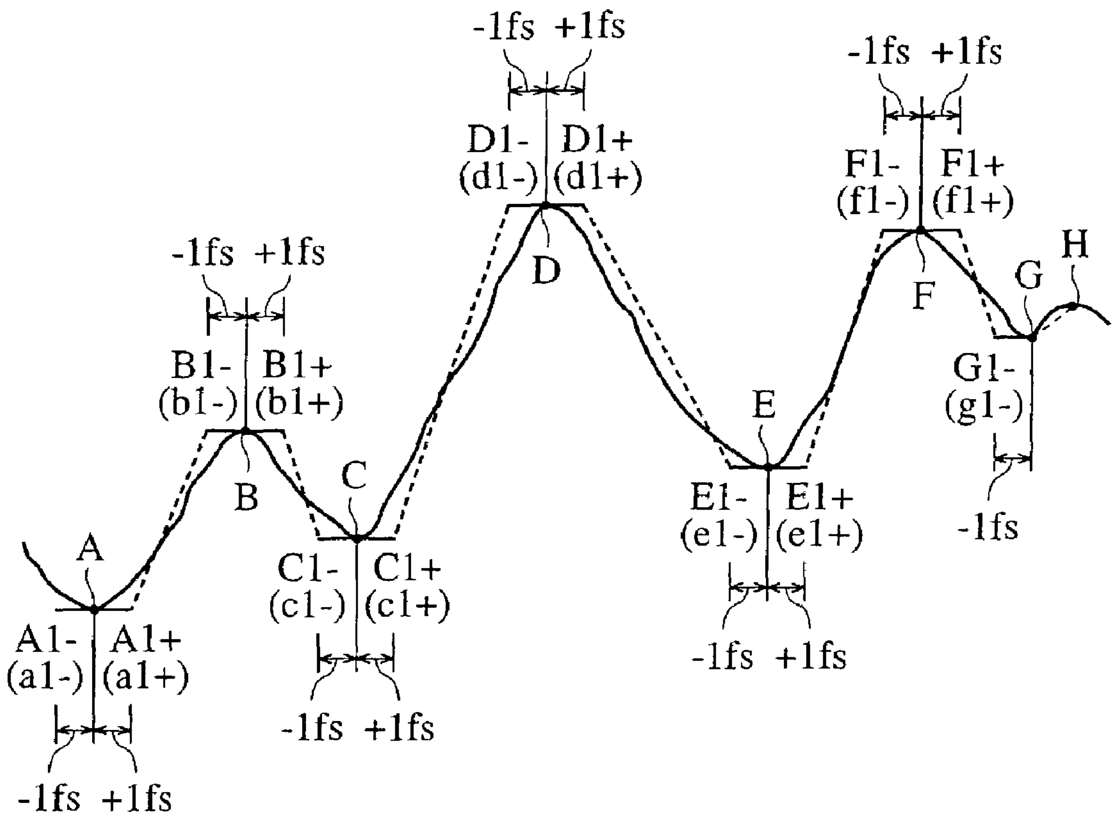
FIG. 21 is a view used for explaining an operation of generating trapezoidal waveform data from audio data.

The operation of the addition-subtraction value operation circuit 202 will be described below with reference to FIG. 21. With respect to the under-peak A, a point corresponding to the before one-sample cycle (−1fs) of the under-peak A is set to be A−, a point corresponding to the after one-sample cycle (+1fs) is set to be A+, the level of the point A− is set to be a−, and the level of the point A+ is set to be a+. The levels a− and a+ are set to be equal to the peak value level of the under-peak A. With respect to the top-peak B, points corresponding to the before and after one-sample cycles (±1fs) of the top-peak B are set to be B− and B+, and the levels of the points B− and B+ are set to be b− and b+ (the levels b− and b+ are equal to the peak value level of the top-peak B). With respect to the under-peak C, points corresponding to the before and after one-sample cycles (±1fs) of the under-peak C are set to be C− and C+, and the levels of the points C− and C+ are set to be c− and c+ (the levels c− and c+ are equal to the peak value level of the under-peak C). With respect to the top-peak D, points corresponding to the before and after one-sample cycles (±1fs) of the top-peak D are set to be B− and D+, and the levels of the points D− and D+ are set to be d− and d+ (the levels d− and d+ are equal to the peak value level of the top-peak D). Similarly, with respect to subsequent peaks such as the under-peak E and the top-peak F, the same process as described above is performed.

In the addition-subtraction value operation circuit 202, by using the point A− (level a−), the point A+ (level a+), the point B− (level b−), the point B+ (level b+), the point C− (level c−), the point C+ (level c+), . . . which are calculated as described above, of adjacent peaks on time base, an addition-subtraction corresponding to the inclination of a straight line for connecting the point of the after one-sample cycle (+1fs) at the before peak to the point of the before one-sample cycle (−1fs) at the after peak is calculated by an operation.

The operation of the addition-subtraction value operation circuit 202 at this time will be described below by using FIG. 21. Between the under-peak A and the top-peak B adjacent thereto, an addition-subtraction value corresponding to the inclination of the straight line obtained by connecting the point A+ (level a+) of the under-peak A and the point B− (level b−) of the top-peak B as indicated by a dotted line in FIG. 21 is calculated. The addition-subtraction calculated between the under-peak A and the top-peak B is output from the addition-subtraction value operation circuit 202 to the adder 206 as an addition value for the under-peak A. Between the top-peak B and the under-peak C adjacent thereto, an addition-subtraction value corresponding to the inclination of the straight line obtained by connecting the point B+ (level b+) of the top-peak B and the point C− (level c−) of the under-peak C as indicated by a dotted line in FIG. 21 is calculated. The addition-subtraction calculated between the top-peak B and the under-peak C is output from the addition-subtraction value operation circuit 202 to the adder 206 as a subtraction value for the top-peak B. Between the under-peak C and the top-peak D adjacent thereto, an addition-subtraction value corresponding to the inclination of the straight line obtained by connecting the point C+ (level c+) of the under-peak C and the point D− (level d−) of the top-peak D as indicated by a dotted line in FIG. 21 is calculated. The addition-subtraction calculated between the under-peak C and the top-peak D is output from the addition-subtraction value operation circuit 202 to the adder 206 as an addition value for the under-peak C. With respect to the subsequent peaks such as the under-peak E and the top-peak F, the same process as described above is performed.

The addition-subtraction value obtained by the above process is output from the addition-subtraction value operation circuit 202 to be supplied to the adder 206 and the adder 208. The peak value of the under-peak is supplied to the adder 206 through the terminal 205, and the peak value of the top-peak is supplied to the adder 208 through the terminal 207. Therefore, in the adder 206, an addition value corresponding to the under-peak from the addition-subtraction value operation circuit 202 is added to the peak value of the under-peak supplied from the terminal 205 every sample cycle. On the other hand, in the adder 208, a subtraction value corresponding to the top-peak from the addition-subtraction value operation circuit 202 is added to (i.e., subtracted from) the peak value of the top-peak supplied from the terminal 207 every sample cycle. Addition outputs from the adders 206 and 208 are supplied to the change-over selection switch 210.

The peak values of the top-peak or the under-peak supplied through the terminal 201 is also supplied to the change-over switch 203. The change-over switch 203 switchably outputs audio data supplied from the terminal 209 and the peak value of the top-peak or the under-peak in accordance with the operation execution control signal (ON/OFF signal). More specifically, the change-over switch 203 is switched to the side of the audio data from the terminal 209 by, e.g., before and after one-sample cycles of a peak at a timing at which the "1fs pattern" is detected when the operation execution control signal is an OFF signal corresponding to detection of the "1fs pattern". When the operation execution control signal is an ON signal corresponding to detection of a pattern except for the "1fs pattern", the change-over switch 203 is switched to the side of the top-peak or the under-peak from the terminal 201. An output from the change-over switch 203 is supplied to the change-over selection switch 210.

The change-over selection switch 210 selectively switches an output from the change-over switch 203, an addition output from the adder 206, and an addition output from the adder 208 on the basis of the timing control signal supplied from the terminal 214.

A switching selection operation of the change-over selection switch 210 based on the timing control signal when the operation execution control signal is an ON signal, i.e., when the change-over switch 203 is switched to the peak value side of the top-peak or the under-peak of the terminal 201 will be described below with reference to FIGS. 19 and 21. When the timing control signal represents a timing Ta of the under-peak A, the change-over selection switch 210 selects an output from the change-over switch 203 for only one sample cycle corresponding to the under-peak A. Thereafter, an addition output from the adder 206 is selected between the point −A of the after one-sample cycle (−1fs) of the under-peak A and the point +B of the before one-sample cycle (−1fs) of the next top-peak B. When the timing control signal represents a timing Tb of the top-peak B, the change-over selection switch 210 selects an output from the change-over switch 203 for only one sample cycle corresponding to the top-peak B. Thereafter, an addition output from the adder 208 is selected between the point −B of the after one-sample cycle (−1fs) of the top-peak B and the point +C of the before one-sample cycle (−1fs) of the next under-peak C. Similarly, when the timing control signal corresponds to the timing of the under-peak, an output from the change-over switch 203 is selected for one sample cycle corresponding to the under-peak. Thereafter, an addition output from the adder 206 is selected between the point of the after one-sample cycle (−1fs) of the under-peak and the point of the before one-sample cycle (−1fs) of the next top-peak. On the other hand, when the timing control signal corresponds to the timing of the top-peak, an output from the change-over switch 203 is selected for one sample cycle corresponding to the top-peak. Thereafter, an addition output from the adder 208 is selected between the point of the after one-sample cycle (−1fs) of the top-peak and the point of the before one-sample cycle (−1fs) of the next under-peak.

A switching selection operation of the change-over selection switch 210 based on the timing control signal when the operation execution control signal is an OFF signal, i.e., when the change-over switch 203 is switched to the audio data side of the terminal 209 is as follows. That is, audio data supplied through the change-over switch 203 is selected for only before and after one-sample cycles of the timing of an under-peak or a top-peak obtained by the timing control signal. More specifically, when a “1fs pattern” is detected by the pattern detection circuit 125, a peak value obtained when the “1fs pattern” is detected and audio data of the before and after one-sample cycles of the peak value are directly output from the change-over selection switch 210. In the example in FIG. 21, a pattern between the under-peak G and the under-peak G corresponds to a “1fs pattern”. In this case, the top-peak H serving as a peak value obtained when the “1fs pattern” is detected and audio data of the before and after one-sample cycles of the peak value are directly output. In this manner, the peak value obtained when the “1fs pattern” is detected and the audio data of the before and after one-sample cycles of the peak value are directly used for the following reason. That is, the peak value obtained when the pattern of the inter-peak comparison output is a “1fs pattern” and audio data of before and after one-sample cycles includes sufficiently high harmonic components.

Figure 18:
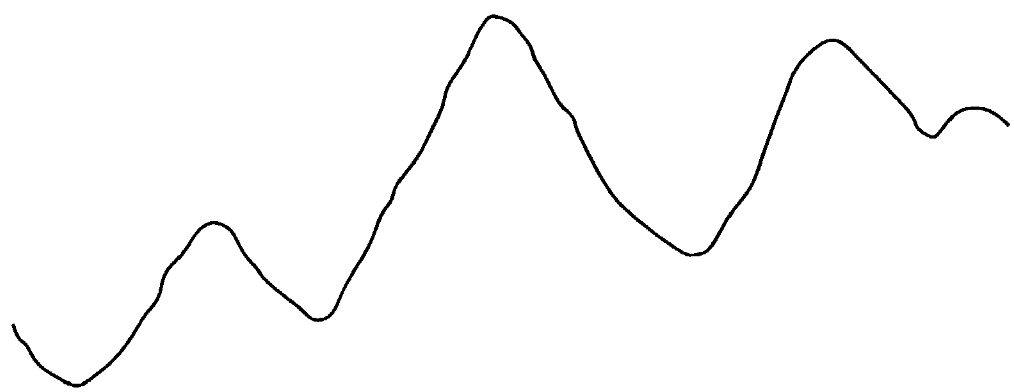
FIG. 18 is a waveform chart showing audio data input in the remaster apparatus as a waveform signal.
Figure 19:
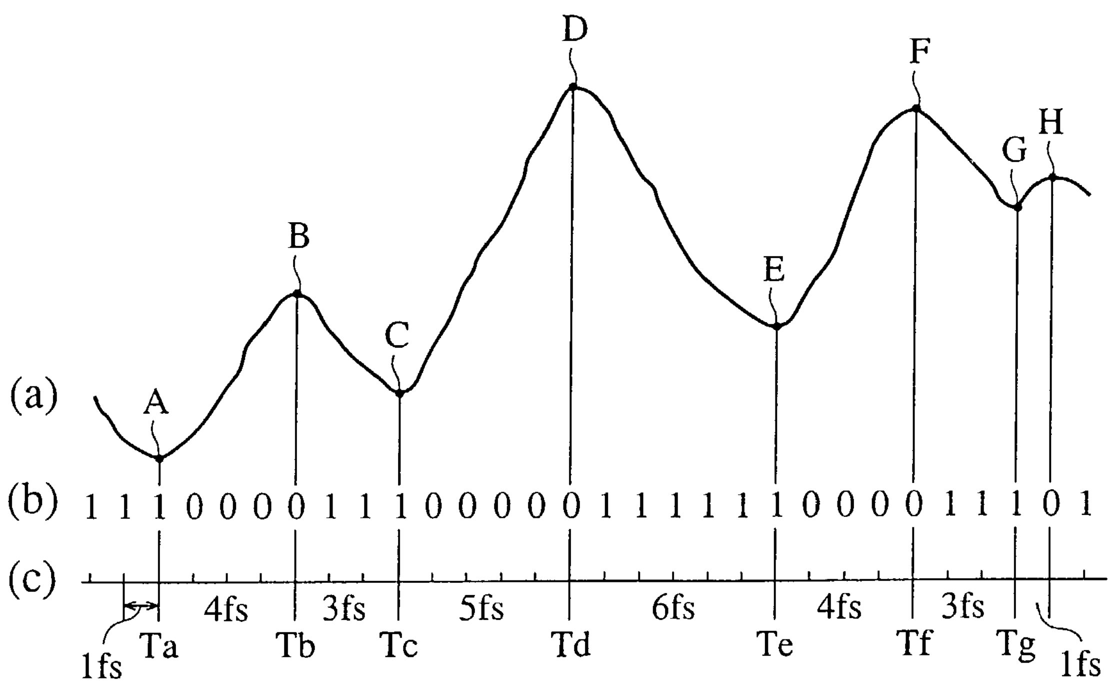
FIG. 19 is a view used for explaining a comparison output generated from audio data.
Figure 22:
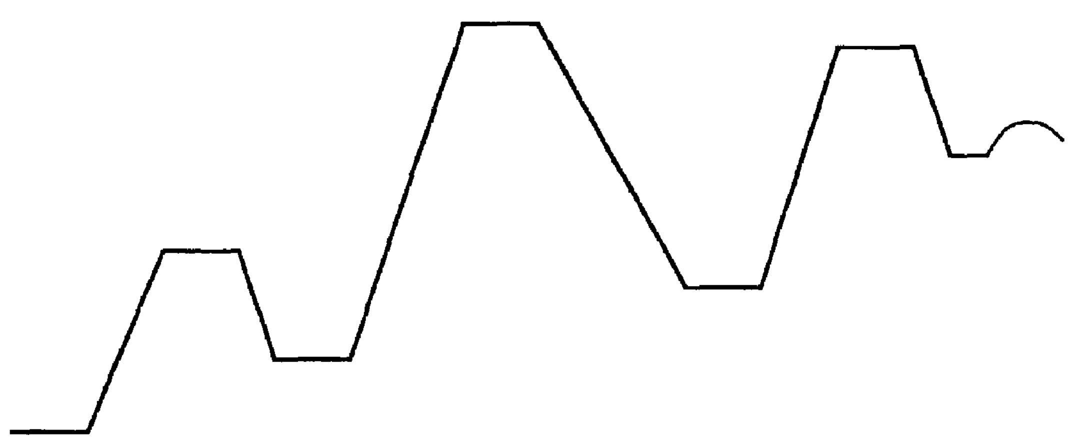
FIG. 22 is a view showing trapezoidal waveform data generated from audio data.

With the above arrangement and operation, in the trapezoidal operation circuit 127, waveform data having an almost trapezoidal shape in which the levels of a top-peak, an under-peak, and the points of the before and after one-sample cycles are constant are generated from audio data shown in FIG. 18, as shown in FIG. 22. The trapezoidal waveform data is output from an output terminal 215 in FIG. 20, and then supplied to the high-pass filter 142 in FIG. 16 through an output terminal 131 in FIG. 17.

The high-pass filter 142 is to extract a harmonic component from the trapezoidal waveform data. As in this embodiment, when a sampling frequency is converted into a sampling frequency of 96 kHz by the sampling rate conversion circuit 140, a harmonic component having 48 kHz or more is extracted from the trapezoidal waveform data by the high-pass filter 142. When a sampling frequency is converted into a sampling frequency of 88.2 kHz by the sampling rate conversion circuit 140, a harmonic component having 44.1 kHz or more is extracted from the trapezoidal waveform data by the high-pass filter 142. When an FIR (finite impulse response:non-recursive) filter is used as the high-pass filter 142, the number of taps of the filter is preferably set to be 30 or more. When an IIR (infinite impulse response:recursive) filter is used, the number of taps of the filter is preferably set to be 8 or more. With this arrangement, preferable filter characteristics can be obtained. In place of the high-pass filter, a band-pass filter which can extract a harmonic component similar to the above harmonic component (or which can remove components except for a harmonic component) may be used.

The harmonic component extracted from the trapezoidal waveform data in the high-pass filter 142 is supplied as 24-bit harmonic data to the adder 113 in FIG. 16.

Original 24-bit audio data supplied from the delay circuit 112 is supplied to the adder 113. Therefore, in the adder 113, the 24-bit harmonic data supplied from the high-pass filter 142 and the original 24-bit audio data are added to each other every sample. In this manner, harmonic is added to the original 24-bit audio data. More specifically, the frequency band of the original 24-bit audio data is extended.

The 24-bit audio data subjected to a waveform shaping process for extending (harmonic-adding) the frequency band as described above is supplied to the recording system 105 through the I/O port 114. The output audio data may be rounded, and the audio data may be output as, e.g., 20-bit audio data.

In the recording system 105 to which 24-bit audio data subjected to the waveform shaping process is supplied, the 24-bit audio data subjected to the waveform shaping process is recorded on the recording medium 106 such as a digital video disk.

Figure 1:
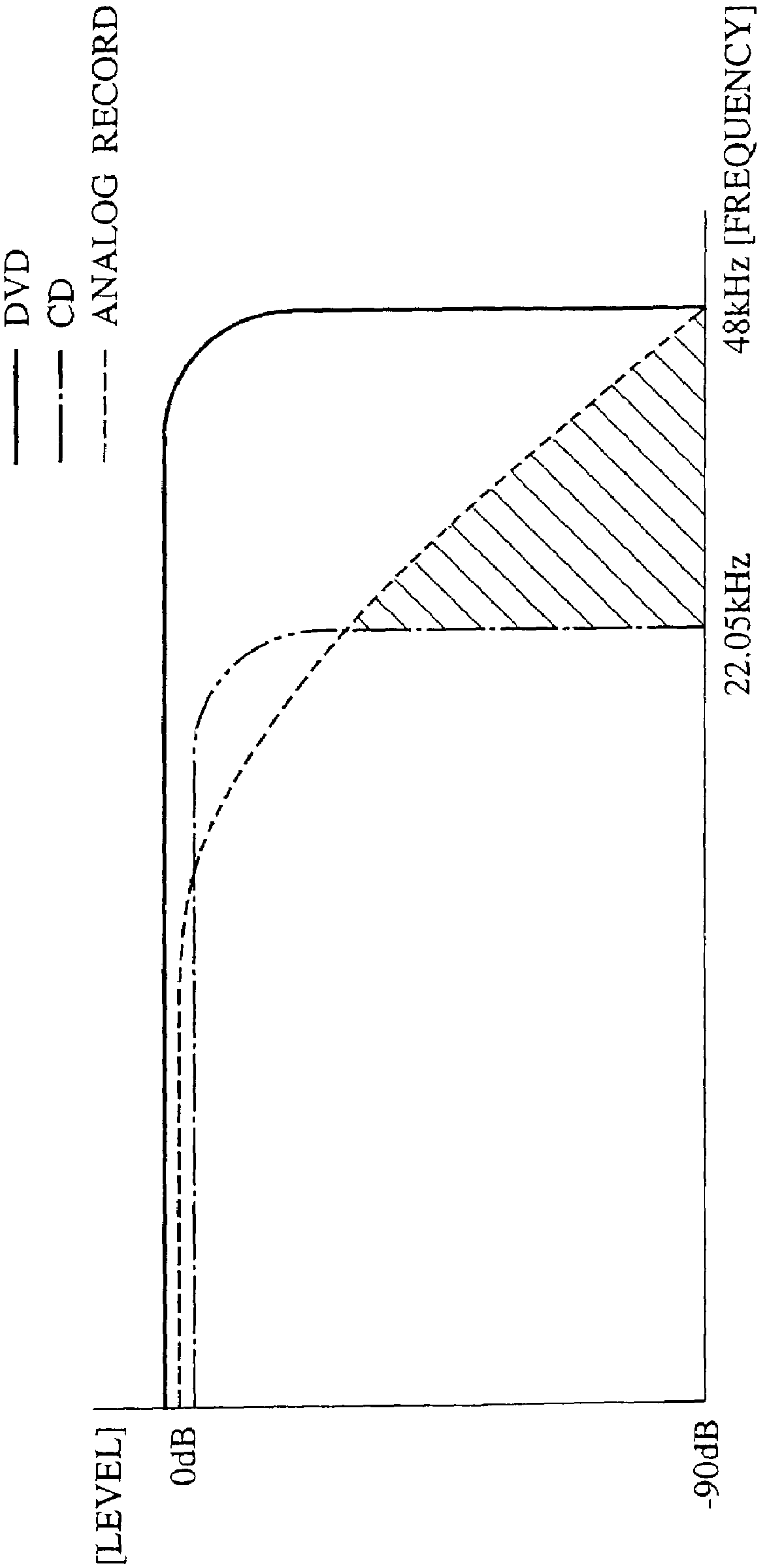
FIG. 1 is a graph for explaining frequency bands of an analog audio signal, audio data of a compact disk, and audio data of a digital video disk.

In this manner, in the remaster apparatus according to this embodiment, a harmonic component which is indicated by an oblique line in FIG. 1 and slight in 16-bit audio data reproduced from a compact disk is added to the 16-bit data to remaster the resultant data on a digital video disk.

As is apparent from the above description, the remaster apparatus according to the sixth embodiment of the present invention converts audio data for a compact disk into audio data for a digital video disk to remaster the resultant audio data on the digital video disk. For this reason, a cumbersome process of forming audio data for a digital video disk from a new analog audio signal can be omitted, and conventional audio data for a compact disk can be recycled.

In the waveform shaping unit 103, waveform shaping of the original audio data (formation of a harmonic component and synthesis between a harmonic component and audio data) is performed by using only generation of trapezoidal waveform data by an addition-subtraction process and filtering by a high-pass filter. For this reason, the waveform shaping can be performed without using a conversion table for a non-linear process, a differential circuit, a cube circuit, and the like which are required for conventional waveform shaping. Therefore, the circuit scale of the waveform shaping unit 103 can be reduced in size to make the chip size compact, and low cost, improvement of productivity, and high performance can be obtained. Since a compact and high-performance remaster apparatus can be provided at low price, the remaster apparatus can sufficiently cope with price buster and downsizing at present.

Figure 23:
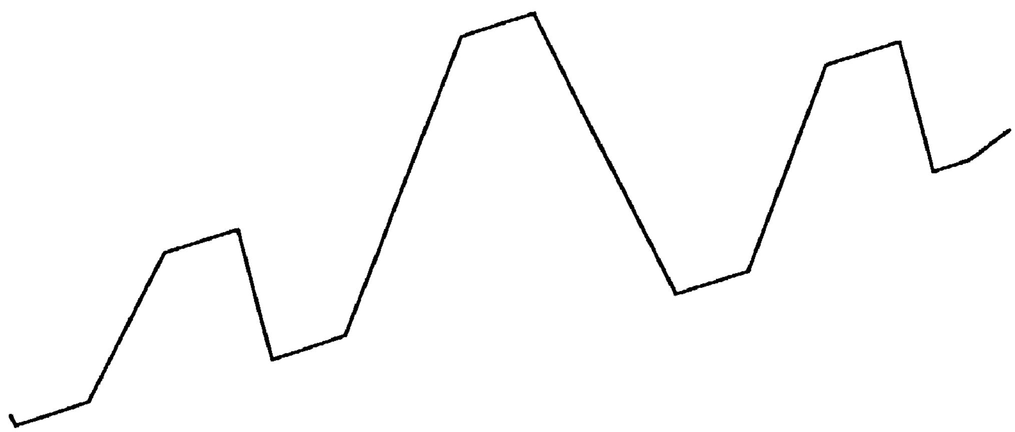
FIG. 23 is view showing waveform data having an almost trapezoid formed such that straight lines for connecting a top-peak, an under-peak, and points corresponding to before and after one-sample cycles are inclined.

A remaster apparatus according to the seventh embodiment of the present invention will be described below. In the seventh embodiment, since the remaster apparatus basically operates in the same manner as that of the remaster apparatus according to the sixth embodiment except for the operation in the addition-subtraction value operation circuit 202 shown in FIG. 20 in the trapezoidal waveform generation circuit 141, the arrangement of the remaster apparatus according to the seventh embodiment is not illustrated. In the trapezoidal operation circuit 127 in FIG. 17 and FIG. 20 of the remaster apparatus according to the sixth embodiment, as shown in FIGS. 21 and 22, trapezoidal waveform data in which a top-peak, an under-peak, and before and after one-sample cycles are set at a constant level (a level equal to a peak level). However, in the seventh embodiment, as shown in FIG. 23, waveform data having an almost trapezoidal shape in which straight lines for connecting the top-peak, the under-peak, and the before and after one-sample cycles are inclined is generated. The waveform data having an almost trapezoidal shape is also simply called a trapezoidal waveform data as in the sixth embodiment.

The trapezoidal operation circuit 127 for generating such waveform data having an almost trapezoidal shape as shown in FIG. 23 operates in the following manner. More specifically, in the addition-subtraction value operation circuit 202 of the trapezoidal operation circuit 127, on the basis of the peak values of the waveform interval signal, top-peaks, and under-peaks, as shown in FIG. 21, points corresponding to the before and after one-sample cycles (±1fs) of the peaks of the top-peaks or the under-peaks are calculated, and the levels of the +1fs points are made equal to the peak values of the corresponding top-peaks or the corresponding under-peaks. The arrangement up to this is the same as that in the sixth embodiment. Therefore, with respect to the under-peak A, a point A− corresponding to the before one-sample cycle (−1fs) of the under-peak A, a point A2+ corresponding to an after one-sample cycle (+1fs), a level a− of the point A−, and a level a+ of a point A+ are calculated. With respect to the top-peak B, points B− and B+ corresponding to the before and after one-sample cycles (+1fs) of the top-peak B and levels b− and b+ of the points B− and B+ are calculated. With respect to the under-peak C, points C− and C+ corresponding to the before and after one-sample cycles (+1fs) of the under-peak C and levels c− and c+ of the points C− and C+ are calculated. With respect to the peaks subsequent to the top-peak D, the under-peak E, and the top-peak F, the same process as described above is performed.

Figure 24:
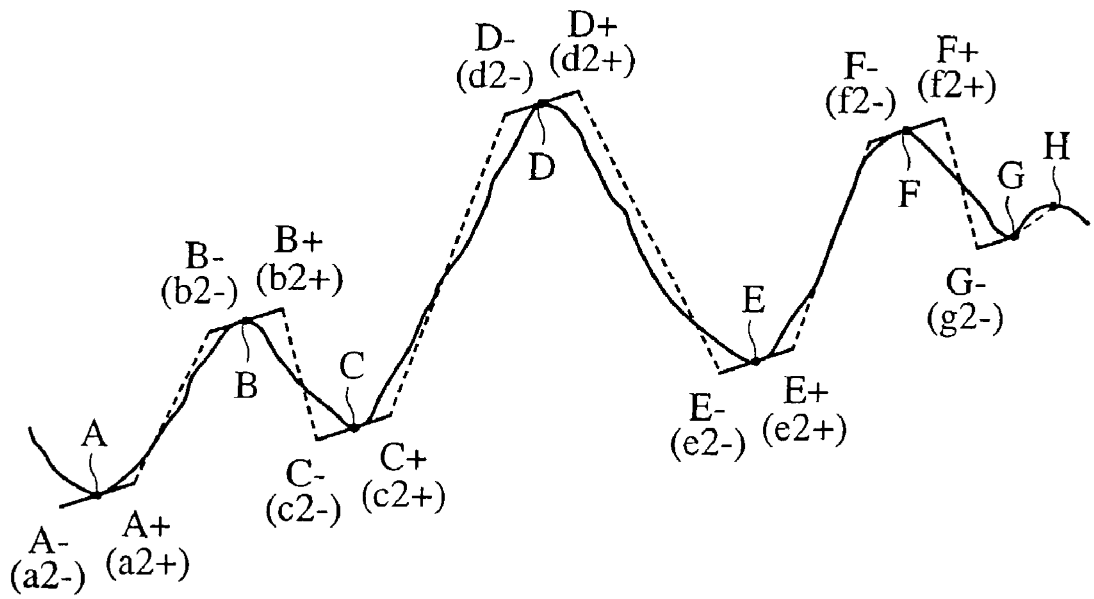
FIG. 24 is a view for explaining an operation of generating the trapezoidal waveform data.

Here, in the addition-subtraction value operation circuit 202 according to the seventh embodiment, a predetermined level is subtracted from the level a− of the point A− of the before and after one-sample cycles of the under-peak A, and a predetermined level is added to the level a+ of the point A+. In this manner, as shown in FIG. 24, a level a2− and a level a2+ are calculated. As a concrete example of the process of calculating the level a2− by subtracting a predetermined level from the level a− of the point A+, a process of subtracting 1 from the LSB (least significant bit) of sample data representing the level a− to calculate the level a2− can be used. As a concrete example of the process of calculating a level a2+ by adding a predetermined level to the level a+, a process of adding 1 to the LSB of sample data representing the level a+ to calculate the level a2+ can be used. As a matter of course, an addition-subtraction value for the sample data representing the level a− or the level a+ is not limited to 1, a value of 1 or more may be used. Similarly, a level b2− is calculated by subtracting a predetermined level from the level b− of the point B− of the before and after one-sample cycles (±1fs) of the top-peak B (for example, subtracting 1 from the LSB of sample data), and a level b2+ is calculated by adding a predetermined level to the level b+ of the point B+ (for example, adding 1 to the LSB of sample data). With respect to the peaks subsequent to the under-peak C, the top-peak D, the under-peak E, and the top-peak F, a predetermined level is subtracted from the level of the point of the before one-sample cycle (−1fs) of each peak (1 is subtracted from the LSB of sample data), and a predetermined level is added to the level of the point of the after one-sample cycle (+1fs) of each peak (1 is added to the LSB of sample data, thereby calculating new levels.

The points of the before and after one-sample cycles (±1fs) and levels of the points are calculated, and a predetermined level is added to or subtracted from the levels of the ±1fs points to obtain new levels. Thereafter, as in the sixth embodiment described above, addition-subtraction values corresponding to the inclinations of straight lines for connecting the point of the after one-sample cycle (+1fs) to the before one-sample cycle (−1fs) of adjacent peaks are calculated, and these addition-subtraction values are added to or subtracted from the peak value of an under-peak or a top-peak by the adder 206 or 208 every sample cycle, so that almost trapezoidal waveform data as shown in FIG. 23 can be generated. The operation of the change-over switch 203 performed by the operation execution control signal and the operation of the change-over selection switch 210 performed by a timing control signal are the same as those in the sixth embodiment, and a description thereof will be omitted.

As in the seventh embodiment, by using trapezoidal waveform data as shown in FIG. 23, a problem that overshooting occurs in the trapezoidal waveform generation process corresponding to a clip process can be suppressed, and a disadvantage that unnecessary harmonic is generated can be prevented. For this reason, even if a harmonic-cut characteristic serving as a part of the filter characteristics of the high-pass filter 142 connected to the post-stage of the trapezoidal waveform generation circuit 141 is degraded, a preferable harmonic component can be extracted.

As is apparent from the above description, even in the remaster apparatus according to the seventh embodiment of the present invention, as in the sixth embodiment, harmonic of a treble part in the frequency band of audio data to be output or recorded can be emphasized, and the same effect as that of the remaster apparatus according to the sixth embodiment described above can be obtained.

According to the waveform shaping unit 103 of the remaster apparatus of the seventh embodiment, unnecessary harmonic can be prevented from being generated, and a low-price high-pass filter 142 having filter characteristics which are not high can be used. For this reason, the costs of the remaster apparatus as a whole can be reduced.

A remaster apparatus according to the eighth embodiment of the present invention will be described below. In the first and seventh embodiments, in the addition-subtraction value operation circuit 202, points corresponding to the before and after one-sample cycles (±1fs) of a top-peak or an under-peak and levels of the ±1fs points are calculated, and an addition-subtraction value corresponding to the inclination of a straight line for connecting the point of the after one-sample cycle (+1fs) of the before peak of adjacent peaks on time base to the point of the before one-sample cycle (−1fs) of the after peak is calculated. However, in the eighth embodiment, in an addition-subtraction value operation circuit 202, points corresponding to before and after n-sample cycles (±nfs, n is 2 or more) of a top-peak or an under-peak are calculated, and the levels of the ±nfs points are calculated in the same manner as that in the sixth or seventh embodiment, and an addition-subtraction value corresponding to the inclination of a straight line for connecting the point of the after n-sample cycle (+nfs) of the before peak of adjacent peaks on time base to the point of the before n-sample cycle (−nfs) of the after peak and an addition-subtraction value corresponding to the inclination of a straight line for connecting points corresponding to before and after n-sample cycles (+nfs) of the before peak of adjacent peaks on time base and an addition-subtraction corresponding to the inclination of a straight line for connecting points corresponding to the before and after n-sample cycles (±nfs) of the peaks are calculated. Since the eighth embodiment basically operates in the same manner as that in the sixth embodiment except for an operation in the trapezoidal waveform generation circuit 141, the arrangement of the remaster apparatus according to the eighth embodiment is not illustrated.

In the eighth embodiment, the pattern detection circuit 125 stores at least a plurality of pattern data for detecting that a continuous "1" or "0" of inter-peak comparison outputs between a top-peak and an under-peak has n or less samples to detect whether an inter-peak comparison output from the inter-peak comparison output forming circuit 124 corresponds to one of pre-stored pattern data or not. More specifically, when n is 2, the pattern detection circuit 125 pre-stores a "1fs pattern" representing that an inter-peak comparison output between a top-peak and an under-peak has one sample of "1" or "0" and an inter-peak comparison output has two samples of "1, 1" or "0, 0" so as to detect whether an inter-peak comparison output from the inter-peak comparison output forming circuit 124 corresponds one of these stored patterns or not. When n is 3, the pattern detection circuit 125 pre-stores a "1fs pattern" representing that an inter-peak comparison output between a top-peak and an under-peak has one sample of "1" or "0", an inter-peak comparison output has two samples of "1, 1" or "0, 0", and a "3fs pattern" representing that the inter-peak comparison output has three samples of "1, 1, 1" or "0, 0, 0" so as to detect whether an inter-peak comparison output from the inter-peak comparison output forming circuit 124 corresponds one of these stored patterns or not. When n is 4, pattern detection is performed in the same manner as described above.

In the eighth embodiment, an operation execution control circuit 126 generates an operation execution control signal which is an OFF signal when the peak value detection circuit 128 detects that the continuous "1" or "0" of inter-peak comparison outputs has n or less samples; otherwise, the operation execution control signal is an ON signal.

Therefore, in a trapezoidal operation circuit 127 in the eighth embodiment to which the operation execution control signal is supplied, when the pattern detection circuit 125 detects that the continuous "1" or "0" of inter-peak comparison outputs has n or less samples, a trapezoidal waveform data operation is not performed (or trapezoidal waveform data is not used).

A remaster apparatus according to the ninth embodiment of the present invention will be described below. In the sixth to eighth embodiments, when the peak value detection circuit 128 detects the "1fs pattern" representing that the inter-peak comparison output has one sample of "1" or "0", or when the peak value detection circuit 128 detects that the continuous "1" or "0" of the inter-peak comparison outputs has n or less samples, an operation for the trapezoidal waveform data is not performed. However, as in the ninth embodiment, when the continuous "1" or "0" of the inter-peak comparison outputs has samples whose number is a predetermined number or more, the apparatus may be set such that the operation for the trapezoidal waveform data is not performed. More specifically, for example, when audio data supplied to the input terminal 121 in FIG. 17 has a blank, it is not preferable that the operation for trapezoidal waveform data is performed to the blank data. Since the ninth embodiments basically operates in the same manner as that of the sixth embodiment except for an operation in the trapezoidal waveform generation circuit 141, the remaster apparatus according to the ninth embodiment is not illustrated.

In the ninth embodiment, when continuous "1" or "0" of inter-peak comparison outputs has nine or more samples, data is detected as the blank data, and an operation for trapezoidal waveform data is not performed when the blank data is detected. More specifically, according to the ninth embodiment, when the pattern detection circuit 125 detects a "1fs pattern" as in the eighth embodiment or detects that the continuous "1" or "0" of the inter-peak comparison outputs has n or less samples, the pattern detection circuit 125 also detects that the continuous "1" or "0" of the inter-peak comparison outputs has nine or more samples.

More specifically, in the pattern detection circuit 125, as in the sixth to eighth embodiments, in addition to the "1fs pattern" or a pattern for detecting that the continuous "1" or "0" of inter-peak comparison outputs has n or less samples, as a pattern for detecting that the continuous "1" or "0" of inter-peak comparison outputs between an top-peak and an under-peak has nine or more samples, a "9fs pattern" representing that the series of the same inter-peak comparison outputs between the top-peak and the under-peak has nine samples of "1, 1, 1, 1, 1, 1, 1, 1, 1" or "0, 0, 0, 0, 0, 0, 0, 0, 0", a "10fs pattern" representing that the series has ten samples of "1, 1, 1, 1, 1, 1, 1, 1, 1, 1" or "0, 0, 0, 0, 0, 0, 0, 0, 0, 0", a "special pattern" representing that the series has eleven or more samples of "1" or "0", and the like are stored. When the inter-peak comparison output corresponds to one of the above patterns, the detected signal is supplied to an operation execution control circuit 126.

The operation execution control circuit 126 at this time generates an operation execution control signal which is an OFF signal when the inter-peak comparison output corresponds to one of the pre-stored patterns; otherwise, the operation execution control signal is an ON signal.

Therefore, in the trapezoidal operation circuit 127 in the ninth embodiment to which the operation execution control signal is supplied, when one of the pre-stored patterns is detected by the pattern detection circuit 125, a trapezoidal waveform data operation is not performed (or trapezoidal waveform data is not used).

A remaster apparatus according to the tenth embodiment of the present invention will be described below. In a remaster apparatus according to the sixth to ninth embodiment, 16-bit audio data having a sampling frequency of 44.1 kHz is converted into 24-bit audio data having a sampling frequency of 96 kHz with respect to a sampling rate and a bit rate to perform data processing. In the remaster apparatus according to the tenth embodiment, 16-bit audio data having a sampling frequency of 96 kHz is supplied from the beginning, and the sampling frequency is changed from 16 bits into 24 bits without changing a sampling frequency to perform data processing.

The remaster apparatus according to the tenth embodiment is different from the remaster apparatus according to the sixth to ninth embodiment in the above point. For this reason, only the difference will be described below. Like reference numerals as in the remaster apparatus according to the sixth to ninth embodiments denote parts for performing like operations as those in the remaster apparatus according to the sixth to ninth embodiments in FIG. 25, and a description thereof will be omitted.

Figure 25:
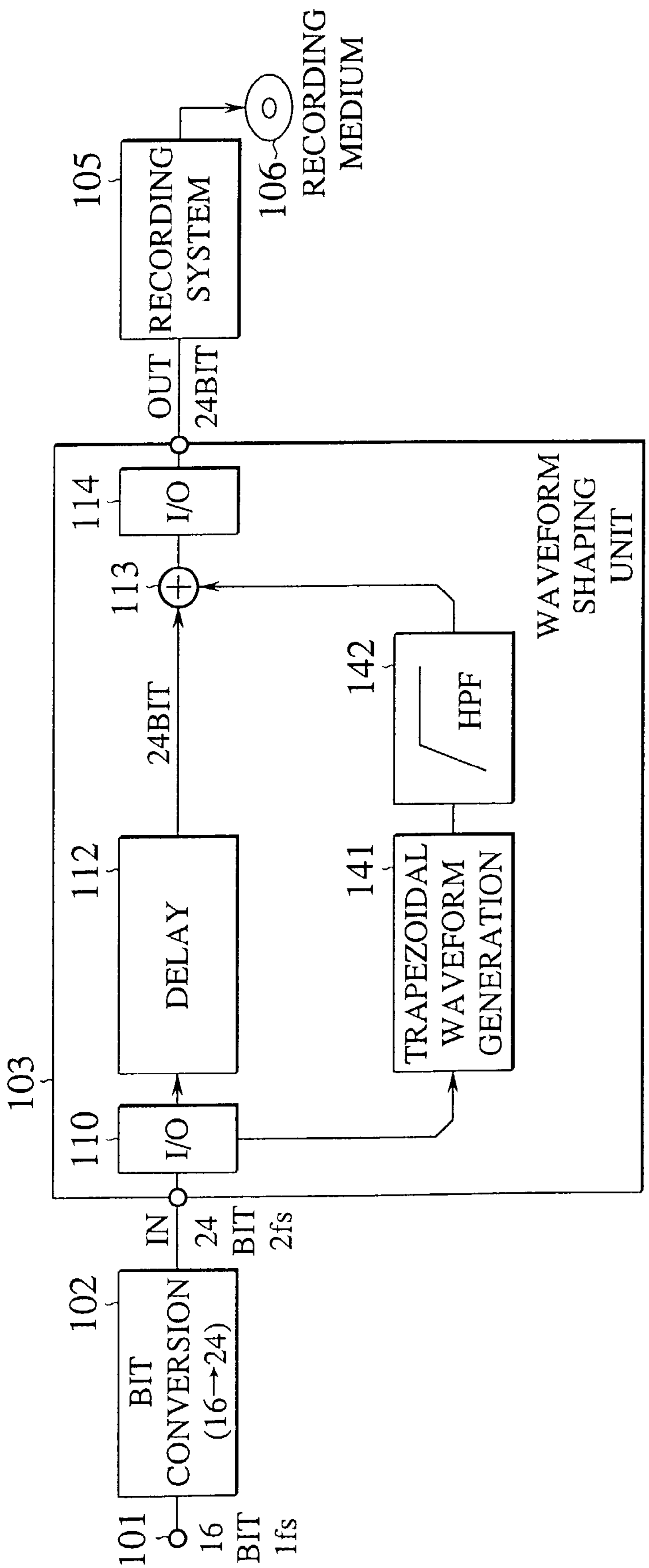
FIG. 25 is a block diagram showing a remaster apparatus according to the tenth embodiment to which a code information processing method, a code information processing apparatus, and a method of recording code information on a recording medium according to the present invention are applied.

More specifically, the remaster apparatus according to the tenth embodiment has an arrangement in which the sampling rate conversion circuit 140 shown in FIG. 16 connected between the bit conversion circuit 102 and the waveform shaping unit 103 is omitted as shown in FIG. 25.

In the above remaster apparatus, audio data having a sampling frequency of 96 kHz and a bit rate of 16 bits and supplied through an input terminal 1 is converted into 24-bit audio data by a bit conversion circuit 102, and the resultant audio data is supplied to the waveform shaping unit 103.

In this manner, harmonic of a treble part in the frequency band of audio data to be output or recorded can be emphasized, and like effect as that of the remaster apparatus according to the sixth to ninth embodiments described above can be obtained.

Figure 26:
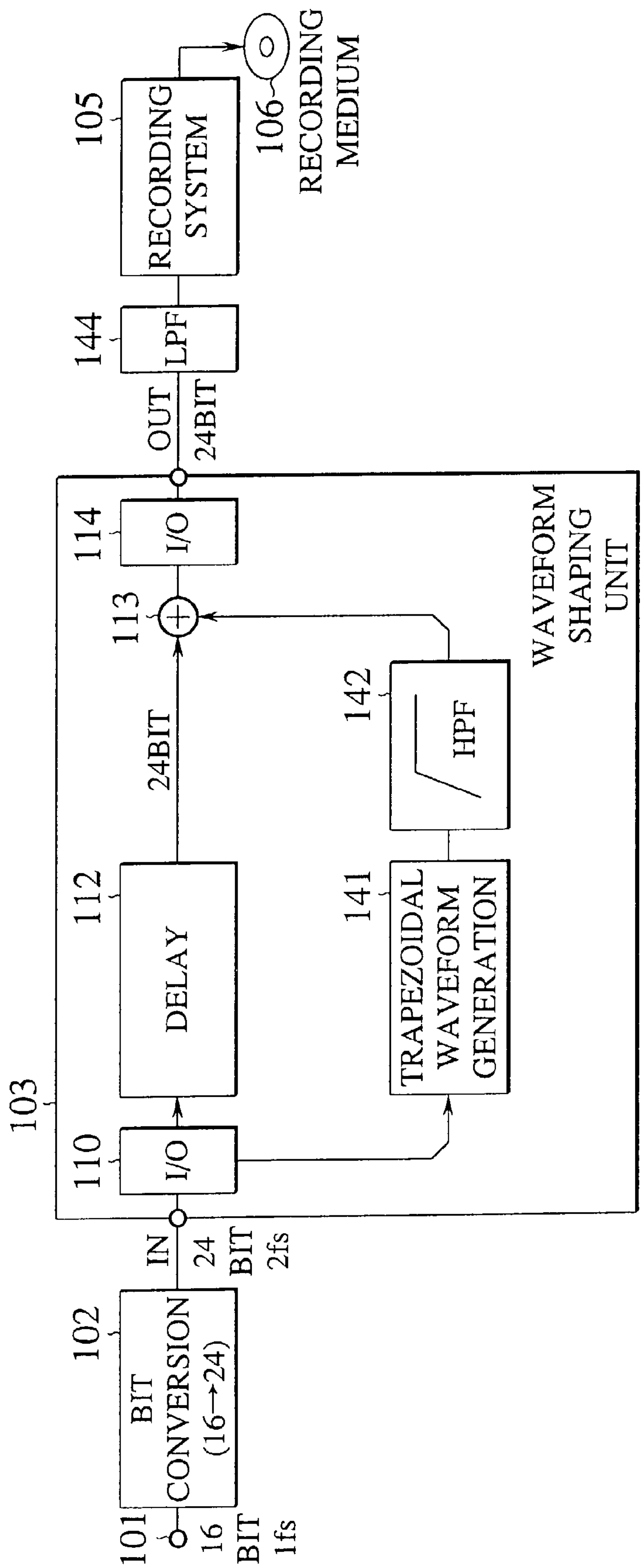
FIG. 26 is a block diagram showing a remaster apparatus according to the eleventh embodiment to which a code information processing method, a code information processing apparatus, and a method of recording code information on a recording medium according to the present invention are applied.

A remaster apparatus according to the eleventh embodiment of the present invention will be described below. In the remaster apparatus according to the eleventh embodiment, a low-pass filter 144 is arranged between a waveform shaping unit 103 and a recording system 105 in the remaster apparatus according to the above tenth embodiment as shown in FIG. 26. Since the remaster apparatus according to the eleventh embodiment is different from the remaster apparatus according to the sixth to ninth embodiments in this point, only the difference will be described below.

In the remaster apparatus according to the sixth to ninth embodiments, a low-pass filter can be advantageously omitted. However, if aliasing noise or the like is generated, the aliasing noise or the like can be removed by the low-pass filter 144, the high tone quality of the formed audio data can be assured.

The remaster apparatus does not necessarily require a low-pass filter. It should be understood that the low-pass filter makes it possible to cope with aliasing noise or the like which is rarely generated.

The twelfth embodiment of the present invention will be described below. In the twelfth embodiment, a code information processing method and a code information processing apparatus according to the present invention are applied to an audio processing apparatus for a CD player. In the audio processing apparatus for a CD player according to the twelfth embodiment, like reference numerals as in the remaster apparatus according to the sixth to ninth embodiments denote parts for performing like operations as those in the remaster apparatus according to the sixth to ninth embodiments in FIG. 27, and a description thereof will be omitted.

Figure 27:
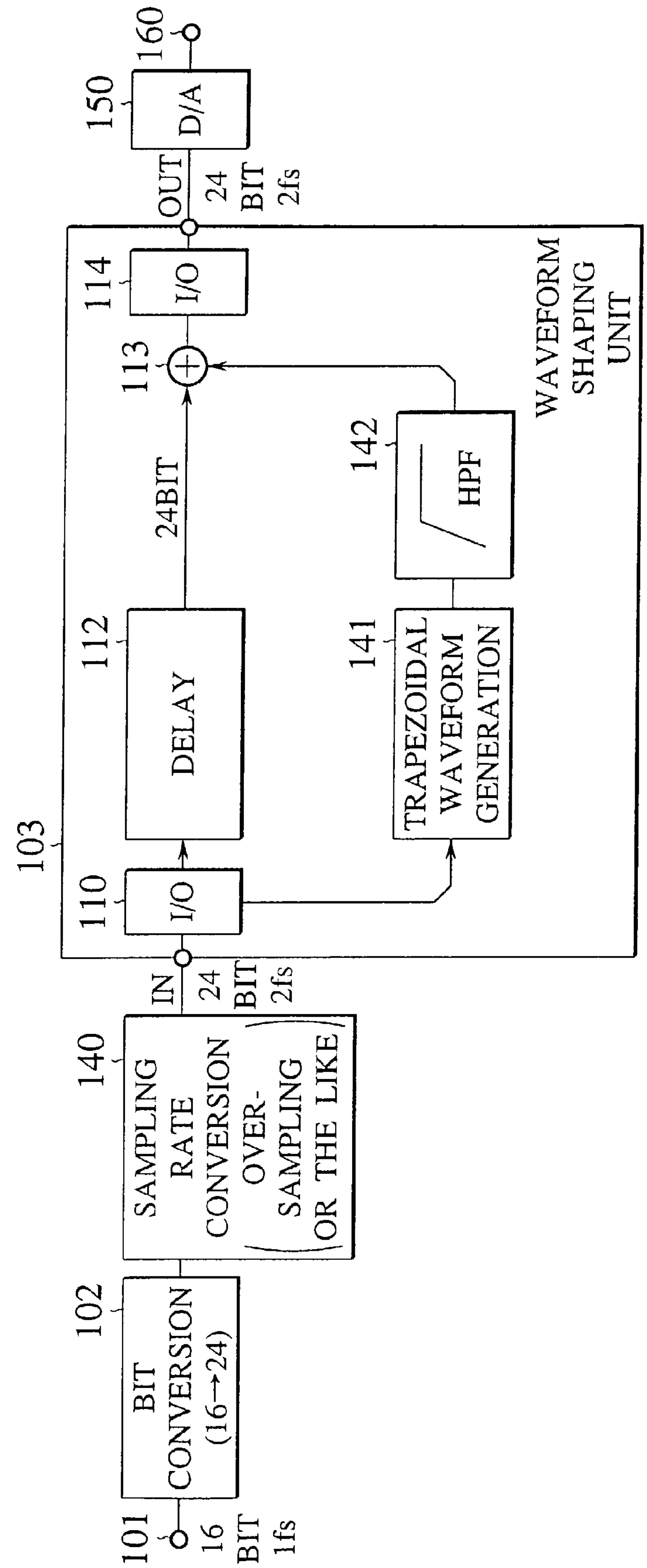
FIG. 27 is a block diagram showing an audio processing apparatus for CD player according to the twelfth embodiment to which a code information processing method and a code information processing apparatus according to the present invention is applied.

More specifically, the audio processing apparatus for a CD player according to the twelfth embodiment has a D/A converter 150 for converting audio data output as digital data to the post-stage of a waveform shaping unit 103 into an analog audio signal as shown in FIG. 27. With the D/A converter 150, 24-bit audio data added with harmonic is converted into analog audio data. The analog audio data is supplied to, e.g., a loudspeaker device, an optical disk recording device, or the like through an output terminal 160. As described above, since the audio data formed by the waveform shaping unit 103 is extended in frequency band, when the audio data is converted into analog audio data to supply the analog data to the loudspeaker device, rich acoustic effect can be obtained, and the same effect as that of each of the above embodiments can be obtained.

The thirteenth embodiment of the present invention will be described below. In the thirteenth embodiment, a code information processing method and a code information processing apparatus according to the present invention is applied to an audio processing apparatus for a DVD player. In the audio processing apparatus for a CD player according to the thirteenth embodiment, like reference numerals as in the audio processing apparatus according to the sixth to ninth embodiments denote parts for performing like operations as those in the audio processing apparatus according to the sixth to ninth embodiments in FIG. 28, and a description thereof will be omitted.

Figure 28:
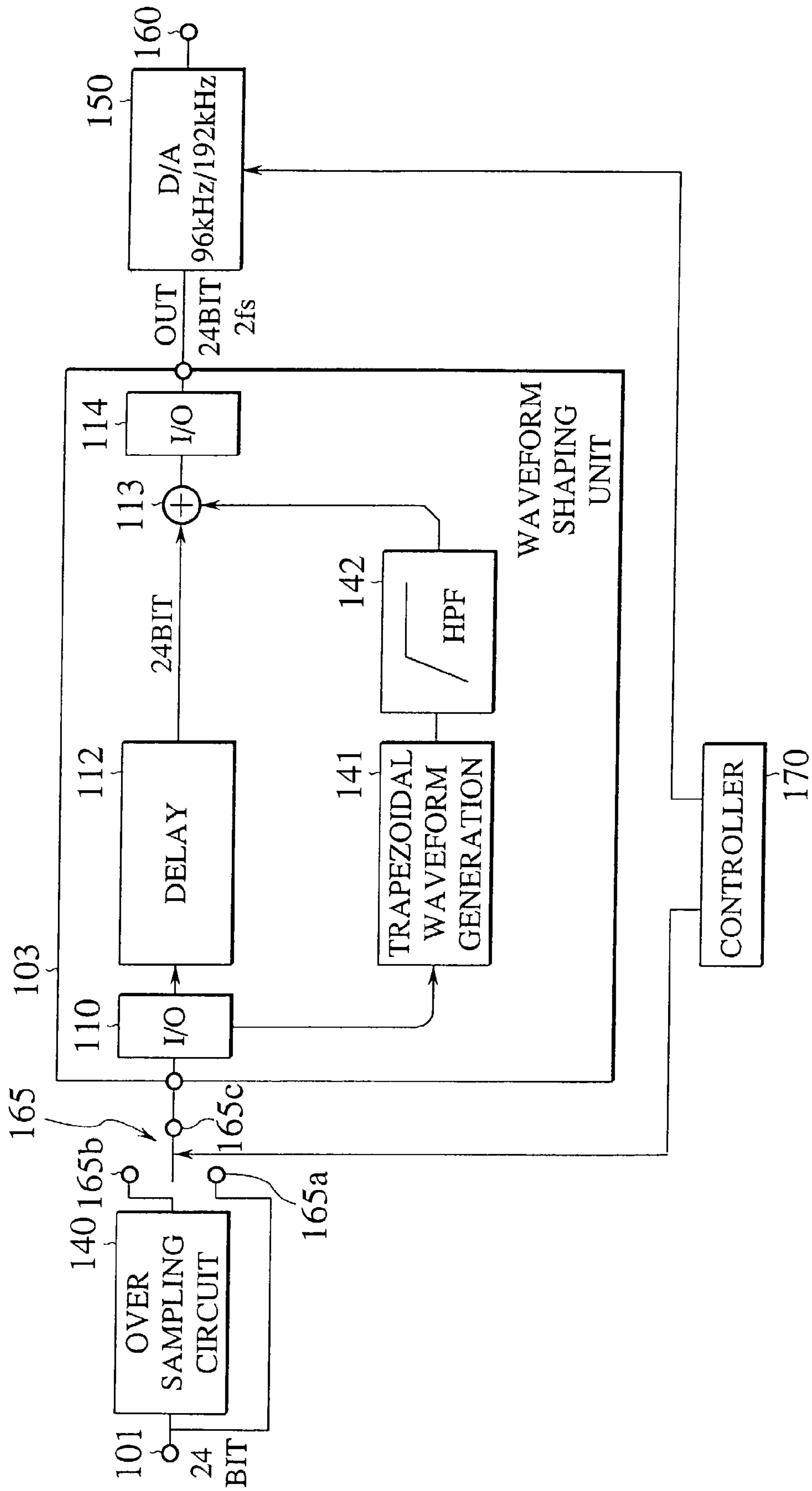
FIG. 28 is a block diagram showing an audio processing apparatus for DVD player according to the thirteenth embodiment to which a code information processing method and a code information processing apparatus according to the present invention is applied.

More specifically, the audio processing apparatus for a DVD player according to the thirteenth embodiment has an over-sampling rate conversion circuit 140 for converting audio data having a sampling frequency of 96 kHz and a bit rate of 24 bits as shown in FIG. 28 into audio data having a sampling frequency of 192 kHz without changing the bit rate, a change-over switch 165 for switchably outputting audio data supplied from the over-sampling rate conversion circuit 140 and having a sampling frequency of 192 kHz and audio data supplied through an input terminal 101 and having a sampling frequency of 96 kHz, and a D/A converter 150 for converting audio data output from a waveform shaping unit 103 and having a sampling frequency of 96 kHz and audio data having a frequency of 192 kHz into analog data.

A controller 170 performs change-over control for the change-over switch 165 in accordance with the sampling frequency of audio data processed by the audio processing apparatus, and performs change-over control for the drive frequency of the D/A converter 150.

The operation of an audio processing apparatus for a DVD player according to the thirteenth embodiment having the above arrangement will be described below.

When data processing for audio data having a sampling frequency of 96 kHz is to be performed, the controller 170 performs change-over control for the change-over switch 165 to cause a selection terminal 165*c* to select a selected terminal 165*a*, and controls the D/A converter 150 to perform a D/A conversion process depending on the sampling frequency of 96 kHz.

With this arrangement, 96 kHz audio data from an input terminal 101 is supplied to the waveform shaping unit 103 through a change-over switch 165, and the data is added with a harmonic component corresponding to a sampling frequency of 96 kHz and converted into analog data by the D/A converter 150. The resultant analog data is output to, e.g., a loudspeaker device, an optical disk recording device, or the like.

When data processing for audio data having a sampling frequency of 192 kHz is to be performed, the controller 170 performs change-over control for the change-over switch 165 to cause the selection terminal 165*c* to select a selected terminal 165*b*, and controls the D/A converter 150 to perform a D/A conversion process depending on the sampling frequency of 192 kHz.

With this arrangement, 96 kHz audio data from the input terminal 101 is converted by the over-sampling rate conversion circuit 140 into audio data having a sampling frequency of 192 kHz, and the resultant audio data is supplied to the waveform shaping unit 103 through the change-over switch 165. The data is added with a harmonic component corresponding to a sampling frequency of 192 kHz and converted into analog data by the D/A converter 150. The resultant analog data is output to, e.g., a loudspeaker device, an optical disk recording device, or the like.

In this manner, the audio processing apparatus for a DVD player according to the thirteenth embodiment can add a harmonic component to 96 kHz audio data to output the resultant audio data, or can convert 96 kHz audio data into data having a sampling frequency of 192 kHz and adds a harmonic component to the 192 kHz audio data to output the resultant audio data. For this reason, when data processing for adding a harmonic component to 96 kHz audio data is performed to DVD audio data indicated by an alternate long and short dash line in FIG. 29, a high band extending from, e.g., 24 kHz to 48 kHz in FIG. 29 can be emphasized. In addition, when data processing for converting 96 kHz audio data into audio data having a sampling frequency of 192 kHz and adding a harmonic component to the 192 kHz audio data is performed, a high band extending to 192 kHz can be emphasized as indicated by a dotted line in FIG. 29. Therefore, when an audio signal subjected to the data processing is supplied to a loudspeaker device, music or the like can be enjoyed with a more rich sense, and the same effect as that in each of the above embodiments can be obtained.

Figure 29:
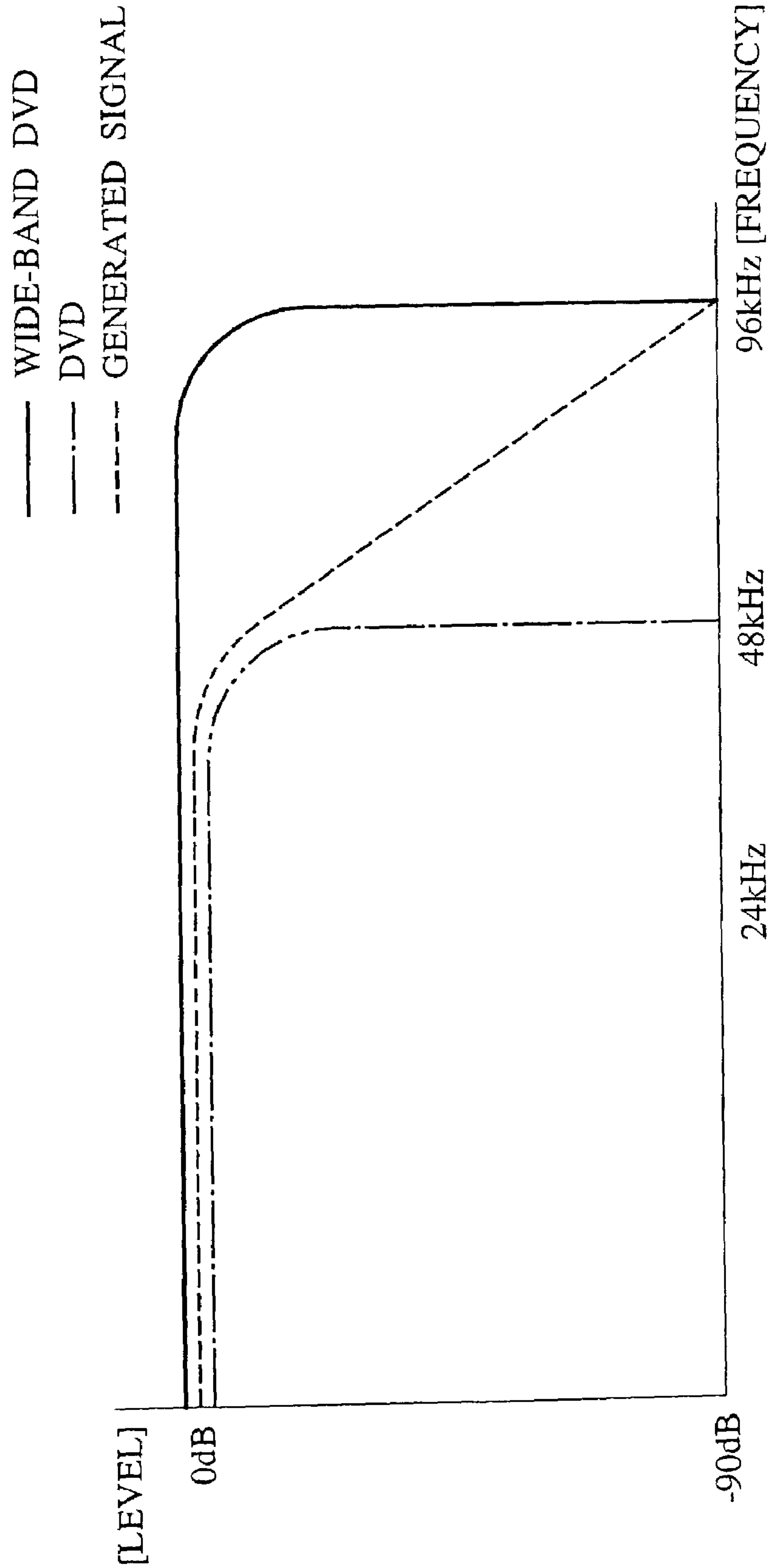
FIG. 29 is a graph showing the frequency band of audio data to which harmonic is added by the audio processing apparatus for DVD player according to the thirteenth embodiment.

Here, when data processing for a wide-band DVD audio signal indicated by a solid line in FIG. 29 is performed, the controller 170 performs change-over control for the change-over switch 165 to cause the selection terminal 165*c* to select the selected terminal 165*a*, and controls the D/A converter 150 to perform a D/A conversion process depending on the sampling frequency of 192 kHz.

With this arrangement, a 192 kHz audio signal from the input terminal 101 is supplied to the waveform shaping unit 103 through the change-over switch 165, and the data is added with a harmonic component corresponding to a sampling frequency of 192 kHz and converted into analog data by the D/A converter 150. The resultant analog data is output to, e.g., a loudspeaker device, an optical disk recording device, or the like.

In the description of the thirteenth embodiment, the over-sampling rate conversion circuit 140 and the change-over switch 165 are arranged to make it possible to select data processing for audio data having a sampling frequency of 96 kHz and data processing for audio data having a sampling frequency of 192 kHz. However, the over-sampling rate conversion circuit 140 and the change-over switch 165 may be omitted. For this reason, as a drive frequency in the D/A converter 150, only a drive frequency corresponding to 96 kHz can be set. After the arrangement is designed to be simplified, the above high band can be emphasized.

Finally, in each of the embodiments described above, a code information processing apparatus, a code information processing method, and a method of recording code information on a recording medium according to the present invention are designed to be applied to a remaster apparatus for converting audio data for a compact disk into audio data for a digital video disk to remaster the converted data, an audio processing apparatus for a CD player, or an audio processing apparatus for a DVD player. However, the present invention can also be applied to any apparatus, for converting audio data having a narrow frequency band into audio data having a wide frequency band, such as a remaster apparatus for converting audio data for a compact disk into audio data for a digital audio tape (DAT) having a sampling frequency of 48 kHz to remaster the converted audio data.

The sampling rate conversion circuit 140 according to each of the sixth to ninth embodiments and the twelfth embodiment or the over-sampling rate conversion circuit 140 according to the thirteenth embodiment is arranged on the pre-stage of the waveform shaping unit 103. However, the following arrangement can also be effected. That is, the sampling rate conversion circuit 140 is arranged on the next stage of the I/O port 110 in each of the embodiments, and outputs from the sampling rate conversion circuit 140 or the over-sampling rate conversion circuit 140 arranged on the next stage of the I/O port 110 is supplied to the delay circuit 112 and the trapezoidal waveform generation circuit 141.

In the description of the above embodiments, actual numeral values such as 44.1 kHz, 48 kHz, 96 kHz, and 192 kHz as sampling frequencies and 16 bits and 24 bits as bit rates of audio data. However, these numeral values are only examples for making the description of the embodiments of the present invention easy. For this reason, the present invention is not limited to the actual numeral values or the embodiments which only examples, and various changes of the invention can be effected depending on design or the like without departing from the spirit and scope of the invention.

What is claimed is:

1. An audio information processing method comprising the steps of:

comparing audio information supplied from the outside every predetermined sample;

detecting maximal values and minimal values of waveforms of the audio information;

detecting an interval extending from a maximal value to a minimal value detected in the above step and an interval extending from the minimal value to a maximal value;

forming a predetermined band component corresponding to the interval extending from the maximal value to the minimal value or the interval extending from the minimal value to the maximal value detected in the above step on the basis of the audio information supplied from the outside; and performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected in the above step to add the predetermined band components to the audio information supplied from the outside.

2. An audio information processing method according to claim 1, wherein, in the step of comparing audio information supplied from the outside every predetermined sample, the audio information supplied from the outside are compared with each other at sampling frequencies of the audio information every sample.

3. An audio information processing method according to claim 1, wherein, in the step of detecting maximal values and minimal values of waveforms of the audio information, detection of the maximal values and the minimal values is performed on the basis of comparison outputs obtained by the step of comparing audio information supplied from the outside every predetermined sample.

4. An audio information processing method according to claim 1, wherein, in the step of detecting maximal values and minimal values of waveforms of the audio information, of comparison outputs obtained in the step of comparing audio information supplied from the outside every predetermined sample, a series of the same comparison outputs is detected, and a sample value corresponding to a comparison output at the first before point of a point where the same continuous comparison outputs change is detected as a maximal value or a minimal value.

5. An audio information processing method according to claim 1, wherein, in the step of detecting an interval extending from the maximal value to the minimal value and an interval extending from the minimal value to the maximal value, an interval in which the same continuous comparison outputs obtained in the step of comparing audio information supplied from the outside every predetermined sample in the interval extending from the maximal value to the minimal value or the interval extending from the minimal value to the maximal value to detect the interval extending from the maximal value to the minimal value and the interval extending from the minimal value to the maximal value.

6. An audio information processing method according to claim 1, wherein, in the step of forming a predetermined band component corresponding to the interval extending from the maximal value to the minimal value or the interval extending from the minimal value to the maximal value on the basis of the audio information supplied from the outside, a high-band component corresponding to the interval extending from the maximal value to the minimal value or the interval extending from the minimal value to the maximal value.

7. An audio information processing method according to claim 1, wherein, in the step of a predetermined band component corresponding to the interval extending from the maximal value to the minimal value or the interval extending from the minimal value to the maximal value on the basis of the audio information supplied from the outside, a difference value between the maximal value and a before or after sample value of the maximal value or a difference value between the minimal value and a before or after sample value of the minimal value, and a difference value between the before sample value of the maximal value and a second before sample value of the maximal value or a second after sample value of the maximal value or a difference value between the before sample value of the minimal value and a second before sample value of the minimal value or a second after sample value of the minimal value are detected with respect to the interval extending from the maximal value to the minimal value or the interval extending from the minimal value to the maximal value, and the difference values are set to be values corresponding to the level of the corresponding maximal value or the corresponding minimal value to form a predetermined band component.

8. An audio information processing method according to claim 1, wherein, in the step of performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected to add the predetermined band components to the audio information supplied from the outside, the addition process is performed for a waveform corresponding to the maximal value to add the predetermined band component to before and after sample values of the maximal value or second before and after sample values depending on the interval extending from the maximal value to the minimal value or the interval extending from the minimal value to the maximal value, and a subtraction process is performed for a waveform corresponding to the minimal value to subtract the predetermined band component from before and after sample values of the minimal value or second before and after sample values of the minimal value depending on the interval extending from the maximal value to the minimal value or the interval extending from the minimal value to the maximal value.

9. An audio information processing method according to claim 1, wherein, in the step of performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected to add the predetermined band components to the audio information supplied from the outside, when the interval extending from the maximal value to the minimal value or the interval extending from the minimal value to the maximal value is not more than a predetermined interval or not less than a predetermined interval, the addition process, the subtraction process, or the addition-subtraction process for the predetermined band component is not performed to directly output the audio information.

10. An audio information processing method according to claim 1, wherein, in the step of performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected to add the predetermined band components to the audio information supplied from the outside, when the interval extending from the maximal value to the minimal value or the interval extending from the minimal value to the maximal value is not more than a one-sample interval or not less than a nine-sample interval, the addition process, the subtraction process, or the addition-subtraction process for the predetermined band component is not performed to directly output the audio information.

11. An audio information processing method according to claim 1, comprising as the previous step of the step of comparing audio information supplied from the outside every predetermined sample, the step of increasing a sampling frequency for increasing the number of samples of the audio information supplied from the outside.

12. An audio information processing method according to claim 1, comprising as the previous step of the step of comparing audio information supplied from the outside every predetermined sample, the step of for performing over-sampling for making the number of samples of the audio information supplied from the outside twice.

13. An audio information processing method according to claim 1, comprising as the subsequent step of the step of adding a predetermined band component to the audio information supplied from the outside, the step of removing a predetermined unnecessary band component.

14. An audio information processing apparatus comprising:

comparison means for comparing audio information supplied from the outside every predetermined sample;

maximal/minimal value detection means for detecting maximal values and minimal values of waveforms of the audio information;

interval detection means for detecting an interval extending from a maximal value to a minimal value detected by said maximal/minimal value detection means and an interval extending from the minimal value to a maximal value;

band component forming means for forming a predetermined band component corresponding to the interval extending from the maximal value to the minimal value or the interval extending from the minimal value to the maximal value detected by said interval detection means on the basis of the audio information supplied from the outside; and band component addition means for performing an addition process, a subtraction process, or an addition-subtraction process to the predetermined band components formed by said band component forming means with respect to the audio information supplied from the outside at a timing corresponding to the interval extending from the maximal value to the minimal value or the interval extending from the minimal value to the maximal value detected by said interval detection means to add the predetermined band components to the audio information supplied from the outside and to output the resultant audio information.

15. An audio information processing apparatus according to claim 14, wherein said comparison means compares the audio information supplied from the outside with each other at sampling frequencies of the audio information every sample.

16. An audio information processing apparatus according to claim 14, wherein said maximal/minimal detection means performs detection of the maximal values and the minimal values on the basis of comparison outputs obtained by said comparison means.

17. An audio information processing apparatus according to claim 14, wherein said maximal/minimal detection means detects, of comparison outputs obtained from said comparison means, a series of the same comparison outputs, and detects a sample value corresponding to a comparison output at the first before point of a point where the same continuous comparison outputs change as a maximal value or a minimal value.

18. An audio information processing apparatus according to claim 14, wherein said interval detection means detects an interval in which the same continuous comparison outputs obtained from said comparison means to detect in the interval extending from the maximal value to the minimal value and the interval extending from the minimal value to the maximal value.

19. An audio information processing apparatus according to claim 14, wherein said band component forming means forms a high-band component corresponding to the interval extending from the maximal value to the minimal value or the interval extending from the minimal value to the maximal value.

20. An audio information processing apparatus according to claim 14, wherein said band component forming means comprising differential value detection means for detecting a difference value between the maximal value and a before or after sample value of the maximal value or a difference value between the minimal value and a before or after sample value of the minimal value, and a difference value between the before sample value of the maximal value and a second before sample value of the maximal value or a second after sample value of the maximal value or a difference value between the before sample value of the minimal value and a second before sample value of the minimal value or a second after sample value of the minimal value with respect to the interval extending from the maximal value to the minimal value or the interval extending from the minimal value to the maximal value, and level control means for setting the difference values detected by said difference value detection means to be values corresponding to the level of the corresponding maximal value or the corresponding minimal value to form a predetermined band component.

21. An audio information processing apparatus according to claim 14, wherein said band component addition means performs an addition process for a waveform corresponding to the maximal value to add the predetermined band component from said band component forming means to before and after sample values of the maximal value or second before and after sample values depending on the interval extending from the maximal value to the minimal value or the interval extending from the minimal value to the maximal value detected by said interval detection means, and performs a subtraction process for a waveform corresponding to the minimal value to subtract the predetermined band component from before and after sample values of the minimal value or second before and after sample values of the minimal value depending on the interval extending from the maximal value to the minimal value or the interval extending from the minimal value to the maximal value.

22. An audio information processing apparatus according to claim 14, wherein said band component addition means does not perform the addition process, the subtraction process, or the addition-subtraction process for the predetermined band component to directly output the audio information when the interval extending from the maximal value to the minimal value or the interval extending from the minimal value to the maximal value is not more than a predetermined interval or not less than a predetermined interval.

23. An audio information processing apparatus according to claim 14, wherein said band component addition means does not perform the addition process, the subtraction process, or the addition-subtraction process for the predetermined band component to directly output the audio information when the interval extending from the maximal value to the minimal value or the interval extending from the minimal value to the maximal value is not more than a one-sample interval or not less than a nine-sample interval.

24. An audio information processing apparatus according to claim 14, comprising sampling frequency increasing means for increasing a sampling frequency for increasing the number of samples of the audio information supplied from the outside to supply the audio information to said comparison means, said difference detection means, and said band component.

25. An audio information processing method according to claim 14, comprising over-sampling means performs over-sampling for making the number of samples of the audio information supplied from the outside twice to supply the audio information to said comparison means, said difference detection means, and said band component addition means.

26. An audio information processing apparatus according to claim 14, comprising unnecessary band component removal means for removing a predetermined unnecessary band component from the audio information from said band component addition means.

27. A method of recording audio information generated by an audio information processing method on a predetermined recording medium, the audio information processing method comprising the steps of:

comparing audio information supplied from the outside every predetermined sample;

detecting maximal values and minimal values of waveforms of the audio information;

detecting an interval extending from a maximal value to a minimal value detected in the above step and an interval extending from the minimal value to a maximal value;

forming a predetermined band component corresponding to the interval extending from the maximal value to the minimal value or the interval extending from the minimal value to the maximal value detected in the above step on the basis of the audio information supplied from the outside; and performing an addition process, a subtraction process, or an addition-subtraction process to the predetermined band components with respect to the audio information supplied from the outside at a timing corresponding to the interval extending from the maximal value to the minimal value or the interval extending from the minimal value to the maximal value detected in the above step to add the predetermined band components to the audio information supplied from the outside.

28. A code information processing method comprising the steps of:

comparing code information generated by sampling a waveform signal every predetermined sample;

detecting a maximal sample point and a minimal sample point of the code information;

detecting a before sample point and an after sample point respectively separated from the maximal sample point and the minimal sample point detected in the above step by a predetermined time;

setting levels of the before sample point and the after sample point;

connecting, of a maximal sample point and a minimal sample point which are adjacent to each other on time base, the after sample point at a before maximal sample point or a before minimal sample point to the before sample point at an after minimal sample point or a maximal sample point with a line;

generating waveform information having a predetermined shape from the line obtained in the above step;

extracting a predetermined frequency band component from the waveform information having the predetermined shape; and adding the predetermined frequency band component extracted in the above step to the code information.

29. A code information processing method according to claim 28, wherein, in the step of comparing the before sample point and the after sample point, a before sample point and an after sample point respectively separated from the maximal sample point and the minimal sample point are detected.

30. A code information processing method according to claim 28, wherein, in the step of setting levels of the before sample point and the after sample point, the levels of the before sample point and the after sample point are set to be a level of the maximal sample point or the minimal sample point, or set to be a level of the maximal sample point or the minimal sample point and then set to be a level obtained by adding-subtracting a predetermined level to/from the level.

31. A code information processing method according to claim 28, wherein, in the step of generating waveform information having a predetermined shape from the line, an addition-subtraction value corresponding an inclination of the line is added/subtracted to/from the sample value of the maximal sample point or the sample value of the minimal sample point to generate the waveform information having the predetermined shape.

32. A code information processing method according to claim 28, wherein, in the step of generating waveform information having a predetermined information, on the basis of at least a timing of the maximal sample point and a timing of the minimal sample point, a line for connecting an after sample point at the before maximal sample point to a before sample point at the after minimal sample point and a line for connecting an after sample point at the before minimal sample point to a before sample point at the after maximal sample point are switched to generate the waveform information having the predetermined shape.

33. A code information processing method according to claim 28, wherein, in the step of comparing code information every predetermined sample, the code information are compared with each other at sampling frequencies of the code information every sample.

34. A code information processing method according to claim 28, wherein, in the step of detecting maximal sample points and minimal sample points of the code information, detection of the maximal sample points and the minimal sample points is performed on the basis of comparison outputs obtained by the step of comparing code information every predetermined sample.

35. A code information processing method according to claim 28, wherein, in the step of detecting maximal sample points and minimal sample points of the code information, of comparison outputs obtained in the step of comparing code information every predetermined sample, a series of the same comparison outputs is detected, and a sample point corresponding to a comparison output at the first before point of a point where the same continuous comparison outputs change is detected as a maximal sample point or a minimal sample point.

36. A code information processing method according to claim 28, comprising the step of detecting an interval between the maximal sample point and the minimal sample point.

37. A code information processing method according to claim 36, wherein, in the step of detecting an interval between the maximal sample point and the minimal sample point, an interval in which the same comparison outputs obtained by the step of comparing code information every predetermined sample continue is detected between the maximal sample point and the minimal sample point to perform detection of the interval between the maximal sample point and the minimal sample point.

38. A code information processing method according to claim 36, wherein, in the step of generating waveform information having a predetermined shape, the waveform information having the predetermined shape is not generated to directly output the code information when the interval between the maximal sample point and the minimal sample point is not more than a predetermined interval or not less than the predetermined interval.

39. A code information processing method according to claim 28, comprising the step of increasing a sampling frequency for increasing the number of samples of the code information as the previous step of the step of comparing code information every predetermined sample, or the step of performing over-sampling for making the number of samples of the code information twice as the previous step of the step of comparing code information every predetermined sample.

40. A code information processing method according to claim 28, comprising as the subsequent step of the step of adding the extracted predetermined frequency band component to the code information, the step of removing a predetermined unnecessary band component.

41. A code information process method according to claim 28, wherein the code information is audio information supplied from the outside, the waveform information having the predetermined shape is waveform information having an almost trapezoidal shape, and the predetermined frequency band component is a harmonic component.

42. A code information processing apparatus comprising:

comparison means for comparing code information generated by sampling a waveform signal every predetermined sample;

maximal/minimal sample point detection means for detecting a maximal sample point and a minimal sample point of the code information;

before/after sample point detection means for detecting a before sample point and an after sample point respectively separated from the detected maximal sample point and the detected minimal sample point by a predetermined time;

level setting means for setting levels of the before sample point and the after sample point;

line operation means for connecting, of a maximal sample point and a minimal sample point which are adjacent to each other on time base, the after sample point at a before maximal sample point or a before minimal sample point to the before sample point at an after minimal sample point or a maximal sample point with a line;

trapezoidal waveform information generation means for generating waveform information having a predetermined shape from the line;

frequency component extraction means for extracting a predetermined frequency band component of the waveform information having the predetermined shape; and addition means for adding the extracted predetermined frequency band component to the code information.

43. A code information processing apparatus according to claim 42, wherein the before/after sample point detection means detects a before sample point and an after sample point respectively separated from the maximal sample point and the minimal sample point.

44. A code information processing apparatus according to claim 42, wherein said level setting means sets the levels of the before sample point and the after sample point to be a level of the maximal sample point or the minimal sample point, or sets the levels of the before sample point and the after sample point to be a level of the maximal sample point or the minimal sample point and then to be a level obtained by adding-subtracting a predetermined level to/from the level.

45. A code information process apparatus according to claim 42, wherein said trapezoidal waveform information adds/subtracts an addition-subtraction value corresponding an inclination of the line to/from the sample value of the maximal sample point or the sample value of the minimal sample point to generate the waveform information having the predetermined shape.

46. A code information processing apparatus according to claim 42, wherein said trapezoidal waveform information generation means, on the basis of at least a timing of the maximal sample point and a timing of the minimal sample point, switches a line for connecting an after sample point at the before maximal sample point to a before sample point at the after minimal sample point and a line for connecting an after sample point at the before minimal sample point to a before sample point at the after maximal sample point to generate the waveform information having the predetermined shape.

47. A code information processing apparatus according to claim 42, wherein said comparison means compares the code information with each other at sampling frequencies of the code information every sample.

48. A code information processing apparatus according to claim 42, wherein said maximal/minimal sample point detection means performs detection of the maximal sample points and the minimal sample points is performed on the basis of comparison outputs obtained by said comparison means.

49. A code information processing apparatus according to claim 42, wherein said maximal/minimal sample point detection means detects, of comparison outputs obtained in the step of comparing code information every predetermined sample, a series of the same comparison outputs, and detects a sample point corresponding to a comparison output at the first before point of a point where the same continuous comparison outputs change as a maximal sample point or a minimal sample point.

50. A code information processing apparatus according to claim 42, comprising maximal/minimal sample point interval detection means for detecting an interval between the maximal sample point and the minimal sample point.

51. A code information processing apparatus according to claim 50, wherein said maximal/minimal sample point interval detection means detects an interval in which the same comparison outputs obtained by the step of comparing code information every predetermined sample continue between the maximal sample point and the minimal sample point to perform detection of the interval between the maximal sample point and the minimal sample point.

52. A code information processing apparatus according to claim 51, wherein said trapezoidal waveform information generation means does not generate the waveform information having the predetermined shape to directly output the code information when the interval between the maximal sample point and the minimal sample point is not more than a predetermined interval or not less than the predetermined interval.

53. A code information processing apparatus according to claim 42, comprising sampling frequency conversion means for increasing a sampling frequency for increasing the number of samples of the code information as the previous stage of said comparison means, or over-sampling means for performing over-sampling for making the number of samples of the code information twice as the previous stage of said comparison means.

54. A code information processing apparatus according to claim 42, wherein band removal means for removing a predetermined unnecessary band component as the subsequent stage of said addition means.

55. A code information process apparatus according to claim 42, wherein the code information is audio information supplied from the outside, the waveform information having the predetermined shape is waveform information having an almost trapezoidal shape, and the predetermined frequency band component is a harmonic component.

56. A method of recording code information generated by a code information processing method on a predetermined recording means, the code information processing method comprising the steps of:

comparing code information generated by sampling a waveform signal every predetermined sample;

detecting a maximal sample point and a minimal sample point of the code information;

detecting a before sample point and an after sample point respectively separated from the detected maximal sample point and the detected minimal sample point by a predetermined time;

setting levels of the before sample point and the after sample point;

connecting, of a maximal sample point and a minimal sample point which are adjacent to each other on time base, the after sample point at a before maximal sample point or a before minimal sample point to the before sample point at an after minimal sample point or a maximal sample point with a line;

generating waveform information having a predetermined shape from the line obtained in the above step;

extracting a predetermined frequency band component of the waveform information having the predetermined shape; and adding the predetermined frequency band component extracted in the above step to the code information.

* * * * *

UNITED STATES PATENT AND TRADEMARK OFFICE

CERTIFICATE OF CORRECTION

PATENT NO. : 7,020,604 B2 Page 1 of 1
APPLICATION NO. : 10/199008
DATED : March 28, 2006
INVENTOR(S) : Kuwaoka It is certified that error appears in the above-identified patent and that said Letters Patent is hereby corrected as shown below:

Claims 1-27, Columns 36-41,
Please cancel claims 1-27

Signed and Sealed this

Fifth Day of February, 2008

JON W. DUDAS
*Director of the United States Patent and Trademark Office*